(12) United States Patent
Rice et al.

(10) Patent No.: US 6,634,019 B1
(45) Date of Patent: Oct. 14, 2003

(54) TOGGLING SOFTWARE CHARACTERISTICS IN A FAULT TOLERANT AND COMBINATORIAL SOFTWARE ENVIRONMENT SYSTEM, METHOD AND MEDIUM

(75) Inventors: Todd M. Rice, Boston, MA (US); Gordon E. Bennett, Cambridge, MA (US)

(73) Assignee: Lamarck, Inc., Boston, MA (US)

(*) Notice: Subject to any disclaimer, the term of this patent is extended or adjusted under 35 U.S.C. 154(b) by 0 days.

(21) Appl. No.: 09/570,610

(22) Filed: May 12, 2000

Related U.S. Application Data

(60) Provisional application No. 60/144,078, filed on Jul. 16, 1999, provisional application No. 60/144,204, filed on Jul. 19, 1999, and provisional application No. 60/196,084, filed on Apr. 11, 2000.

(51) Int. Cl.$^7$ ................................................ G06F 9/44
(52) U.S. Cl. ................................................ 717/127; 706/13
(58) Field of Search ....................... 717/106–108, 717/114–122, 124–132, 136–148, 154–166; 706/13

(56) References Cited

U.S. PATENT DOCUMENTS

| | | | |
|---|---|---|---|
| 4,617,643 A | 10/1986 | Klock et al. ................ 707/531 |
| 4,697,242 A | 9/1987 | Holland et al. ............... 706/13 |
| 4,791,550 A | * 12/1988 | Stevenson et al. .......... 709/106 |
| 5,249,275 A | 9/1993 | Srivastava ................. 717/137 |
| 5,343,554 A | 8/1994 | Koza et al. .................... 706/13 |
| 5,511,167 A | 4/1996 | Kawano et al. ............. 709/202 |
| 5,548,759 A | * 8/1996 | Lipe ........................... 707/100 |
| 5,598,560 A | * 1/1997 | Benson ....................... 717/159 |
| 5,644,709 A | * 7/1997 | Austin ......................... 714/53 |
| 5,682,536 A | 10/1997 | Atkinson et al. ........... 717/165 |
| 5,684,985 A | 11/1997 | Ahmadi ..................... 707/100 |
| 5,708,811 A | 1/1998 | Arendt et al. .............. 717/163 |
| 5,732,234 A | * 3/1998 | Vassiliadis et al. ......... 712/200 |
| 5,742,738 A | 4/1998 | Koza et al. .................... 706/13 |
| 5,761,381 A | 6/1998 | Arci et al. ..................... 706/13 |
| 5,764,857 A | 6/1998 | Suzuki ......................... 706/13 |
| 5,878,428 A | 3/1999 | Copeland et al. ....... 707/103 R |
| 5,941,980 A | * 8/1999 | Shang et al. ................ 712/204 |
| 6,128,607 A | * 10/2000 | Nordin et al. ................. 706/13 |
| 6,128,621 A | * 10/2000 | Weisz ..................... 707/103 Y |
| 6,141,770 A | 10/2000 | Fuchs et al. .................. 714/11 |
| 6,144,954 A | 11/2000 | Li et al. ........................ 706/62 |
| 6,154,877 A | * 11/2000 | Ramkumar et al. ......... 717/114 |
| 6,496,926 B1 | * 12/2002 | Corrie et al. ............... 712/245 |

FOREIGN PATENT DOCUMENTS

| | | |
|---|---|---|
| EP | 0317478 A | 5/1989 |
| EP | 0757313 A | 2/1997 |

OTHER PUBLICATIONS

John R. Koza, "Genetically Breeding Populations of Computer Programs to Solve Problems in Artificial Intelligence," from *Proceedings of the Second International Conference on Tools for AI*, 1990, pp. 819–827.

(List continued on next page.)

*Primary Examiner*—Kakali Chaki
*Assistant Examiner*—Tuan Anh Vu
(74) *Attorney, Agent, or Firm*—Hale and Dorr LLP

(57) ABSTRACT

A fault tolerant software environment, in which various program components (e.g., portions of computer programs, applications, etc) are objectized into entities represented by "codons." This allows for improper syntax to occur, enabling, for example, combinatorial operations such as genetic programming. The present invention also contemplates such features as the ability to probabilistically execute individual codons, to switch between treating information as executable code or as data (or passing over it), provides that the individual codons can be tagged so that additional information can be associated with them, and provides for tagging of the stack.

6 Claims, 23 Drawing Sheets

OTHER PUBLICATIONS

W.R. Pringle, "ESP: Evolutionary Structured Programming," (Research Topic at Pennsylvania State University), www.personal.psu.edu/users/w/r/wrp103/wrp/esp.txt.

John R. Koza, et al., "Use of Automatically Defined Functions and Architecture—Altering Operations in Automated Circuit Synthesis with Genetic Programming," *Genetic Programming: Proceedings of the First Annual Conference*, 1990, pp. 32–40.

L. Spector, "Evolving Control Structures with Automatically Defined Macros," *Working Notes of the AAAI Symposium on Genetic Programming*, 1995, pp. 99–105.

Jon Howell, et al., "Hey, You Got Your Compiler in My Operating System!" www.cs.dartmouth.edu/~jonh/research/hotos1999–howell.htm.

Mark Leone, et al., "A Declarative Approach to Run–Time Code Generation," *Workshop on Compiler Support for System Software (WCSSS)*, 1996, pp. 8–17.

Dawson R. Engler, "VCODE: A Retargetable, Extensible, Very Fast Dynamic Code Generation System," *ACM SIGPLAN Programming Language Design and Development*, 1996.

Rene W. Schmidt, "Dynamically Extensible Objects in a Class–Based Language," $23^{rd}$ Technology of Object Oriented Languages & Systems (TOOLS–23), 1997 http://home4.inet.tele.dk/rws/papers/dslot/dslot.html.

John R. Koza et al., "Genetic Programming III: Darwinian Invention Problem Solving" 1999, Chapter 63; pp. 1041–1045.

Khardon et al, "Partitioning and scheduling to counteract overhead," Parallel Computing, NL, Elsevier Publishers, vol. 22, No. 4, Jun. 1, 1996, pp. 555–593.

M. Ahluwalia et al., "Co–Evolving functions in genetic programming: dynamic ADF creation using GLIB" Abstract. 1999 Institution of Electrical Engineers.

* cited by examiner

ORIGINAL
<A> 50 50  150 150 ELLIPSE
<B> 100 100 200 200 RECTANGLE

CROSS-OVER @ POSITION 1
<A1> 50 100 200 200 RECTANGLE
<B1> 100 50 150 150 ELLIPSE

CROSS-OVER @ POSITION 2
<A2> 50 50 200 200 RECTANGLE
<B2> 100 100 150 150 ELLIPSE

CROSS-OVER @ POSITION 3
<A3> 50 50 150 200 RECTANGLE
<B3> 100 100 200 150 ELLIPSE

CROSS-OVER @ POSITION 4
<A4> 50 50 150 150 RECTANGLE
<B4> 100 100 200 200 ELLIPSE

MUTATION @ POSITION 1
<A5> 05 50 100 100 ELLIPSE
<B5> 01 100 200 200 RECTANGLE

| | STEP 1 | STEP 2 | STEP 3 | STEP 4 | STEP 5 | STEP 6 | STEP 7 | STEP 8 | STEP 9 | STEP 10 |
|---|---|---|---|---|---|---|---|---|---|---|
| A "PERFECT" PROGRAM 202 | a | b | c | 3 | d | 1 | e | f | 2 | 0 |
| AN UNGRAMMATICAL PROGRAM 204 | a | b | 3 | c | d | 1 | e | 2 | f | 0 |

*FIG. 2*

MULTI-PROPERTY CODON INFORMATION TABLE

| | INSTRUCTION 1 | INSTRUCTION 2 | INSTRUCTION 3 | INSTRUCTION 4 | INSTRUCTION 5 | INSTRUCTION 6 | INSTRUCTION 7 | INSTRUCTION 8 | INSTRUCTION 9 | INSTRUCTION 10 |
|---|---|---|---|---|---|---|---|---|---|---|
| CODON NUMBER | 8 | 2 | 10 | 5 | 6 | 4 | 3 | 7 | 1 | 9 |
| ACTIVITY LEVEL | | | | | | | | | | |
| SUBSTITUTE CODON | | | | | | | | | | |
| INSTANCES | | | | | | | | | | |
| TOTAL INSTANCES | | | | | VIRTUAL MACHINE | | | | | |
| ERRORS | | | | | | | | | | |
| TOTAL ERRORS | | | | | | | | | | |
| PARENT AGENT | | | | | | | | | | |
| PARENT INDEX | | | | | | | | | | |
| USER TAG | | | | | | | | | | |
| OTHER USER-DEFINED FIELDS CAN BE ADDED | | | | | | | | | | |

FIG. 6

STARTING PROGRAM:

| MOTHER | 1 | 2 | 3 | 4 | 5 | 6 | 7 | 8 | 9 | 10 |
|---|---|---|---|---|---|---|---|---|---|---|
| | 8 | 2 | 10 | 5 | 6 | 4 | 3 | 7 | 1 | 9 |

REMAINING PIECE:

| A | 1 | 2 | 3 | 4 | 5 | 6 | 7 | 8 |
|---|---|---|---|---|---|---|---|---|
| | 8 | 2 | 10 | 5 | 6 | 4 | 3 | 7 |

STARTING PROGRAM:

| FATHER | 1 | 2 | 3 | 4 | 5 | 6 | 7 | 8 | 9 | 10 |
|---|---|---|---|---|---|---|---|---|---|---|
| | 5 | 4 | 3 | 5 | 3 | 1 | 8 | 7 | 8 | 2 |

REMAINING PIECE:

| B | 5 | 6 | 7 | 8 | 9 | 10 |
|---|---|---|---|---|---|---|
| | 3 | 1 | 8 | 7 | 8 | 2 |

CHILD:

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| | 8 | 2 | 10 | 5 | 6 | 4 | 3 | 7 | 3 | 1 | 8 | 7 | 8 | 2 |

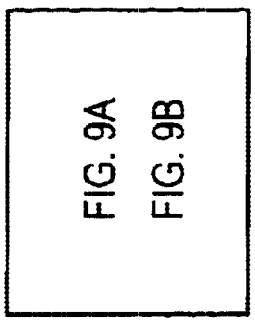
FIG. 9
| STEP 1 | STEP 2 | STEP 3 | STEP 4 |
|---|---|---|---|
| + | COS | * | END |
902
FIG. 9A
| STEP 1 | STEP 2 | STEP 3 | STEP 4 |
|---|---|---|---|
| 4 | 11 | 0.9816 | 2.9448 |
| 7 |  | 3 |  |
904
STACK 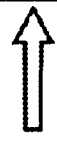
FIG. 9B

TOGGLING SOFTWARE CHARACTERISTICS IN A FAULT TOLERANT AND COMBINATORIAL SOFTWARE ENVIRONMENT SYSTEM, METHOD AND MEDIUM

CROSS-REFERENCE TO RELATED APPLICATIONS

This application is related to the following applications, all of which are filed on the same date, all of which are assigned to the assignee of this application, and all of which are hereby incorporated by reference in their entirety: U.S. application Ser. No. 09/570,604, "TAGGING ITEMS IN A FAULT TOLERANT AND COMBINATORIAL SOFTWARE ENVIRONMENT SYSTEM, METHOD AND MEDIUM"; U.S. application Ser. No. 09/570,605, "FAULT TOLERANT AND COMBINATORIAL SOFTWARE ENVIRONMENT SYSTEM, METHOD AND MEDIUM"; and U.S. application Ser. No. 09/570,606, "PROBABILISTIC EXECUTION IN A FAULT TOLERANT AND COMBINATORIAL SOFTWARE ENVIRONMENT SYSTEM, METHOD AND MEDIUM."

Provisional Applications

This application claims priority under 35 U.S.C. §119(e)(1) of provisional application Ser. No. 60/144,078 (filed Jul. 16, 1999, entitled "System, Method and Medium For Enabling Solutions To Problems"), No. 60/144,204 (filed Jul. 19, 1999, entitled "System, Method and Medium For Enabling Solutions To Problems"), and No. 60/196,084 (filed Apr. 11, 2000, entitled "Fault Tolerant and Combinatorial Software Environment System, Method and Medium"), which are hereby incorporated by reference in their entirety.

BACKGROUND OF THE INVENTION

1. Field of the Invention

The present invention relates to a fault tolerant and combinatorial software environment. More specifically, the present invention relates to a system, method and medium for providing and facilitating a virtual machine and instruction format that facilitates systematic or arbitrary alteration and recombination of portions of code (e.g., programs) at run-time. Instructions that comprise a language that can be used with the present invention can be individualized, allowing for differentiation of each instruction based on, e.g., usage, origin, authorship, or any other user-defined tag. The overall instruction set can be extended to include any object or procedure that can be represented by software. The invention is envisioned for use in applications such as those relating to automatic program creation (e.g. genetic programming), artificial/directed evolution of digital designs (graphic, industrial, mechanical, architectural, engineering, etc.), online adaptive software systems, product and process reliability testing, and simulation of biological, non-linear, and probabilistic processes.

2. Related Art

Numerous computer-programming languages exist today. These include assembly languages, and higher-level languages such as BASIC, Visual Basic, C, C++, Java, etc. Although many computer systems/languages are increasingly compared to DNA and genetics, they do not include many desirable attributes of biological "computation" systems and therefore are deficient for implementing robust, evolvable, life-like computer programs. Specifically in existing computer systems/languages:

Instructions must have proper syntax and execution context.

Instructions cannot be arbitrarily recombined to form new programs.

Superfluous, "junk", instructions are not allowed within programs.

Translation of instructions is deterministic (i.e. it is not influenced by the environmental conditions at runtime nor is it probabilistic)

Although algorithms and programming methods have been specifically developed to emulate the evolutionary process (e.g. "Genetic Algorithms", "Genetic Programming"), these also fail to provide the facilities of natural systems, are often cumbersome to deploy, and are not inherently designed to facilitate evolution. The deficiencies of Genetic Programming as a general purpose platform for evolving solutions to problems and for providing a computational platform with the facilities of molecular biology include:

Programs must be syntactically correct to be bred or evaluated.

Standard features of computer languages, such as looping, conditional logic blocks, and subroutines, cannot be implemented in the customary fashion.

Automatically created programs cannot themselves create, inspect, test, and terminate other automatic programs.

The behavior (number of inputs and outputs) of a program must be known in advance of breeding and evaluation.

Programs can't be marked to identify sites for mutation or other genetic operations.

The genetic lineage of programs can't be determined by examining the programs themselves.

Instructions are not interchangeable or redirectable.

Implementations do not provide for multi-tasking, e.g. the simultaneous evaluation of two or more evolvable programs.

The environment and instruction set cannot be altered while programs are running.

Genetic programming is a biologically inspired general-purpose search technique for discovering solutions to complex problems pioneered by John Koza. Typically implemented in LISP or C/C++, Genetic Programming involves creating a population of syntactically correct programs (in LISP) or data structures (in C), then breeding successive generations of syntactically correct programs or data structures guided by the Darwinian principle of "survival of the fittest." Analogs of naturally occurring operations such as sexual recombination, mutation, and gene deletion are used to generate the programs. Utilizing this approach enables computers to develop solutions to a given problem without advanced knowledge of the form of the solution. For a further description of Genetic Programming see Koza, John R., "Genetic Programming III; Darwinian Invention and Problem Solving" (1999).

FIG. 1 demonstrates the concept of breeding programs. In this example, an application is contemplated that creates a picture by invoking two programs (A and B), which create an ellipse and a rectangle respectively. The concepts of "cross-over" and "mutation" are employed to generate variations of the original picture.

Referring now to FIG. 1, several pictures are set forth where each picture consists of two components, an ellipse (A) and a rectangle (B). In the original representation 102, the application used coordinate data 50 50 150 150 to produce the ellipse, and 100 100 200 200 to produce the rectangle. Below original representation 102 are four exemplary representations depicting the concept of "cross-over." For example, in representation 104, it can be seen that the data elements after the first position have been exchanged. In other words, the four instructions following the first "50" in the ellipse program have been crossed over (i.e., swapped) with the four instructions following the first "100" in the rectangle program. The remaining three other such representations (106, 108 and 110) have resulted from aspects of original representation 102 being crossed over in a similar fashion.

Representation 112 depicts the concept of mutation. Specifically, rather than simply moving around the same data provided by the original representation 102, at least some of the data is mutated (i.e., changed), thus yielding different values, as shown. Thus, from using such concepts as cross-over and mutation, numerous "possibilities" can be created, one or more of which can then be selected by a designer according to his or her personal taste or objectively tested according to a machine-based fitness function such as maximizing the axial symmetry of the picture.

A fundamental problem in using genetic programming to evolve solutions to problems is that programs cannot be arbitrarily recombined without producing software with invalid syntax, nonsense logic, overflow errors, etc. Programs must have correct, balanced, "perfect" grammar to compile or even be interpreted. If a semicolon ";" is missing at the end of a line in a program written in C, or a "next" does not follow a "for" in a program written in BASIC, the software will not execute. For example, the code strip below returns the temperature in Fahrenheit given a Celsius value:

$$F=(9/5*C)+32$$

If a cut is made after the multiply sign and the second part of the piece is recombined in front of the first part, the new code will appear as:

$$F=C)+32(9/5*$$

If this new code were passed to a conventional computer for execution or a compiler for translation, the procedure would terminate at the second instruction ")" which has no meaning without a prior parentheses. Termination is an unrecoverable error that stops the entire computing process in the middle of execution and typically requires human interaction in order to resume. Traditional computing environments are therefore unsuitable for automatically evolving solutions to problems or designing a robust life-like computing system.

As noted above, existing virtual and silicon machines (computers) are not designed to process random code, and will halt execution on unhandled errors. In order to get around this problem, existing implementations of genetic programming impose rigid constraints on program breeding in order to ensure that programs will run. This restricts the space of potential programs to a sub-space of all grammatically correct or "legal" programs. This restriction may hinder the achievement of an optimal solution as all paths must be syntactically correct, thereby prohibiting "short cuts" or "trespasses" through the space of "illegal programs."

In addition to syntactical errors, the arbitrary recombination of programs frequently produces programs containing circular logic and infinite loops that cannot be readily terminated by existing genetic programming systems without human intervention.

Existing computer architectures do no allow for the inclusion of junk instructions which have the potential of later being executed (silent instructions). It has been estimated that as much as 97% of the human genome is comprised of junk DNA or "introns". Although the role of introns is not fully understood, no software system presently allows for their inclusion (Some believe that they provide a pool of genetic material that can be recombined in reproduction to create innovative new genes.) Thus, current software languages prohibit inclusion of "junk", and invalid syntax, both highly desirable capabilities in evolving software if one desires to emulate the processes and capabilities of molecular biology.

As the arbitrary combination of elements in the genetic code of DNA produce useful new parts, these parts can be immediately deployed in the cell or used in reproduction. In the latter case, the new genetic units become part of the overall pool from which succeeding generations are created. However, this real-time extensibility is not a feature of existing software languages. Although it may be possible to detach and update object libraries that a program uses through operating system commands, existing computer languages do not provide functions to programmatically edit and update the elements of the libraries, i.e. prior art languages do not provide features for programs written in such languages to modify themselves at run-time.

The above-noted shortcoming limits the speed that programs can be evolved, as the process must continually be terminated and then restarted at each generation. It also does not enable online adaptation or cooperative computing in which one personal computer is in production while another one is evolving improvements to the library. In general, it would further be desirable to be able to objectize the constituents of a software program (e.g. its key words, constants, operators, any user-defined functions, and combinations thereof) so that their methods can be executed upon being encountered and that new constituents formed during the execution of the program (and those formed during the genetic algorithm process) can be objectized without terminating the program.

The existence of the deficiencies mentioned above has meant that certain other related deficiencies also exist. For example, prior art computer systems are highly deterministic. Once compiled, a program's behavior is set for all time. A more flexible system would allow the execution of code to be dependent on the context (configurable) of the program at run-time, just as the expression of a gene is dependent of the circumstances of the cell at the time of translation. Similarly, for modeling and theoretical purposes, random numbers are often used to, e.g., decide whether a binary state is on or off. Taking that concept a step further, it may be useful under certain circumstances for a specified constituent of a computer program (e.g., a "+" sign) to be randomly executed (i.e., sometimes the constituent is executed when it is encountered in a computer program, and sometimes it is not). Building in the ability to set and reset an instruction's probability of execution would also help facilitate learning and program self-modification, as broken code could be deactivated while good code could be executed with a 100% probability. Were such deactivation of portions of code allowed to occur in current software environments, the program may become syntactically incorrect, thus generating an error.

Another deficiency of the prior art is the lack of ability to dynamically switch between treating information as executable code and treating it as data. A remedy to this deficiency would find use in automatic program generation. For example, the ability to switch between data and program modes would provide greater flexibility in creating, inspecting, and testing programs, and passing programs to other programs. For example, in normal execution mode, the program "+−*/" would generate four successive math errors. However, if the constituents of the program were treated as data where each had a corresponding instruction number (e.g., 395, 396, 397, 398), the data could then be manipulated mathematically and utilized as a toolkit for synthesizing mathematical programs, or used as a template for searching programs.

Programming languages such as LISP have a limited ability to switch between data and executable code mode in that it can manipulate text-based items rather than processing them. However, LISP does not assign numerical designations to all of its instructions. Thus, it does not manipulate the items on a numerical level, and would be deficient in implementing the concepts mentioned above.

Present day microprocessors and virtual machines utilize a set of instructions that point to one precise action or object. Distinguishing between instances of machine instruction is not provided. For example, a particular instruction might point to the "add" operator, but there is no way of tagging one program's "add" operator so that it is distinguishable from another's. This feature would be useful in tracking instruction lineage in genetic programming. In examining the instructions of the offspring after breeding two programs, the determination of what instruction came from which parent would be highly desirable.

The ability to tag and thereby individualize instructions would have many uses. For example, the authorship of code segments could be marked and usage statistics kept. Mutation rates could be assigned to each individual instruction. Unutilized features of a program could be identified and spliced out, while highly used areas could be selected for breeding or identified for software pricing. The inability to individualize each instruction in current environments thus limits the possibility to analyze, study, research, modify, and price programs.

From the above, it can be appreciated that "prior art" computers (virtual and silicon) and software languages are deficient in emulating many of the characteristics that make up the evolutionary process and do not allow the deliberate or arbitrary recombination of software instructions. Existing computers terminate execution on unhandled errors and are therefore not fault tolerant. Code cannot be arbitrarily reassociated. Unused code (analogous to introns) cannot reside embedded in software programs as the code itself lacks the facility to determine which sections to execute or ignore. Software languages cannot be compiled or interpreted if syntax errors exist. Extant languages do not permit real-time extensibility, the ability to add new functionality without stopping execution of the program and recompiling. Existing machine instructions which make up software languages and are processed by the computer are uni-dimensional and do not provide for individualization (e.g., tagging). These weaknesses demanded the development of a new computer and software environment to overcome the stated shortcomings.

SUMMARY OF THE INVENTION

The present invention overcomes the deficiencies mentioned above by providing a fault tolerant software environment. In particular, embodiments of the present invention envision that various program components (e.g., portions of computer programs, applications, etc) are objectized into entities represented by (and referred to herein as) "codons," as described herein. Further, it is thus envisioned that a computer program, comprising a plurality of codons, is executed codon by codon utilizing a virtual machine format. This is implemented such that, for example, executing a codon that would not have been expected in view of previously-executed codons (e.g., a codon requiring two inputs is executed without those inputs being available) does not, by itself, cause the program containing the codon to crash or terminate. Instead, the program will continue to run, albeit possibly without generating a meaningful result. This thus allows for improper syntax to occur, allowing for the inclusion of "junk" code.

The fault-tolerant aspects of the present invention enable, for example, combinatorial operations such as genetic programming. In the environment as envisioned herein, various portions of a computer program can be separated and spliced together, creating new and potentially different functional portions. As these portions are created, embodiments of the present invention contemplate that they can immediately be used in (and as part of) the program without concern for whether they are syntactically correct, and without having to terminate the execution of the program to re-compile it.

Embodiments of the present invention also contemplate the ability to probabilistically execute individual codons. That is, a codon can be selected to, for example, execute only a certain percentage of the time that it is encountered during execution of a program. The fault-tolerant aspects provided by embodiments of the present invention facilitate this, since the non-execution of a codon could otherwise lead to syntactical errors and adverse results. In general, probabilistic execution can allow for, for example, an enhanced capability to facilitate various types of modeling.

In addition, embodiments of the present invention also provide the capability of being able to switch between treating information as executable code or as data. An advantage to being able to treat programs as data is, for example, that it allows for a greater ability to execute programs in a genetic programming environment. Furthermore, treating programs as data can also facilitate program self-analysis, self-modification and the ability for programs to readily create other programs. A silent mode, as contemplated by embodiments of the present invention, also facilitates these concepts by allowing specified codons not be executed.

Also, embodiments of the present invention provide that the individual codons can be tagged so that additional information can be associated with them. This information can include any number of attributes, such as the number of times the codon was encountered, its origin, etc. Thus, in one sense, the individual codons become "read-writable," where information pertaining to them can be stored, and then read for subsequent purposes.

Further, embodiments of the present invention provide for stack tagging capabilities, which facilitates analysis of functional portions of a program.

The present invention also contemplates numerous additional aspects, which will be described further below.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which:

FIG. 2 depicts two exemplary programs demonstrating fault-tolerant aspects contemplated by the present invention.

FIG. 6 depicts an exemplary multi-property codon information table, as contemplated by embodiments of the present invention.

FIG. 8 depicts a diagram disclosing an example of the genetic programming process.

FIG. 9 depicts a diagram disclosing the concept of grammar repair.

DETAILED DESCRIPTION

Figure 1:
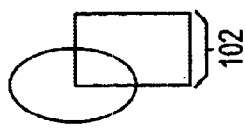
FIG. 1 depicts an example of the concept of breeding programs in a genetic programming environment.
Figure 1:
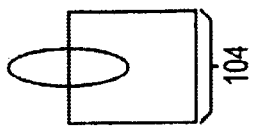
Figure 1:
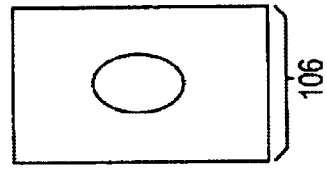
Figure 1:
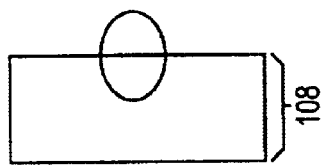
Figure 1:
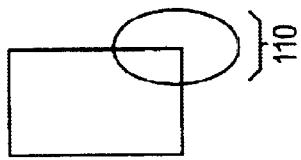
Figure 1:
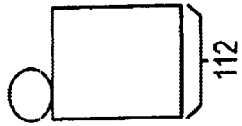

The present invention relates to a fault tolerant and combinatorial software environment. More specifically, the present invention relates to a system, method and medium for providing and facilitating a virtual machine and instruction format that facilitates systematic or arbitrary alteration and recombination of portions of code (e.g., programs) at run-time. Instructions that comprise a language that can be used with the present invention can be individualized, allowing for differentiation of each instruction based on, e.g., usage, origin, authorship, or any other user-defined tag. The overall instruction set can be extended to include any object or procedure that can be represented by software. The invention is envisioned for use in applications such as those relating to automatic program creation (e.g. genetic programming), artificial/directed evolution of digital designs (graphic, industrial, mechanical, architectural, engineering, etc.), online adaptive software systems, product and process reliability testing, and simulation of biological, non-linear, and probabilistic processes.

The present invention accomplishes this by allowing the various features of a programming language (e.g., operators, constants, variables, text strings, keywords, etc.), combinations thereof (e.g., lines of code, subroutines, functions, entire programs, etc.) and even aspects of other programs (e.g., the functions associated with third party software) to be "objectized" and assigned some unique designator (e.g., a unique number). Consequently, it is envisioned that virtually any software-related entity (or any entity that can be represented by software) can be assigned such a designator, and that the address location of the methods relating to that entity can be stored in, e.g., a master table, where the assigned number can be used as a key to access and execute the methods (and to indicate other attributes of the entity). These assigned, representative designators (and their associated methods) will be referred to hereinafter as "codons." The various entities possibly comprising groups of codons (e.g., lines of code, functions, whole programs, etc.), while potentially being codons, themselves, are often also referred to herein as "agents." The term "codon" itself is drawn from biology, but in many cases the term "instruction" (which also envisions the combination of multiple smaller instructions) can be substituted.

Thus, from the above, it is envisioned that the present invention contemplates that virtually any entity that can be represented in software can be objectized and become a codon. A program (which comprises codons, and which itself may be a codon) is executed codon by codon. If the program is syntactically incorrect, the program will still continue to run (i.e., it will not cause the system to crash), but it may produce meaningless results or no tangible result at all. This enables certain advantageous results to occur, including those involving genetic programming. Other advantages and applications will also be discussed herein.

A feature contemplated by embodiments of the present invention with relation to the codon scheme mentioned above is the ability to record various specific aspects of individual codons. More specifically, it is envisioned that each instance of a codon has associated with it a number of fields that can indicate any number of properties or characteristics about the codon. For example, in a genetic programming environment, it may be advantageous to keep track of where (i.e., from what piece of code) a newly created (i.e., spliced together) piece of code came from, and in particular, where each codon in the newly formed piece of code originated. Consequently, for each codon in the newly formed code, the codon of the entity from which the newly created codon came will be stored and in some way associated with the codon in the newly formed code. This can be done, e.g., in a table format.

Another feature contemplated by embodiments of the present invention includes the ability to treat the codons as data, rather than as just the function that they otherwise represent. Again, this facilitates program self-modification, self-analysis, and genetic programming, and has other advantages that shall be discussed further herein.

An illustration of the general nature of the fault tolerance contemplated by the present invention is described with regard to FIG. 2. In this Figure, as well as in the description of subsequent ones, the programs are ordered and explained using the concept of post-fix or "reverse polish notation," wherein, e.g., operators are positioned after the arguments that they will be using (e.g., x+y is represented as xy+). Of course, it should be understood that this is just by way of example, and that the various features and inventive concepts of the present invention are not limited to the use of such notation.

Referring now to FIG. 2, two programs (202 and 204) are shown, each having ten steps. The letters shown in each program represent arguments (e.g., constants) that are used as input to, e.g., subsequent operations (such as an addition operation), represented by the numbers in the program. Each number, in addition to merely signifying the existence of an operation, indicates the number of arguments required by the operation. (Of course, the numbers could represent any type of entity requiring arguments.)

In the example of FIG. 2, the first program is depicted as a "perfect" program 202, so called because all of the operations have the correct number of arguments associated with them (it is assumed in this example that the operations are subroutines, i.e. they do not return anything). Specifically, in "perfect" program 202, a, b, and c (of steps 1–3, respectively) represent three arguments, while the number "3" of Step 4 represents an operation requiring exactly 3 arguments. Step 6 depicts an operation requiring one argument, which is provided in this example by argument "d" of Step 5. Similarly, the operation of Step 9 requires two arguments, which are provided by arguments e and f of steps 7, and 8, respectively. Consequently, each operation has the number of arguments that it expects.

In conventional software environments, "perfect" programs of the nature described above are expected, since conventional programming languages expect that their operations, functions, etc., will receive the anticipated number of arguments. Otherwise, an error will occur and the program will not execute. For example, if the "2" at Step 9 of the "perfect" program 202 represented the "+" operation, then two arguments would be expected. If one of the arguments were not present, then an error would occur and the program would not execute. This would be the case whether the program were compiled (in which case an error message would likely occur during the compilation) or if the program were interpreted. In an interpretive environment, the error would typically occur while typing in the lines of code in the program (if the editor checked for such occurrences) or at run time (e.g., where variables are used in the equations, but at run time no input for them is provided). In a compiler setting, the error would typically occur during compilation or at run time. In most conventional situations, such errors and the cessation of execution resulting there from is the desired result. However, in situations where automation, robustness, and flexibility are desirable (e.g., genetic programming) the conventional methods are inadequate.

In addition to the "perfect" program, an "ungrammatical" program 204 is also shown in FIG. 2. Here, the "ungrammatical" program 204 is shown to contain operations that do not have the expected number of arguments associated with them. For example, in Step 3 of "ungrammatical" program 204, the operation requires three arguments, but is only provided with two (specifically, a and b). Other operations in the "ungrammatical" program 204 are similarly mismatched. In conventional programming environments, the ungrammatical program would not run (e.g., it would yield fatal run time and/or compilation errors). However, the present invention will continue to run under such circumstances. While such a situation may ultimately generate nonsense or simply no value at all, the fact that it continues executing as it attempts to yield a meaningful result is of great value in many situations, some of which will be discussed herein.

For purposes of illustration herein, various features of the present invention, through several of the following Figures, will be described in the context of an exemplary computer program. The function of the program is to convert a number representing a temperature in degrees Celsius into one representing degrees Fahrenheit. The program contains the following general steps:

1. Obtain the value of a cell in a spreadsheet, where the cell location is designated by the row indicated by a first argument and the column indicated by a second argument. (The value in the spreadsheet cell is the number representing a temperature in degrees Celsius.)
2. Divide a third argument (specifically, the number "9") by a fourth argument (specifically, the number "5").
3. Multiply the quotient of the previous division step (specifically, 1.8) by the number obtained in the spreadsheet cell.
4. Add a fifth argument (specifically, the number "32") to the product of the previous multiplication step. (This will yield the temperature in Fahrenheit.)

While various features of the present invention will be illustrated using this program, it should be understood that the present invention is by no means limited to aspects of this example.

As indicated above, embodiments of the present invention contemplate that the meaning (i.e., interpretation) of each codon can be stored in some type of structure such as a master table. That way, when a codon is encountered during execution of the program, its interpretation (and possibly various characteristics of the codon) can be looked up and obtained. An example of such a look-up table is depicted as a Master Codon Information Structure Table (hereafter master codon table) 304 shown in FIG. 3.

Figure 3:
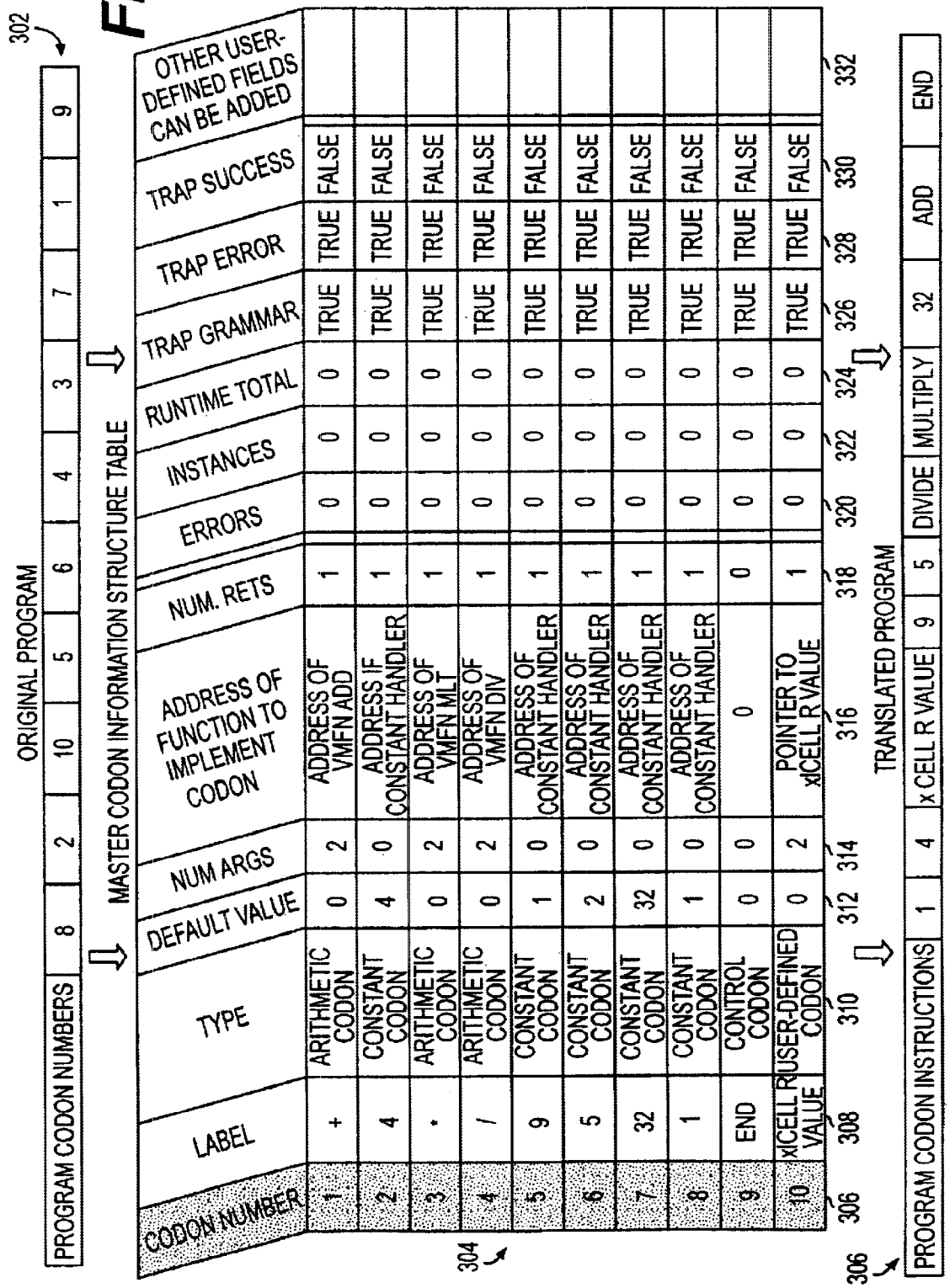
FIG. 3 depicts an exemplary master codon information structure table, as contemplated by embodiments of the present invention.

Referring now to FIG. 3, master codon table 304 is shown containing ten (10) codons (numbered 1 through 10), as indicated by a codon number column 306 in the master codon table 304. The entity that each codon number specifically represents is in the "label" column 308. Thus, codon number 3 represents the "*" operation (i.e., multiplication), codon number 5 represents the constant "9", codon number 10 represents a function called "xlCell.R.Value" (which is an abbreviation for Excel read value), etc. (In this example, the Excel program from Microsoft Corporation is mentioned, but any other functionally similar program could also have been used.) The codons shown and described in this Figure were specifically chosen to illustrate the implementation of the above-mentioned temperature conversion program, though it should be clearly understood that the present invention contemplates that the master codon table can contain any number and different types of codons (pre-set or user-defined).

The "original program" 302 of FIG. 3 is an exemplary sequence of codons envisioned to implement the temperature conversion program mentioned above. Thus, when this program is executed, the present invention begins by evaluating what each codon represents (using the master codon table 304), executing that codon, and then continuing in that way throughout the entire program. Consequently, the process begins by obtaining the firstcodon number in the program (in this example, the number "8"). Turning then to the master codon table 304, and particularly codon number column 306 and label column 308, we see that the number 8 represents (i.e., has been assigned to) the constant "1."

Continuing with the processing of codons in original program 302, the next codon number encountered is "2" which, when compared against the master codon table 304 (and particularly with reference to codon number column 306 and label column 308), can be seen to have been assigned to the constant "4." Evaluation of the next codon number (codon number "10") indicates that it has been assigned to represent the function "xlCell.R.Value", which obtains the value of an Excel spread sheet at the cell position indicated by a first and second argument (e.g., row 1, column 4). Eventually, all codon numbers in the original program 302 are evaluated against master codon table 304 and executed. In this example, from using label column 308 of master codon table 304, a translation of the original program 302 can be seen as translated program 306.

In the example shown in FIG. 3, the "original program" 302 is shown to be in the form of codon numbers, as would be the case for programs that are manipulated in a genetic programming environment in, e.g., the manner discussed further below. However, human programmers typically write programs using programming languages such as C, C++, Visual Basic, JAVA, etc, to produce what is generally referred to as source code. To accommodate human programmers, embodiments of the present invention contemplate the use of a function that takes the source code as input and, using the master codon table 304, converts the source code into corresponding codon numbers. As a result, the source and codon representations of programs are intra-convertable. Programs can be stored, manipulated and executed in either form (i.e., either in codon number form or, e.g., human readable text). Storing programs as text enables the codon numbers to be changed over time and eases sharing of programs among virtual machines which could have different codon numbers for the same operation. From there, the various features of the present invention discussed herein can be implemented. Of course, it should be understood that embodiments of the present invention contemplate that various other types of implementations are also possible.

It should also be understood that the present invention contemplates that there are any number of ways for codons to be assigned a codon number and registered in the master codon table 304. Three examples are mentioned here. First, a user can predefine certain codons by embedding their methods at some location within the programming environment, placing that location address in the master codon table 304 (discussed below) and re-compiling the entire compiler or interpreter that is used to facilitate the virtual environment (i.e., to execute the codons).

Second, the present invention also contemplates that an agent can be written by a user, randomly or systematically generated or evolved, and immediately added to the virtual machine instructions set (e.g., immediately added to the master codon table) using, e.g., a "DefineAgent" function, mentioned below. In this way, the programming language need not be re-compiled. Doing this allows the newly generated items to be used, immediately facilitating real time extension of the operating environment and the ability to map old agents to newly created agents. In addition, it, e.g., enlarges the overall pool from which succeeding generations can be bred while performing genetic programming. This concept can also be used to automatically and immediately operate on codons in master codon table 304 that are used in a user-created program.

Third, it is also contemplated that one can encapsulate third party compiled code (in real time) into a codon provided that a header file and library file (object file) is available. This involves inspecting the header file, and recording the attributes of the desired "extensions" in a data structure maintained by the virtual machine and loading the function's machine instructions into memory. The function (i.e., a function which is part of the third party code) would be assigned a codon in the typical manner, and given a special type (e.g., "user-defined" codon, as mentioned further below). When that codon is encountered, embodiments of the present invention contemplate that the codon is passed to a special wrapper function which checks if the appropriate arguments and types are available. If so, the wrapper function extracts the arguments from the virtual machine's data stack, casts them into the appropriate type/form (data types) and places them on the microprocessor's stack. The virtual machine invokes the third party function by transferring control to the memory address where the function was stored previously. The value returned by the function, if any, is converted into the virtual machine's data representation format and placed on its stack similar to any other intrinsic virtual machine function.

Referring still to FIG. 3, in addition to providing a translation for the codon numbers of a program, the present invention also contemplates that various attributes and characteristics of the codons can be recorded and retrieved for a variety of purposes. In the example depicted by master codon table 304, information relating to these attributes and characteristics are recorded in and retrievable from the subsequent columns. Specifically, embodiments of the present invention envision the existence of a "type" column 310 indicating the particular type of codon at issue. For example, the "+" codon is an "arithmetic codon" type, while codon number 2 (which is the number 4) is shown as type "constant codon." In looking at the type column 310 for this exemplary program, it can be seen that most of the codons are either of an arithmetic or constant type. However, codon number 9, which is the "end" statement, is a "control" codon, while codon number 10, which is the function for obtaining the cell in an Excel spread sheet, is a user-defined Visual Basic application input-output codon type ("Visual Basic" is a programming language from Microsoft Corporation of Redmond, Wash.). In general, the present invention contemplates the use of various user-defined functions, as well as contemplates that any number of other types of codons can exist in addition to those specifically listed in the type 310 column. The type field, as envisioned by embodiments of the present invention, allows assigning codons to particular categories (classes) which is highly useful in breeding and analyzing programs and implementing context sensitive behavior. Embodiments of the present invention contemplate that the entries in type column 310 can, e.g., be entered automatically based upon the information in other columns such as the label column 308 (using, e.g., an additional table that matches a label with a type) and/or can be entered manually by a user.

Column 312 of master codon table 304 indicates the default value of the codon. In general, it is envisioned that fundamental types (integer, double, etc.) which can be stored within the value field are given their appropriate numeric value, while the codons representing arithmetic operations, which do not need a "value" field, are given a value of zero. For strings, structures, arrays, and other derived data types which are too large to be stored within the value field, the value field contains the address of the object (e.g., data) or the address of an information structure about the object. Different numbering schemes for various purposes are also contemplated.

The column designated "Num Args" 314 indicates the number of arguments that a particular codon expects. For example, the "+" operator expects two arguments, as do the "*", "/", and "xlCell.R.Value" codons. However, it should be understood that the present invention contemplates use with operations and functions requiring any number of arguments.

Column 316 indicates, e.g., the address where the actual code to implement the operator or function exists (which could be, e.g., a local or remote address). Thus, for the addition operation, a pointer to a virtual machine function for "add" is given. Similarly, the address of a function for handling constants (such as the constant 4, represented by codon number 2) is given. The behavior of each codon is implemented by a user-defined virtual machine function to provide greater flexibility. For instance, constants can be stored in remote databases, hardware, etc. rather than in RAM. This functional design also enables one to remap or replace the behavior of a function at run-time.

With regard to, e.g., virtual machine functions, embodiments of the present invention contemplate that they can be written in any number of programming languages, or the like. It is envisioned, for example, that such functions may then be compiled, stored in machine-readable format, and executed when needed. To enhance the interchangeability of functions and to reduce the amount of idiosyncratic information which must be stored in order to call functions, embodiments of the present invention further contemplate that the functions can have a standard interface form so that additional functions can be readily generated and used. Embodiments of the present invention contemplate that, while most codons are associated with a unique function, some codons such as constants, matrices, and arrays are handled by a single function. To implement the latter, the codon number and/or the value field is envisioned to contain the instance or "case" information which the virtual machine function needs to lookup, retrieve, manipulate, and replace the unique data associated with the codon. An exemplary form is as follows: "T_DATA_INDEX CALL_STYLE vmFN(T_VMRECORD*pvm)." In this form, the "pvm" represents the pointer or memory address of a virtual machine state structure, T_VMRecord, allowing full access to virtual machine information. Providing complete access to the virtual machine state(s) allows the programmer to create functions which manipulate the virtual machine itself, such as control flow logic (e.g. do..loop), branching, starting and killing sub-agents, inspecting and modifying programs, and so forth. In situations where this level of visibility is not required, a simplified format is envisioned in which only information pertinent to the evaluation of a codon is provided, such as the codon number, an argument buffer, the number of items in the argument buffer, and an address of a return buffer.

"T_DATA_INDEX" is an implementation-defined integral data type such as "long" whose value is set to the number of items in the return buffer or to a negative number to indicate that an error occurred. For example, a "−1" could indicate that an error occurred (usually due to invalid arguments) and the return buffer would be empty. It is further envisioned that there would exist a table of errors which would contain error numbers and error descriptions which could be extended during runtime. A return value of "0" could indicate that the virtual machine function or procedure was successfully executed, but that no values were returned (i.e. the return buffer is empty). Any integer greater than "0" could indicate that the function was successfully executed and the integer returned would indicate the number of items in the return buffer. The value and type of the items could then be accessed in the return buffer. While embodiments of the present invention envision that the argument data types can be determined by the evaluating functions by passing arguments to and from the virtual machines in the form of variants and providing mechanisms for retrieving and converting fundamental and structure types into variants, other possible schemes are also contemplated, including maintaining a table in the virtual machine of the type of arguments each function takes. In the former case, type checking is carried out by the virtual machine functions, in the latter case, the virtual machine itself determines whether the appropriate arguments are available.

The following represents an exemplary function for performing addition. The vmfn_ADD( ) is passed a pointer to the virtual machine record that contains the argument and return buffer, vmArgs and vmRets respectively. The vmfn_Add function adds the two passed arguments and if the result is finite loads the result into the return buffer by setting the value field to the result and the type to "double", identifies it as a "double" and returns the value "1" indicating one item in the buffer. If the result is not finite, then an error has occurred. If the arguments are both negative in value then the function returns L_NegOverflow, and if the two arguments are positive then the function returns L_PosOverflow.

```
========================================================
#include "Lamarck.h"
#define L_ErrorNegOverflow    -1
#define L_ErrorPosOverflow    -2
--------------------------------------------------------
long vmfn_ADD(T_VMRECORD *pvm)
{
--------------------------------------------------------
double y = a + b;
   if (_finite( y))
   {
      pvm->vmRets[0].value = y;
      pvm->vmRets[0].type = ID_DOUBLE;
      return 1;
   }
   else                     /*An error has occurred*/
   {
      _clearfp();           /*Clear floating point register*/
      if (a < 0 && b < 0) return L_ErrorNegOverflow;
      if (a > 0 && b > 0) return L_ErrorPosOverflow;
   }
}
========================================================
```

The num rets column 318 of FIG. 3 indicates the number of values that can be expected to be returned when a codon is executed. In this particular example, with the exception of the "end" codon, all of the codons will return one value.

The errors column 320 indicates the number of errors that occurred due to the execution of a particular codon. Embodiments of the present invention contemplate that various different types of errors can be kept track of using column 320. In addition, embodiments of the present invention also contemplate that multiple error columns can be utilized to keep track of different types of errors separately. One example of a type of error that could be kept track of is where the proper number of arguments for a codon does not exist. Thus, where a "+" codon is encountered and only one argument is available when that codon is executed, an error may be generated (even though as indicated above, the program would continue to run, and as such might not be viewed as a true "error"). Examples of other types of errors would include division by zero, where a division operator is concerned (in this example, codon number 4).

Instances column 322 indicates the number of times that a given codon has been executed. This can be kept track of from one or more perspectives. For example, the present invention can keep track of the number of times a codon is encountered for all programs running within a given environment (e.g., it would keep track of the total number of times a codon is encountered in all programs) and/or the total number of times the codon is encountered over some set time period or within certain select units (e.g., within one or more specified programs, subroutines, etc). Various other criteria for tracking the number of instances are also contemplated by embodiments of the present invention, as well. As with errors column 320, it is envisioned that multiple instance columns can also be utilized.

As will be discussed further, keeping track of the number of instances allows the present invention to, e.g., determine which portions (e.g., features, subroutines, etc.) of a program are being used. This has numerous potential applications, including those relating to the rental of software (e.g., a user can be charged based upon the features that he or she actually uses). Keeping track of the instances can also be used for debugging purposes, and can be used to differentiate one initially-identical program from another based upon how each user has utilized their copy of the program.

The run time total column 324 indicates the total time of execution for a codon during, e.g., the execution of a program.

The next three columns indicate whether or not certain types of events (e.g., errors) should be handled for the given codon. TrapGrammar column 326 will be set to "true" or to the value of a grammar correction codon, if it is desired that grammar errors be corrected. An example of a grammar error is where a function that is expecting a numeric argument instead receives something else, such as an operation (e.g., as would be the case for the program "+cos" where the cosine expects a number rather than a "+").

TrapError column 328 relates to whether control should be transferred to a handling function on encountering an error. TrapSuccess column 330 relates to whether control should be transferred to a handling function on encountering a success, which can be useful in the context of, e.g., probabilistic execution, as will be described further below. In this particular example, all codons in that column 330 are set to "false," but if probabilistic execution were implemented with regard to a particular codon, one might set the TrapSuccess entry for that codon to "true" or to a specific handling codon, so that some context specific logic can be executed.

Some additional columns (not shown) also contemplated by the present invention include those that would indicate the author/creator of a codon. For example, a program could be assigned a certain identification number, and if that program should create a codon (using, e.g., "define agent" function, discussed below), the identifying number of the program would be placed in the appropriate spot in the author/creator column. Another contemplated column involves access privileges for a codon, where, e.g., only certain programs would have access to certain codons. Thus, to be given access to a codon, a program's identification number, for example, could be placed in the appropriate location in a "privileges" column. Similarly, in multi-tasking environments, it might be useful to include a "Mutex" or mutual exclusion field indicating that a codon was in use, and/or, that is was temporarily locked.

The present invention also contemplates the flexibility to allow users to define their own columns that can be associated with the codons as well. This is indicated by column 332.

In general, the various columns mentioned above are exemplary in nature, and the present invention contemplates that different columns (and/or the same ones used in somewhat different functional ways) can also be used.

Figure 4:
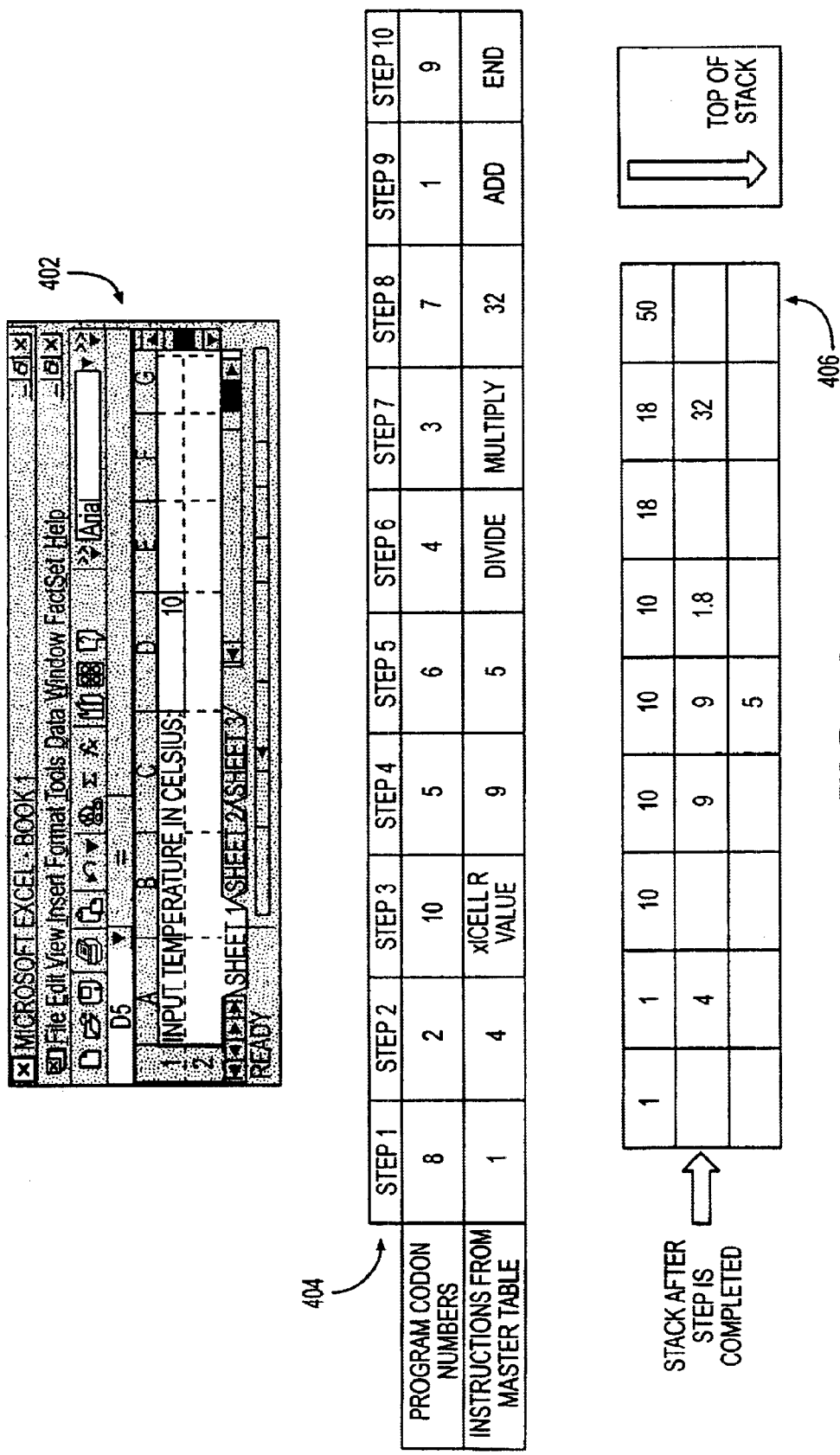
FIG. 4 depicts an exemplary manner of execution of a program, as contemplated by embodiments of the present invention.

An exemplary manner for execution of the program described above for converting Celsius to Fahrenheit will now be described and explained with regard to FIG. 4. Referring to FIG. 4, an Excel spreadsheet 402 is shown, where the number 10 was placed in the cell at the first row, fourth column. Referring to the program depicted at 404, the various steps of the program and results of each step will be explained in conjunction with master codon table 304 of FIG. 3.

Referring to the program at 404, the first codon encountered during execution of the program is codon number 8. When this codon is evaluated against master codon table 304, it is determined that it represents the numeric constant "1." The result of encountering and executing a constant is merely to fetch the constant and place it on a stack in memory. Thus, the result of Step 1 is that the number 1 is placed on a stack 406, as shown. Consequently, the stack 406 shows the number of items that are on the stack after the completion of each step (note that the last element added to the stack is at the bottom). (As will be shown with regard to FIG. 5 below, embodiments of the present invention contemplate that the stack consists of a set of uniform "items" or structures which contain value, type, and other tagging information. The items are an extension of the "variant" or "union" data type, as they can encapsulate a multiplicity of fundamental and derived data types.)

In Step 2 of program 404, codon number 2 is encountered which, according to the master codon table 304, represents the numeric constant 4. Having thus encountered another constants the present invention also places this number on the stack 406. Consequently, the result of Step 2 is that the numbers 1 and 4 are on the stack 406, as shown.

In Step 3 of program 404, codon number 10 is encountered which, according to the master codon table 304, represents the user-defined function for obtaining the value of a cell of a Microsoft Excel spread sheet. As per this exemplary function, the specific cell location in the spreadsheet at which the value is to be obtained is designated by two arguments, where the first argument represents a row number and the second represents a column number (note that the Num Args column 314 of master codon table 304 contains a "2" in the "xlCell.R.Value" entry). As embodiments of the present invention contemplate that operations, functions, etc. receive their requested arguments from the stack 406 (either, e.g., directly via a stack pointer, or a by calling a stack pop function, or indirectly via an argument buffer which would contain copies of the pertinent stack items) the Excel function takes the number 4 off of stack 406 as its second argument, and the number 1 off of stack 406 as its first argument. Thus, the value of the cell located at column 4, row 1 is obtained. In this example, the value at that location is the numeric constant 10. Consequently, the result at Step 3 is that the 4 and 1 will have been removed off the stack and replaced by the numeric constant "10."

In Steps 4 and 5 of program 404, codons 5 and 6, respectively, represent the numeric constants 9 and 5, respectively, and each of these constants is placed upon the stack 406, as shown.

In Step 6, codon number 4 is encountered, which represents a "divide" operation. The divide operation takes two arguments and divides the first by the second. Thus the top and penultimate items on the stack 406 (in this example, the numeric constants "5" and "9") are divided to yield the numeric value "1.8". Consequently, this result is then placed on the stack 406, as shown in Step 6.

In Step 7, codon number 3 is encountered, which represents a "multiply" operation. In this example, this operation causes the top and penultimate items on the stack 406 (in this case, 1.8 and 10, respectively) to be multiplied together, resulting in the number 18. Thus, the result of Step 7 is to place "18" on the stack 406.

In Step 8, codon number 7 is encountered, which represents the numeric constant "32". Consequently, the result of Step 8 is that "32" is placed on the stack 406, as shown.

In Step 9, codon number 1 is encountered, which represents an "add" operation. Consequently, the top and penultimate items on the stack will be added together, resulting in the numeric constant "50," as shown.

While the use of stack 406 and its utilization as described above is as contemplated by embodiments of the present invention, it should be understood that the present invention also contemplates other methodologies for executing programs and implementing the virtual machine contemplated herein. This includes, for example, concepts using conventional and pre-fixed notation rather than post-fixed notation.

Figure 5:
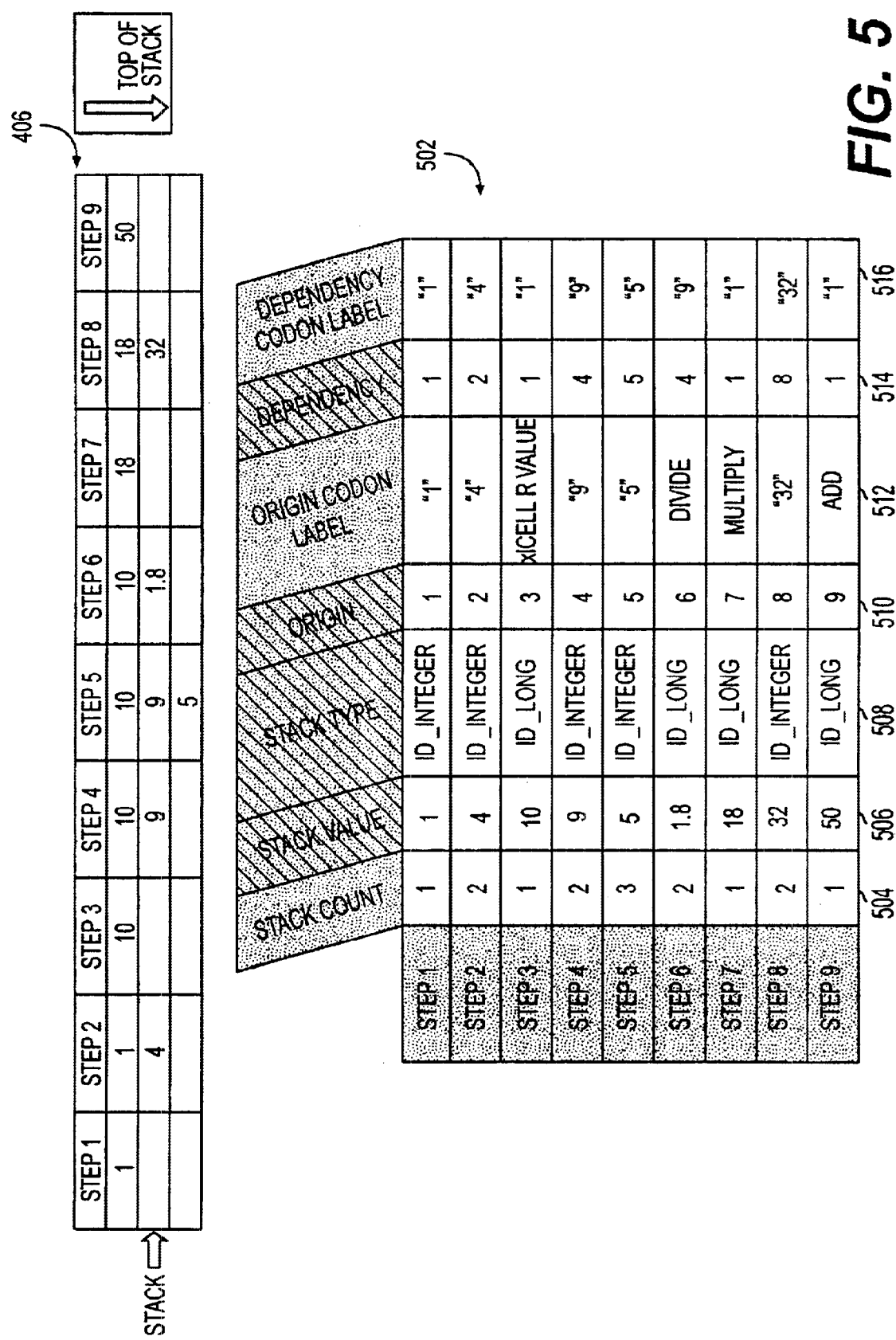
FIG. 5 depicts an exemplary stack tag table, as contemplated by embodiments of the present invention.

Embodiments of the present invention contemplate that the items that are placed on the stack 406 (or on similar structures) can be "tagged" such that they are associated with various additional items of information. Embodiments of the present invention envisioning the tagging of items on stack 406 are described with regard to FIG. 5. Referring now to FIG. 5, an exemplary stack tag table 502 is shown containing information relating to the stack 406 and values thereon (particularly the value at the top of the stack) at each step in the program. A stack count column 504 indicates, for each step, the number of items on the stack after the completion of each step. Thus, in Step 1, it is shown that there was one item on stack 406, in Step 2 there were two, in Step 3 there was one, etc.

A stack value column 506 indicates the value of the top item on the stack 406 at each given step (which, as generally envisioned herein, is considered to be the "value" of the stack for a given step). For example, at Step 5, the stack value column contains a "5" (indicating that the value of the stack 406 at that step was "5"), while at Step 6 (after the division operation) the value of the stack 406 as shown in stack value column 506 is "1.8."

The remaining columns in stack tag table 502, discussed below, relate in this example to the value of the stack (i.e., the top-most value) for each given step.

The "stack type" column 508 indicates the type of value (e.g., the fundamental storage class, integer, double, etc., or object type, or codon type for a derived or pointed to data type) for each step. Thus, the value of the stack at Step 5 (i.e., the number "5") is shown to be of type "integer," whereas the value at Step 6 (i.e., the number "1.8") is of type "long."

The "origin" column 510 indicates the step in the program at which each item on the stack was generated.

The "origin codon label" column 512 indicates the codon that generated the value. For example, at Step 3, the number "10" is shown to have been generated by the "xlCell.R-.Value" function, while in Step 8, the number "32" is shown to have been generated simply by the encounter of the numeric constant 32.

The dependency column 514 indicates the earliest position in the program that each value on the stack relied upon for its calculation. In some cases, (for example, looping logic) it may be useful to also record the step. For example, in Step 2, the value of stack 406 (which is "4") came from the numeric constant 4 encountered at Step 2 of the program at 404 of FIG. 4. Thus, in Step 2, the dependency column 514 has a number 2 (indicating that Step 2 is the earliest position in the program 404 that the value of the stack 406 at that step depends upon for its existence). In Step 6, the value "1.8" came from the division of 9 by the number 5. Thus, since the earliest of the numbers relied on for this calculation was the number 9 of Step 4, a "4" is in the "dependency" column 514 for step 6. In Step 9, the entry in the "dependency" column 514 is a "1," indicating that the first step that was relied upon to produce the number "50" was Step 1.

The "dependency codon label" column 516 indicates the value of the stack at the step indicated by the corresponding dependency column 514.

It should be understood that the items depicted in the stack tag table 502 are by way of example. Other types of information relating to the stack 406 can also be associated with the various values thereon, and added as columns in stack tag table 502. In addition, other types of structures for recording and retrieving information relating to values on the stack 502 (or similar items) are also contemplated by embodiments of the present invention.

Embodiments of the present invention envision that tagging items on the stack is useful to help determine where a particular item came from, the functional unit it is part of, and the instructions and data on which it depends. This information can be used to break a program into functional units for breeding, and for allocation among processors or computers, e.g. run-time parallelization. Potentially, by tracking a particular item's origin, the process of calculation can be reversed. For example, in Step 5 above, the three items on the stack are the values "10," "9," and "5." Thus, if someone were interested in where the number "10" came from, they could find the entry in the "stack value" column 506 containing the value "10." In this case, it can be seen that the value was placed upon the stack at Step 3. Then, looking at, e.g., the "origin codon" column associated with Step 3, one would see that the "xlCell.R.Value" was executed. In addition, one could also see from the "dependency" column 514 at Step 3 that the earliest item relied upon for the value was at Step 1 of the program. When looping and branching logic is involved additional information may be needed to properly tag data such as the step at which an item was placed on the stack, as well as the step at which its dependent items were placed on the stack.

In addition to the various items of information in the master codon table 304 of FIG. 3 that relate to the number of errors and instances for, e.g., a given type of codon (such as a "+" operation) that occur over the course of running, e.g., one or more programs, the present invention also contemplates that activities and characteristics of each individual codon in a program can be tracked and recorded. Thus, for example, if a program contained twelve different "+" operations, the activities and characteristics of each of these individual "+" operations could be individually tracked and recorded. This would be in addition to keeping a total of the activities of all "+" operations within, e.g., a given program, groups of programs, time frame, etc., as generally anticipated would be the case with regard to information stored in the instances column 322 of the master codon table 304, as contemplated by embodiments of the present invention.

As an exemplary analogy, a conventional program can be considered as a tape of numbers or instructions, while the multi-property instructions contemplated herein would be a fat tape in which the normal tape had been expanded with additional fields for read/writeable information. The program is then streamed and a fat reader head would read the instruction and the properties associated with it each time the program was executed. In addition to simply reading the tape, the fields could be modified as the program was executed.

FIG. 6 depicts one manner contemplated by embodiments of the present invention for implementing the tracking and recording of activities and characteristics of individual codons as mentioned above. Referring now to FIG. 6, a multi-property codon information table 602 is shown for keeping track of the various items of information relating to the individual codons of a particular functional entity (e.g., programs, subroutines, etc.) This is evidenced by the existence of a codon number entry 604, containing the codon numbers for each instruction of the functional entity. In the example of FIG. 6, that entity is the exemplary temperature conversion program mentioned previously.

The exemplary information that embodiments of the present invention envision can be tracked and recorded in the multi-property codon information table 602 for each codon in, e.g., a program, is now described. An "activity level" entry 606 indicates whether a codon is on or off. A value of 1 indicates "on" and a value of 0 indicates "off." Intermediate values suggest fuzzy or "probabilistic" activation. Specifically, given an activity level, the present invention has the capability of determining whether or not (based upon any number of chosen factors) to execute a particular codon. The activity level number, itself, in the multi-property codon information table 602, is envisioned to be indicative of the level at which the codon would execute (e.g., an activity level of 0.33 might mean that the codon would have a 1 in 3 chance of executing when encountered). It should be realized that the fault-tolerant aspects of the present invention facilitate implementation of this feature, since the act of suppressing the execution of a part of a program may lead to incorrect syntax.

The fault tolerant aspect, and the potential encapsulation of all language entities as codons, enables any codon to be remapped to another. To facilitate this feature, a "substitution codon" entry 608 allows one codon to be substituted for another one. Thus, for example, it may be useful in certain modeling situations to change a "+" operation in a given program to a "*" operation. Embodiments of the present invention envision that this could be accomplished with regard to the exemplary temperature conversion program by placing the number "3" at the "Instruction 9" column in the substitute codon entry 608 of multi-property codon information table 602. This is because codon number 3 represents the "*" operation, as per master codon table 304. Thus, this would cause the initial "+" operation of Instruction 9 (note the "1" in codon number entry 604 at Instruction 9, which represents the "+" sign) to be executed as a "*" operation. The present invention also envisions the implementation of global-type changes, where, e.g., all "+" operations in a program are changed to "*" operations. Of course, this feature may cause circularity (e.g., A→B, B→C, C→A). To prevent this from occurring, embodiments of the present invention contemplate checking whether any codons being redirected appear twice. If any do, the redirection is stopped at that point.

The instances entry 610 indicates the number of times that a codon has been encountered during, e.g., a single execution of the program. Thus, embodiments of the present invention contemplate that, e.g., the number of times a codon has been encountered in a most recent execution of a program or subroutine (potentially at, e.g., a particular virtual machine level, discussed below) would be recorded by this instances entry 610. The total instances entry 612, on the other hand, is envisioned to keep track of the total number of times that a codon has been encountered during, e.g., the course of multiple executions and/or virtual machine levels of the program. It should be understood that the distinction generally mentioned above as to when an encounter of a codon should be registered in the instances entry 610 and/or total instances entry 612 is by way of example, and that any number or criteria can be used. Also, it is envisioned that additional types of "instances" entries can be added to multi-property codon information table 602 (or the "fat tape") that can be used for recording when certain codons are encountered under any number of different types of circumstances.

An example describing a use of recording the "instances" and "total instances" within the multi-property codon information table 602, generally, and as compared with a contemplated use of the instances recorded in the master codon table 304 of FIG. 3 is given as follows. In this example, it is assumed that the master codon table 304 also has two instance-related columns, one called "instances" and the other "total instances." The former is envisioned to record all encounters with a particular type of codon in the course of a single execution of a program, while the latter records all encounters with the type of codon over multiple executions of one or more programs.

In the example below, assume the existence of two programs:

a) "GreetingsWorld" is comprised of six codons. The first, third, and fifth are the text codons "Hello," "World," "Hello" respectively, and the second, fourth, and sixth is an operator that takes one text codon argument, "PrintText."

b) "Greetings" is composed of two codons. The first is a text codon, "Hello", and the second is the print operator above, "PrintText."

The following sequence of the programs mentioned above is executed: GreetingsWorld, Greetings, Greetings, and Greetings. The table below shows how the properties in the multi-property codon information table 602 for "Hello" in Greetings and the master codon 304 table for "Hello" would change with respect to the "instances" entries and "total instances entries":

| Program Executed: | "Hello" in Greetings | | "Hello" in Master Codon Table | |
| --- | --- | --- | --- | --- |
| | Instances | Total Instances | Instances | Total Instances |
| 1 GreetingsWorld | 0 | 0 | 2 | 2 |
| 2 Greetings | 1 | 1 | 1 | 3 |
| 3 Greetings | 1 | 2 | 1 | 4 |
| 4 Greetings | 1 | 3 | 1 | 5 |

After the execution of GreetingsWorld, there was no change in the instances entry of the multi-property codon information table for "Hello" in Greetings because the program Greetings was not executed. But the master codon table for the codon "Hello" recorded two instances of "Hello." (Remember, GreetingsWorld's programs is "Hello", PrintText, "World," PrintText, "Hello," PrintText).

Still with regard to FIG. 6, the errors and total errors entries (614 and 616, respectively) keep track of errors and total errors that occur with regard to a codon, with an envisioned distinction between the usage of the errors entry 614 versus total errors entry 616 being that as described above with regard to instances. As with the errors column 320 described with regard to the master codon table 304 of FIG. 3, recording any number of different types of errors is contemplated by embodiments of the present invention.

The parent agent entry 618 contemplates containing an indication of the agent from which the codon was copied. More specifically, embodiments of the present invention contemplate that parent agent entry 618 can contain the codon number of the agent from which the codon was copied. In particular, this has application in a genetic programming environment where various portions of agents are cut and spliced together to form new agents. In such environments, it may be advantageous to readily determine the agent (i.e., the parent) from which a particular codon came from in the cutting and splicing process. In this way, when a new piece of code is formed in a genetic programming environment, one can readily determine the "parents" of that piece of code (and, in particular, the parent of any given codon). In addition, items such as an author identification number or TCP/IP address can be assigned to indicate who created the program.

The parent index entry 620 indicates the position within a particular parent agent from which a codon was copied (in, e.g., a genetic programming environment). Thus, for example, if codon number 8 at Instruction 1 in the multi-property codon information table 602 had been in the fourth position (i.e., the fourth codon) in the program from whence it came, then the number "4" would be put into the parent index entry in the Instruction 1 column.

User tag 622 and "other user-defined fields" 624 indicate that embodiments of the present invention contemplate that various other types of entries are envisioned, and thus other types of information can be tracked and recorded. One such additional entry envisioned by the present invention relates to keeping designated instructions together in the event that they achieve (or are dose to) some pre-defined score or threshold level from a fitness function in a genetic programming environment. Thus, for example, if a piece of code comprising Instructions 3–7 is found to have scored very well, an entry in the multi-property codon information table for each of those instructions can indicate that the codon should not be separated from the preceding and/or following codon, thus making sure that those instructions are kept together as the genetic programming process precedes (e.g., keep codons 2 through 6 together). Another use would be to record the IP address of a computer on which the codon was recorded to further help identify the codon's origin.

In general, the concept of the multi-property codon information table 602 essentially allows programs to, in effect, become "read/write" in nature, in that the elements of the program (i.e., the codons) can be given dynamically changeable attributes. In this way, various items of information can be associated with each codon in a program and a population of initially identical programs can be individualized.

Tracking and storing information about individual codons in the manner described above has numerous advantages. One such advantage relates to debugging programs. A programming language that uses the concepts described above would effectively contain a built-in debugging mechanism, since it can inherently track where the program logic has been (e.g., which codons have been encountered), and thus which aspect of a program (e.g., which subroutines) has been entered. Use of the concepts described above also allow two initially identical programs to differ from one other as they are used by different persons (assuming, of course, that each is not used in an identical manner). Thus, each program will have its own individual footprint. Also, as mentioned above, the parent agent and parent index entries (618 and 620, respectively) allow an added advantageous level of analysis in genetic programming environments.

Another advantage of implementing a multi-property codon information table 602 as discussed above relates to protecting aspects of the virtual machine environment from potentially unwanted effects of genetic programming, while at the same time facilitating a reasonable amount of flexibility for the genetic programming process. More specifically, when programs are arbitrarily spliced and recombined in a fault tolerant environment, in which data and instructions are intraconvertible, it can be difficult, if not impossible, to predict the potential outcomes. Consequently, embodiments of the present invention envision that certain sensitive aspects of the virtual environment and host computer system need to be safeguarded and/or restricted to prevent undesirable and potentially destructive effects, and that direct access to the master codon table 304 is not permitted by the code that is being bred and executed. However, the aspects of the multi-property codon information table 602 are accessible, but as indicated above, the table relates only to a particular program and not the entire environment (so a potential negative result would not be as catastrophic). Thus, certain precautions are implemented while preserving much flexibility. Of course, it should be understood that the present invention envisions any number of specific ways and degrees to implement this concept.

While the particular mechanism described above for keeping track of codon information utilizes a table format, it should be understood that the present invention contemplates that any number of other different types of structures can be used. For example, in order to stream programs or transfer information from machine-to-machine, certain properties must be attached, and structures are envisioned for use to accommodate this. In addition, any number of different types of information relating to the codons (i.e., in addition to and/or less than and/or different than the entries of multi-property codon table 602 described above) is contemplated by embodiments of the present invention.

As indicated above, one of the features contemplated by embodiments of the present invention is the ability to treat programs as data and vice versa. For example, when a codon number is encountered, rather than looking it up in the master codon table 304 and executing it in accordance with its meaning in that table, the present invention has the ability to instead treat the codon number simply as data (i.e., as a numerical constant). As indicated above, an advantage to being able to treat programs as data is the enhanced ability to execute the programs in a genetic programming environment. Furthermore, treating programs as data also facilitates program self-analysis, self-modification and the ability for programs to readily create other programs. An example of this latter advantage is now shown with regard to FIG. 7.

Figure 7:
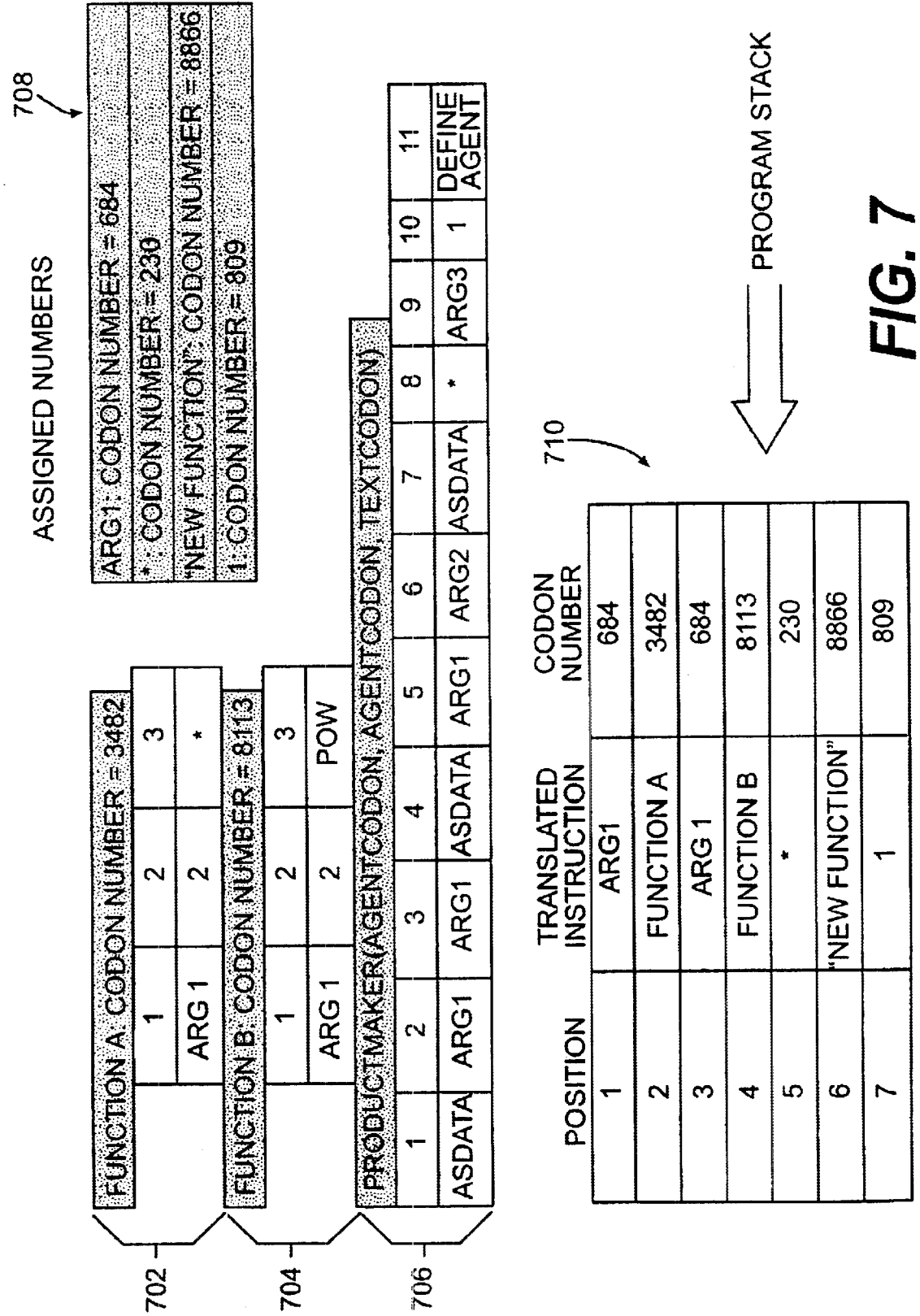
FIG. 7 depicts a diagram disclosing an exemplary technique for the generation of programs utilizing the treatment of executable code as data, as contemplated by embodiments of the present invention.

The example of FIG. 7 contains the labels "Arg1" and "Arg2". These labels are "keywords" and refer to the parameter space of an agent. (A number of exemplary keyword codons contemplated by embodiments of the present invention will be discussed below in conjunction with various figures and features.) Embodiments of the present invention contemplate that all agents can use these same terms to access and modify their parameters. The maximum number of agent parameters is contemplated to be a user-configurable element of the system. As a default, the size of the parameter space is set to equal the size of the stack space.

When an agent that requires n parameters is invoked, the top n items on the active virtual machine stack are copied into a set of private registers, named "Arg1", "Arg2", ... "ArgN" within the current virtual machine record. This standardization of parameter space and nomenclature is envisioned to enhance the "evolvability" of programs by increasing the overlap of terminology and data structures between two arbitrary programs.

Referring now to FIG. 7, an agent called "ProductMaker" 706 is shown. This agent requires three parameters. In effect, the agent takes the first two parameters, both codon numbers of one-parameter functions, and creates a new agent having the name of the third parameter. The resultant one-parameter agent computes the product of the two one-parameter functions evaluated at a given value.

In this particular example, the two arguments passed to ProductMaker are the codon numbers of FunctionA and FunctionB. FunctionA 702 multiplies arg1 by the constant "2." Thus, as indicated in 702, the first item in FunctionA is the variable "arg1", the second item is the number "2", and the third is the multiplication sign (thus, the format used is post-fix). Though comprised of codons itself, FunctionA also exists as a codon. Here, FunctionA has been assigned the codon number of 3482. (It is envisioned that such assigned numbers can be arbitrary, or can in some way be representative of the entity that they represent, e.g., all arithmetic operators are three digit codons that begin with the number "1". Similarly, when converting programs from text to codon representations, certain words can automatically be associated with specific codon types, for instance, any word enclosed in brackets is considered a "marker" codon, described below.)

Similarly, FunctionB contains the codons arg1, the number "2," and the function "POW". "POW" is an abbreviation for the 2-parameter power operation, which raises the value of its first argument (arg1) to the power of the second argument (which, here, is "2"). FunctionB is, itself, also a codon, and in this example it has been assigned the codon number of 8113.

The ProductMaker program 706 in this example thus creates a new program that multiplies FunctionA with FunctionB. The ProductMaker program 706, itself requires three input arguments (which are envisioned to come from an input stack). The first two arguments, each denoted here as "AgentCodon," represent the functions to be multiplied (in this example, Function A and FunctionB). The third argument (called "TextCodon") represents the name that a user wishes to give to the new program that is going to be created. In this particular example, the new program will simply be called "NewFunction."

Program stack 710 as shown in FIG. 7 represents the contents of the program stack 710 after the ProductMaker program 706 has executed all its steps just prior to the step of actual defining the contents of a stack as an agent (i.e., objectizing those contents). Those steps that obtained that result will now be described.

Referring to the ProductMaker program 706, in the first step, the codon "AsData" is encountered. This codon (which can be thought of as a toggle) indicates to embodiments of the present invention that the subsequently encountered codon should be translated as data rather than executed in normal fashion. Consequently, in Step 2, rather than executing the methods associated with Arg1 (which involves retrieving the current value of an active agent's first parameter register), the codon number of "arg1" is placed on program stack 710 at position 1. As can be seen from a block designated "assigned numbers" 708, "arg1" was assigned codon number 684.

In Step 3, the codon "arg1" is again encountered, this time in normal operating mode. The value of the first argument passed to the agent, in this case the codon number of FunctionA (3482), is retrieved and placed on the stack 710 in position 2. Consequently, Steps 2 and 3 illustrate the distinction between treating codons as data and executing them. In this example, when the new program that ProductMaker is creating is executed, arg1 at position 1 will be what will ultimately grab the value necessary for input to FunctionA.

In Step 4, again, the "AsData" codon is encountered, thus treating the codon in step 5 (i.e., "arg1") as data. Again, rather than executing "arg1", its codon number (i.e., 684) is placed on the stack 710 at position 3.

In Step 6, "arg2" is encountered, and since it is not preceded by an AsData codon, it will be translated (i.e. executed) in normal mode. The execution of "arg2" is similar to "arg1", except that the second (rather than the first) argument is passed to the ProductMaker program from the input stack. Specifically, in this case, the codon number of FunctionB (8113), is placed on the program stack 710 at position 4.

At Step 7, the "AsData" codon is again encountered so that, at Step 8, the multiplication operation will be treated as data. Thus, the codon number of the multiplication operation (230), seen from the assigned numbers block 708, will be placed on the program stack 710 at position 5. (It should be understood that the present invention also contemplates the potential toggling in the opposite direction, such that data can be treated as an executable program)

At this point, it can be seen that positions 1 through 5 of the data stack contain the makings of a program where FunctionA (as defined above) and FunctionB (also defined above) will both receive a value in the form of arg1, wherein the two functions are then multiplied together. In other words, the new program created by ProductMaker can be interpreted as follows: (arg1*2)*(arg1^2).

Referring back to the ProductMaker function of 706, Step 9 contains "arg3," which takes the third argument passed to the ProductMaker function. Here, that third argument is the text "New Function," which was previously encapsulated and assigned the object number 8866. This number is placed on the program stack 710 at position 6.

Step 10 of ProductMaker indicates the number of arguments that NewFunction expects to receive (in this case, it expects one argument). Thus, the codon representation for 1 (i.e., codon number 809 in this example, as indicated at assigned numbers block 708) is placed at position 7. It should, of course, be understood that the number representing the number of arguments could itself have been yet another argument (e.g., arg4) in the event that ProductMaker allowed for FunctionA or FunctionB to have more than one input argument.

In step 11, a "DefineAgent" codon is encountered (which in embodiments of the present invention is envisioned to have the effect of "encapsulating" the contents of the program stack 710) and assigns a new codon number (not shown) to represent the newly created agent in the master codon table 304 of FIG. 3.

The present invention contemplates that there are any number of ways to actually call functions such as the ProductMaker one described. One exemplary syntactical form for doing this is as follows: {[FunctionA FunctionB] "New Function" ProductMaker}. In this example, placing FunctionA and FunctionB within the brackets causes them to be treated as data (i.e., causes their codon representation to be treated as data) which in the example above, enabled the codon number for FunctionA and FunctionB to be placed upon program stack 710. Other syntactical forms contemplated by embodiments of the present invention include the following:

Asdata FunctionA Asdata FunctionB ProductMaker

8113 3482 ProductMaker

8113 3482 #ProductMaker transform

FunctionA # FunctionB ProductMaker

[FunctionA FunctionB] ProductMaker

"FunctionA" LabelToCodon "FunctionB" LabelToCodon ProductMaker

"FunctionA FunctionB" TextToCodons ProductMaker

The present invention envisions that agents also can utilize a codon named "pop", which returns the top item from the calling (or parent) agent's input stack. This allows an agent to access more data than it was originally provided and to utilize an indefinite number of arguments. Such functionality is useful for implementing functions such as C's printf( ).

The ability to treat programs as data and vice versa allows the present invention the ability to perform many different types of tests and data manipulations not possible using conventional methodologies.

Embodiments of the present invention envision the inclusion of a "transform" codon that takes a given number and, if a corresponding codon exists, carries out the procedures associated with that codon (i.e., it executes the operation of the codon associated with that number). The "transform" operator is metaphorical to invoking a function through a pointer. The C/C++ language provides this facility, but not in a fault tolerant fashion; the pointer may refer to an address that does not contain a valid function. To provide pointer safety, a list of all function addresses must be available at run-time (but this is currently not a provision of C/C++). However, the "transform" operator of the present invention is "safe" or fault tolerant, since all prospective transform operations can be checked against the master codon table for validity. Moreover the fault tolerance is such that, in a preferred embodiment, any and all mathematical functions in the environment can be performed on codon numbers and the result transformed into an operation without risk of failure. Additionally the current environment may be extensible at run-time, allowing new instructions to be added.

Other key codons similar to "transform" which provide conversion and execution of data and are contemplated by embodiments of the present invention include:

Stack.Evaluate—interprets the numbers on the stack where possible as codons, loads them into the virtual machine program's buffer, and executes said program as a sub-agent.

Mem.Evaluate—given a memory address, reads/casts the memory where possible as codons, loads them into the virtual machine program's buffer, and executes said program as a sub-agent.

LabelToCodon—Returns the codon number of a given label.

CodonToLabel—Returns the label of a given codon.

LabelsToCodons—Returns the codon numbers given a piece of text (in effect makes the language parser available for use in the language itself.)

CodonsToLabels—Returns the text representation of a list of codons.

DataToGenome—Interprets the numbers on the stack as codons and inserts them into the current agent thereby modifying the current program (not executed as a sub-agent).

Agent: "F-name"—Any label in this form is interpreted as an agent program stored in a text file. (Of course binary representation could also be introduced.)

CreateFileAgent—Takes a list of codons and a file name, and creates a file containing a program.

FileNameEvaluate—Given a file name and a flag, interprets the file as binary or text where possible as codons (which are long integer numbers), loads them into the virtual machine program's buffer, and executes said program as a sub-agent.

The present invention extends the space of programs that can be evolved by the Genetic Programming process. Conventional environments require that all programs included in a Genetic Programming population be grammatically correct. In effect, this is akin to knowing, in form, what each program is going to do in advance of being run. With the introduction into the environment of codons such as "transform" which convert data to instructions, and generally with the utilization of functions which can, for example, take an indeterminate number of arguments (discussed below) as well as "junk" instructions, the invention facilitates the execution of programs whose output cannot be known in advance. Such ungrammatical, indeterminate programs can be included in the genetic programming process when run on the present invention, thus broadening the space of potential solutions.

A simple example of the genetic programming process is now described with regard to FIG. 8. Referring to FIG. 8, two starting programs, one termed a "mother" program 802, and the other a "father" program 806, are shown. Each of these programs has 10 codons associated with them. In this example, during the genetic programming process, a piece is taken from the mother program 802 in the form of piece 804. Similarly, a piece is also taken from father program 806 in the form of piece 808. These two pieces (i.e., constructs, where the term simply refers to one or more codons), 804 and 808, are then spliced together to form a child piece 810. This child piece can then be tested in accordance with a fitness function as per the general principles of genetic programming, or for any other purpose.

Although the example manipulates programs in their codon form, as a result of the intraconvertiblity of text and codon forms, it is also possible to perform genetic operations on the programs in their textual representation. In the latter case, the genetic operations are simply text operations (e.g. string concatenations). In either case, during the cutting and splicing phase, the representations are treated as data. After breeding, the resultant data is, if necessary, converted from text to codons and again treated as an executable program.

The fault tolerant aspects of the present invention enable innumerable ways of rearranging and recombining pieces of code to create new programs. As indicated previously, it is envisioned that any element (e.g., function, operator, constant, etc.) of a program in the environment can be a codon. Due to fault tolerance, codons can be deleted, inserted, swapped, and reordered without impinging the ability to execute. Thus, the invention inherently facilitates Genetic Programming.

The multi-property codon information table 602 (discussed above with regard to FIG. 6) automatically tabulates a variety of information that is useful in Genetic Programming and biological simulation. Specifically, as mentioned previously, multi-property codon information table 602 contains a parent agent entry 618 and parent index entry 620 that is available for each codon in a program. Consequently, each codon in the child program 810 is envisioned to have an associated entry indicating where it came from (i.e., indicating it's parent program). Thus, for example, the third codon (e.g., instruction) in child 810 (i.e., the codon whose numeric value is 10) would have in its parent agent entry 618 the codon number associated with the "mother" program 802, since that is where the "10" came from. Then, in parent index entry 620 of the multi-property codon information table 602, that entry for the aforementioned codon in the third position would be 3, since it came from the third position of the "mother" program 802. Thus, the number 3 would be placed in the appropriate parent agent entry for the child program 810. Similarly, for the tenth codon of child program 810 (here, with a value of 1), the parent agent entry 618 for that codon would be the codon number that represented the father program 806, while the parent index number 620 would be the number 6 (since it came from the sixth position of the "father" program 806).

While the point in the mother program 802 and father program 806 at which a piece of the program is obtained may be arbitrary (e.g., determined by a random number generator), embodiments of the present invention contemplate that the length of code (i.e., number of codons) taken from the mother program 802 and father program 806 can depend upon the functionality of the code. More specifically, it may be desirable to obtain portions of code that produce some complete (or quasi-complete) functional results, or that contain codons of a specific type (e.g. codons that create computer graphics). This strategy will in many cases increase the chances that the resultant spliced code will score higher in a "fitness" test where a solution to a particular problem is sought, or generate output of interest to a designer conducting directed evolution.

In conventional Genetic Programming frameworks, wherein all programs are grammatically correct, determining logical units is simply a matter of parsing. This method is not always effective in the more general and fault tolerant framework provided by the present invention. A more effective procedure for determining logical units when working with ungrammatical, indeterminate, "junky" programs, is to evaluate the program in a step-wise fashion and to note the codons contributing to the result at each step.

Besides parsing and step-wise evaluation, embodiments of the present invention provide another facility for obtaining a functional portion of a parent program in a genetic programming environment. The method involves utilizing dependency information such as that found in the stack tag table of FIG. 5, and particularly the dependency column 514. Specifically, this dependency column 514 can be used to indicate how many codons of a parent program to obtain so that a functional unit is procured. As an example, and referring back to FIG. 5, it should first be observed that the program represented in this Figure by the Origin Codon column 512 is the mother program 802 of FIG. 8 (see program 404 of FIG. 4 for the codon correlation). In any event, if through the use of, e.g., a random number generator, an indication exists that the program represented at Origin Codon column 512 should be split (or copied) at the "multiply" operation at Step 7, then the present invention would note that the corresponding entry in the dependency column 514 at Step 7 is a "1." This would be an indication to grab the codons from Step 1 through 7, since they make up a functional unit (and yield a functional result). Similarly, if it is desired to make the split at the "divide" operation of Step 6, then since the dependency column contains a "4" at that step, the codons from Steps 4, 5 and 6 would be taken, and spliced with other codons to form the new child 810. This works, because the dependency column 514 indicates the earliest step from which the value of that current step depended, and thus obtaining the codons from that earliest step forward will produce a unit of codons likely to yield some kind of result.

It should be understood that the scheme for determining what codons to use in a genetic algorithm environment as described above is by way of example, and that the present invention contemplates any number of other techniques for determining where in a parent program a cut (or copy) is to be made, and how many codons are to be used from each parent in creating the new child program.

Another example of advantages of the fault tolerance of the present invention with relation to genetic programming is that the present invention has the ability to explore and develop solutions from a larger search space than the space permitted by conventional genetic programming environments. The exemplary code written below generates a random integer between 1 and 10 and assigns it to variable n. It then generates n random integers between 0 and 1 and sums the result. An exemplary manner for doing this using the present invention is as follows:

```
Do
    /*generate a random integer between 1 and 10
    and assign it to n*/
    1 10 RandInt n let
    /*generate n random numbers between 0 and 1*/
    n 0 1 RandIntNTimes
    /*within the current context add any items on the stack*/
    sum
Loop
```

This program could not be executed in conventional genetic programming environments because of the uncertainty of the numbers that should be summed. Specifically, codons such as "sum" would not be possible, since conventional environments would require, e.g., many conditional statements for taking into account the number of possible integers that may need to be summed, depending upon the number generated by the random number generator. In particular, because of the stack-based framework contemplated by embodiments of the present invention, all of the numbers on the stack (no matter how many there may be, within certain physical or architectural limits) can simply be summed. Alternatively, the present invention can also indicate that it will take exactly n numbers from the stack, indicative e.g., of the number of random numbers generated. These types of codons (termed variadic and argomatic, respectively) will be mentioned further below.

Thus, the present invention allows for keyword codons such as "Sum" to be variadic (i.e., it is not known how many inputs into Sum will exist at the time of execution).

As noted previously, the present invention contemplates a fault tolerant environment, where a program having incorrect syntax will be executed and not crash the system (although such a program may or may not yield a worthwhile result, or even any result at all). However, the present invention does envision instances where it would still be useful for an otherwise meaningless sequence of codons to yield at least some result. Such a situation can be envisioned in a genetic programming environment where, in the course of creating and testing pieces of code that have been spliced together, it is still useful to ensure that there is at least some type of output against which fitness can be tested. In other words, if the results of executing the program were allowed to yield no result at all, then there would (typically) be absolutely no chance at all that the program would score well on the fitness function, whereas forcing at least some result to occur would allow for at least some (albeit typically slim) chance that it may score favorably, or that it's performance can be differentiated from others in a population of programs.

In view of the above, the present invention contemplates a scheme for "grammar repair," where the grammar of a program to be executed is repaired. One way that the present invention contemplates implementing this is now described with regard to FIG. 9. Referring to FIG. 9, the four-step program at 902 would, in conventional programming languages, be considered syntactically incorrect. Specifically, Step 1 is an addition operation, which expects to receive two arguments to be added together. However, in program 902, there are no such arguments available. Similarly, the cosine operation of Step 2 would expect one argument (but has none), and the multiplication operation of Step 3 would expect two arguments (and has none).

Regarding the exemplary program 902 described above, embodiments of the present invention contemplate that a user can, if desired, initiate a grammar repair feature to allow the program 902 to yield some meaningful output. When this feature is implemented, then upon encountering the addition operation of Step 1, the present invention would recognize an insufficient arguments situation. Embodiments of the present invention then envision that, e.g., a grammar repair codon is used to attempt to generate meaningful arguments. A simple implementation would be to generate the arguments randomly. In the example of FIG. 9, the two numbers generated are 4 and 7, which are placed upon the stack as indicated at 904. These two numbers are then added together in accordance with the addition operation of Step 1 in program 902 (yielding the number 11), which is then placed on the stack at Step 2.

Still referring to program 902, Step 2 is the cosine operation which, requiring one argument as input, receives the 11 from stack 904, and yields .9816, as shown at Step 3 of stack 904. Then, upon encountering Step 3 of the program 902, which is the multiplication operation, the present invention looks for two arguments. Finding only one (i.e., the .9816), the present invention's grammar repair generates a second argument (which in this example is the number 3) and places it on the stack at step 3 as shown. The multiplication can then commence, yielding the number 2.9448. Thus, the program 902 can then be tested for fitness using the numbers generated, as shown on stack 904. It may very well be that the results are unlikely to score well with the fitness function, but at least there will be some result to work with. Embodiments of the current invention contemplate that the specific type of grammar repair function used can differ depending upon the specific codon(s) encountered. Furthermore, it is envisioned that the grammar repair function can vary with each codon and can be set at any time.

In addition to the data mode and program mode described above, the present invention also contemplates embodiments where a program can be running in a "silent mode" such that, when the silent mode is turned on, codons that would otherwise be executed are simply skipped over in the sense that no operation is performed, i.e., no result is generated, only the codon status and machine information (e.g., various counters) is updated, and there will be no return values. This feature will be further explained with regard to FIG. 10.

Figures 10, 10A, 10B:
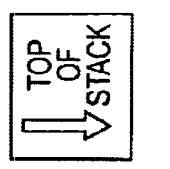
FIG. 10 depicts a diagram disclosing various features of the present invention implementable by codons, including "silent mode."

Referring now to FIG. 10, a program 1002 is shown, wherein the first Instruction (i.e., the first codon) is "SilentModeOn" (as shown by the "label" row) indicating that the silent mode should be turned on. The next three Instructions of program 1002 (i.e., Instructions 2–4) each contain a function for obtaining the machine code representative of a particular color that can be displayed on a computer display screen (when, e.g., that machine code is stored in an appropriate color register of a computer). Because the silent mode has been turned on by virtue of Instruction 1, to Instructions 2–4 are skipped over, as described above.

In Instruction 5 of program 1002, a SilentModeOff codon is encountered, thus turning the silent mode off and resuming regular program execution. In Instruction 6 of program 1002, the numeric constant "2" is encountered, which is placed on the stack. The state of the stack, after each instruction is executed, is shown at 1006 of FIG. 10. The number of items on the stack is indicated at 1008. Thus, the constant "2" is placed on the stack at Instruction 6 of 1006, and 1 item is shown to now exist on the stack (as indicated by 1008). As indicated by the "codon" representation shown at program 1002, codon number 2829 represents the numeric constant 2. Note that the stack 1006 at Instruction 5 is empty. The next codon to be encountered in program 1002 is at Instruction 7, at which resides the numeric constant 4. Thus, 4 is placed on the stack 1006, as indicated at Instruction 7 thereof, the "4" being represented by codon number 2830.

At Instruction 8, the codon "RandInt" is encountered, which as contemplated by embodiments of the present invention is a function (e.g., a built-in keyword) that takes the two arguments (from the stack) and returns an integer in the range between the two arguments. Thus, in this example, "RandInt" will return the integer 2, 3 or 4. As shown at Instruction 8 of the stack 1006, in this particular example, RandInt returned a numeric constant of "3" (thus, a "3" is shown on the stack 1006 at Instruction 8).

The next codon in program 1002 is "genomeItem" at Instruction 9. In this example, that represents a function that takes one argument from the stack 1006 and returns the codon number of the codon at that particular position within a program (e.g., in this case, within program 1002). Since the number 3 was placed on the stack 1006 at Instruction 8, "genomeItem" returns the codon number at the third position (i.e., the third instruction) of program 1002. That item is "White" which, as indicated by the "codon" row, is represented by codon number 869. Here, "869" is placed on the stack at Instruction 9.

The next instruction of program 1002, which is Instruction 10, contains the function "Transform", which takes the data item on the top of the stack (in this case, "White," as represented by 869) and executes it. This then returns the constant 16777215 (which is the color white in the Microsoft Windows API) and places it on the stack 1006.

Instructions 11 and 12 call the xlRow and xlCol function which returns to the stack the row and column respectively of the active cell of an Excel spreadsheet. Then, at Instruction 13 of program 1002, the codon "xlCell.W.InteriorColor" is encountered, which is a function that takes three values. The first value indicates a particular color while the second two indicate a particular cell in an Excel worksheet. The function thus takes the three values that are on the stack and proceeds to set the color of the cell indicated.

Thus, program 1002 shows an example of the usage of the silent mode and, in addition, depicts in an exemplary manner the nature of the codon-oriented environment contemplated by embodiments of the present invention.

An important feature of silent mode is that it allows logic and data to be inserted anywhere in a program without having to affect the flow of the program. Embodiments of the present invention provide the capability to search programs for any codon. Thus, branching into an otherwise "silent" section of a program can be accomplished by searching for a specific codon within the silent section.

Related to silent mode, embodiments of the present invention contemplate a special type of codon called a "marker." In effect, markers are a named instance of the "nop" (no operation) instruction. Markers are envisioned for use as a reference point to tag the elements of a program for various purposes, such as branching to a particular point in the program. In addition to branching, markers can also be used for identifying target sites for genetic programming operations and for identifying code that performs a particular function or contains a data field. For example, a program can be employed to demonstrate markers to identify various attributes of a picture; these markers can be used to mutate the picture.

The code fragment below shows an exemplary syntax for silent mode and marker codons. This allows the main program loop to skip over the silent section(s) and in some contexts execute it. The naming convention of markers is arbitrary; the program below uses an HTML like format.

```
/* Exemplary use of marker codons */
SilentModeOn
    <Count> 33 </Count>
    <TimeSent> 36615.60596 </TimeSent>
    <Sender> "Anonymous" </Sender>
SilentModeOFF
```

GetCurrentSystemTime MakeConstantCodon #<TimeSent>LocateFirst 1+genomeItem set

Silent mode and markers facilitate modeling DNA in which a gene is distributed around introns. As in molecular biology the presence of a codon can be used to activate a particular gene.

Figure 11:
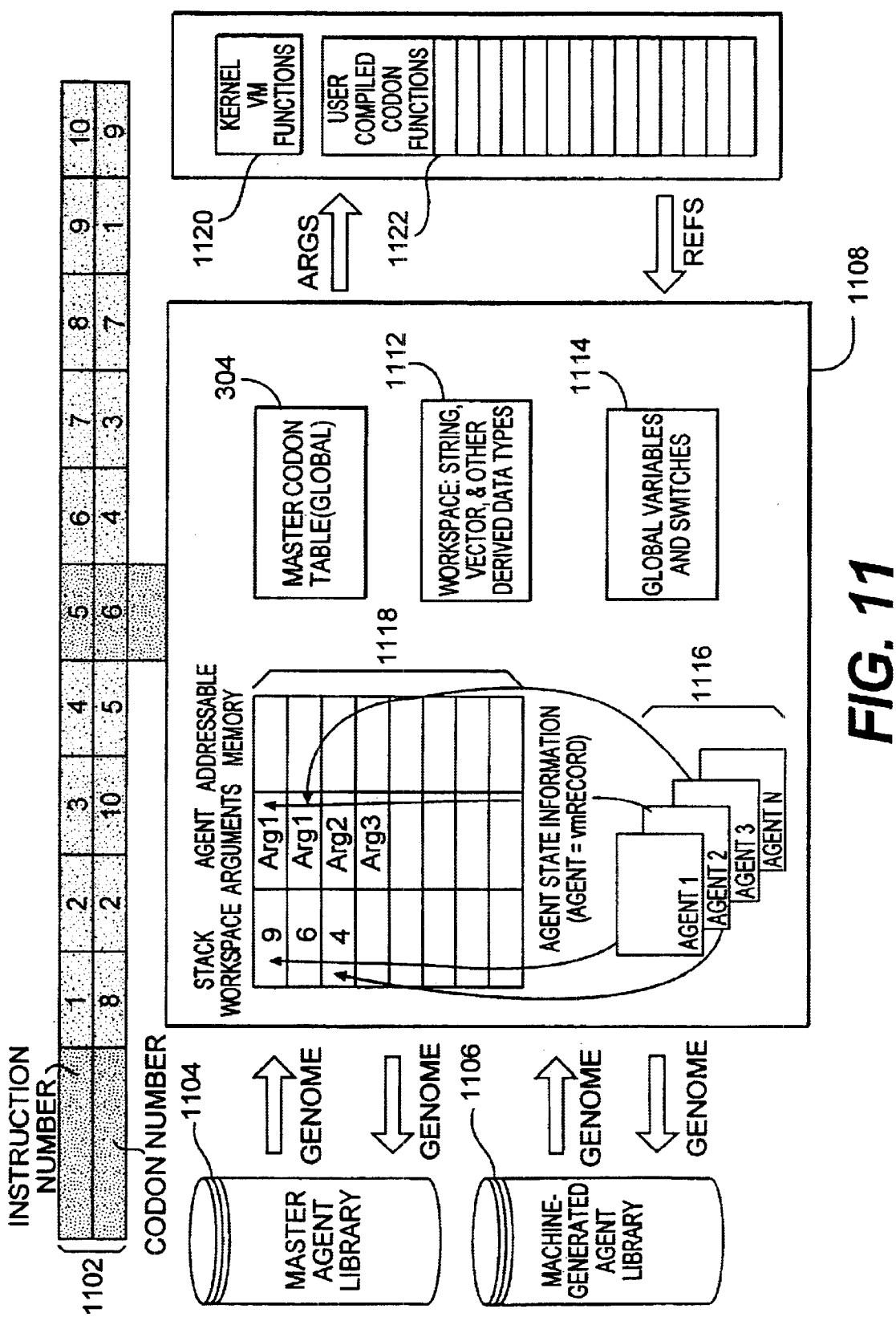
FIG. 11 is a block diagram disclosing certain aspects of the virtual machine environment, as contemplated by embodiments of the present invention.

Aspects of the virtual machine environment as contemplated by embodiments of the present invention are discussed with regard to FIG. 11. Referring now to FIG. 11, a master agent library 1104 is envisioned to contain those programs that have been previously created and are authorized for use by the current user (e.g., a program such as the one indicated by 1102). It is also envisioned that the master library can be distributed across many computers on a network. A machine-generated agent library 1106 is contemplated to contain portions of the program(s) that are spliced together in a genetic programming environment. Consequently, it is contemplated that these two libraries 1104 and 1106 receive and provide material for the genetic program process. (as well as for other traditional software purposes). Both libraries can store multi-property codon information. In addition the present invention contemplates allowing these two libraries 1104 and 1106 to exist as part of a local machine operating system, and could work with various file formats (binary, text, html, etc.) In addition, embodiments of the present invention contemplate that machine-generated agent library 1106 can be set up, for example, to set aside a particular area for storing those pieces of code whose score indicates a high level of fitness so that they will not individually be broken apart (although they may continue to be spliced together with other pieces).

A master codon table 304 (of the type discussed above with regard to FIG. 3) is shown. A data table 1112 stores various run-time data and codon types such as strings, vectors, and other derived data types. Global Variables and Switches 1114 keeps track of information that is shared by all agents such as overall codon statistics, error information tables, the number of processes running, records in use, etc.

Upon encountering an agent within an agent (i.e., a program within a program), embodiments of the present invention initiate a new instance of a virtual machine record to execute the agent, and thus the individual codons within the agent will be processed at that new record level. N potential levels of virtual machine are indicated at 1116, which depicts N agents (and thus N levels). Each level of the virtual machine maintains information about the current execution contents of a particular agent. Embodiments of the present invention envision providing for a plurality of status variables, including those relating to an instruction index, addresses of stacks, buffers, and programs, information about logic nesting, and virtual machine modes. Refer to the appendix for the preferred embodiment of virtual machine fields (T_VMRECORD structure.)

After the initiation of a new virtual machine record, the overall record counter is incremented and execution resumes at the beginning of the new record. All records are translated using the same process. When the child process is completed the values on its stack are passed to the parent. The child process could also raise an error condition to the parent. In either case the execution pops back to the parent level and resumes where it left off. By introducing a mechanism to keep track of users and allocate a certain percentage of CPU time and/or priority, etc., the present design envisions accommodating multi-tasking in two or more agents by alternating between them. The additional data structure would track the number of processes currently running and the agent and any sub-agents which belong to each process, and keep track of the current execution position (the virtual machine state) of each process. The virtual machine records, as envisioned by embodiments of the present invention, are symmetrical/generic (e.g., identical number of variables, variable names, size of variables, etc, which are envisioned to be configurable) to enhance the evolvability of software. Arbitrary agents (created, e.g., in a genetic programming environment) are more likely to create something useful because they have a common framework due to this symmetry. Moreover, the uniformity of the state information makes it possible for agent programs to inspect the state information of their parents, thereby facilitating context sensitive behavior. For example, if a program were called without any arguments, it could perform an analysis of its parent.

Embodiments of the present invention contemplate that any number of types of entities can be designated that can cause the present invention to initiate a new virtual machine level. One envisioned implementation is by designating those entities that are to initiate a new virtual machine level as an "agent" in the "type" column 310 in master codon table 304 of FIG. 3. When such an entity is encountered in the course of execution, the present invention would initiate the new level, and, e.g., the codons within the agent would then be executed. Thus, for example, it could be determined that all entities in which two or more codons (e.g., from a set of kernel vm functions (e.g., keywords) that make up the basic building blocks of a language) encapsulated together will be defined as an "agent" for the purposes of initiating a new level of virtual machine. Of course, it should be understood that the present invention contemplates any number of other ways (and for any number of other reasons) that a new level of virtual machine can be initiated.

Returning to FIG. 11, kernel vm functions 1120 are envisioned to contain certain functions that are contemplated to be part of the core functionality of the language used in the environment. Some examples of such functions as contemplated by embodiments of the present invention were described with regard to FIG. 10, and include RandInt, genomeitem, etc (and more will be described further below).

In addition, it is also contemplated that the user can create his own functions, as indicated by block 1122.

In general, embodiments of the present invention contemplate that any number of different types of general language structures could be used (e.g., C-like languages) in implementing the functionality of the virtual machine environment discussed herein. Thus, for example, a known computer language could be modified to include various kernel functions contemplated herein.

Figure 12:
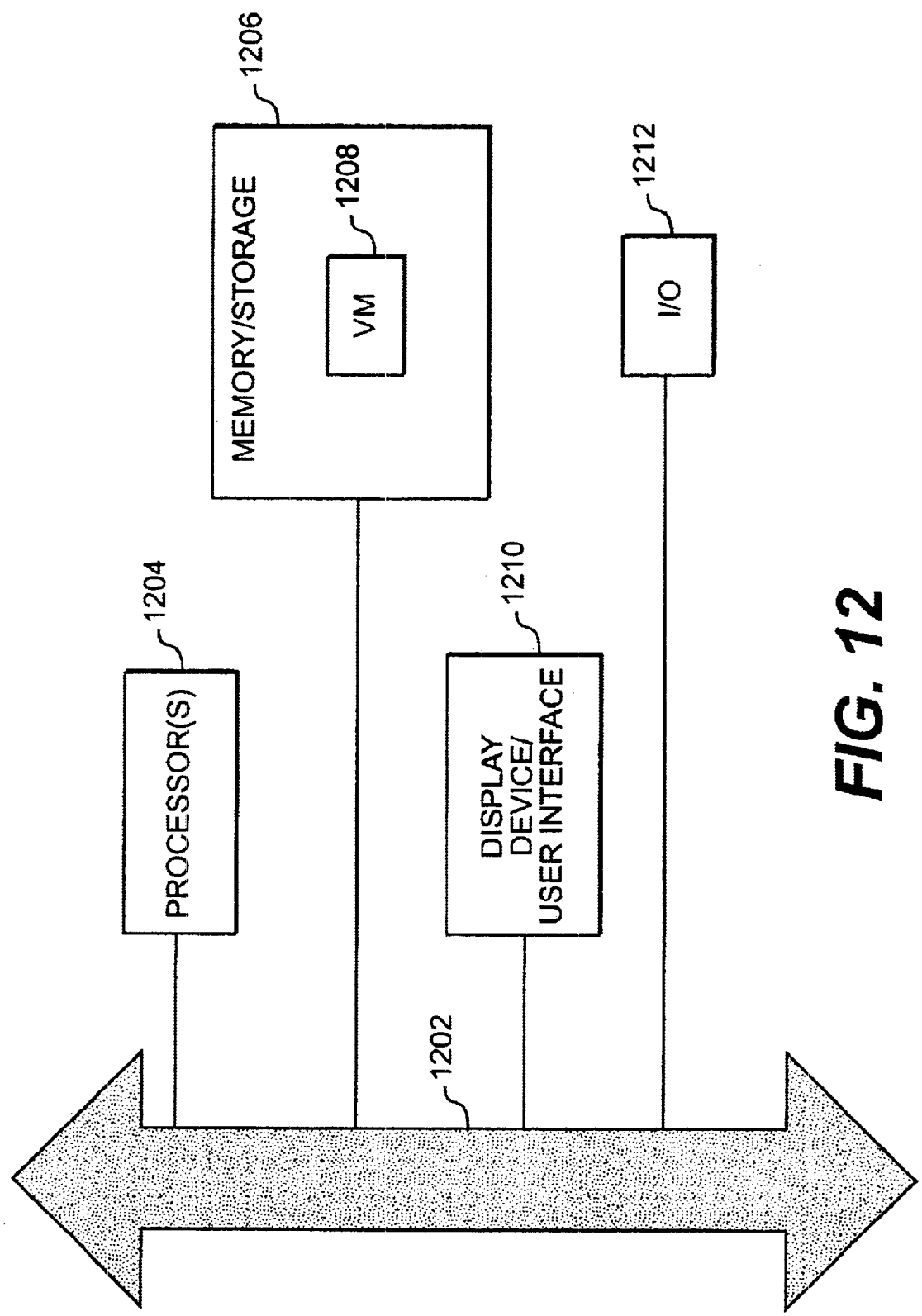
FIG. 12 is a block diagram of a computer processing system used as part and/or in environments of the present invention.

Exemplary components of a computer processing system used as part of the present invention, and/or used in environments or in conjunction therewith are shown with regard to FIG. 12. Referring now to FIG. 12, a virtual machine environment (or portion thereof) 1208 having at least some of the various aspects, functionality and components described herein is shown to reside in a memory/storage device 1206. It is also envisioned that these aspects, etc. can be stored as part of virtual machine environment 1208 and/or as some other portion of memory/storage device 1206 and/or can originate from communications I/O 1212 (mentioned below). This means, for example, that portions of the virtual environment can be distributed among various hardware and/or software entities, and can even be distributed among various different computers linked together in a network such as the Internet and/or an intranet/LAN.

Embodiments of the present invention contemplate that the memory/storage device 1206, itself, could be any number of different types of computer-readable mediums for storing information, including RAM memory, magnetic, electronic, atomic or optical (including holographic) storage, some combination thereof, etc.

Memory/storage 1206 is shown as being in communication, via communication link 1202 (e.g., a bus), with one or more processor(s) 1204. Embodiments of the present invention contemplate that the processor(s) 704 can be those typically found in the types of computers mentioned below, or they can be any number of other types of processor(s). In addition, the present invention contemplates the use of processors running in parallel so that, for example, multiple portions of aspects of the virtual machine environment can simultaneously operate (e.g., in a genetic algorithm environment, various portions of code can be split apart (or copied), spliced and tested simultaneously). This could also facilitate, e.g., simulations where two opponents are playing a game against each other (with the results of the simulation being analyzed).

Referring still to FIG. 12, a display device and user interface 1210 (e.g., a mouse, keyboard, and/or modem) is shown. Communications Is/O 1212 is envisioned to communicate with various communications networks such as local area networks, the Internet, etc. Here, Communications Is/O 1212 is shown to be in communication with processor(s) 1204 and memory/storage 1206.

The present invention further contemplates that communications Is/O 1212 can serve to receive various transmission schemes such as those relating to telecommunications, cable or other transmission mechanisms, and that at least some of the aspects of virtual machine environment 1208 can, in whole or part, be a transmission. Thus, for example, at least some aspects of virtual machine environment 1208 that might otherwise originate from memory/storage 1206 could instead originate from communications Is/O 1212 (e.g., the medium from which aspects of the virtual machine environment 1208 originate can be a transmission).

It should be understood that the configuration of the various aspects of the present invention depicted by FIG. 12 is by way of example, and that the present invention contemplates any number of different configurations and/or different components.

With regard to the various specific processors 1204 contemplated for use with the present invention as depicted by FIG. 12, one exemplary embodiment includes the use of any of the Pentium line of processors from Intel Corporation of Santa Clara, Calif., and/or a Motorola 68000 series processor such as the 68040 processor from Motorola of Schaumberg, Ill. Exemplary operating systems include Microsoft NT from Microsoft Corporation, as well as any of the various varieties of Unix or Linux. It is also possible to extend the functions of the virtual machine so that it operates as an operating system. Of course, it should be understood that any number of different types and combinations of current or future processors and/or operating systems could also be used. In view of the nature of the present invention as indicated above, operating systems that facilitate parallel-processor and/or multi-processing environments are contemplated.

A method of operation as contemplated by embodiments of the present invention is now set forth with regard to FIGS. 13–16. In particular, these figures depict an exemplary method by which the present invention processes codons.

Figure 13:
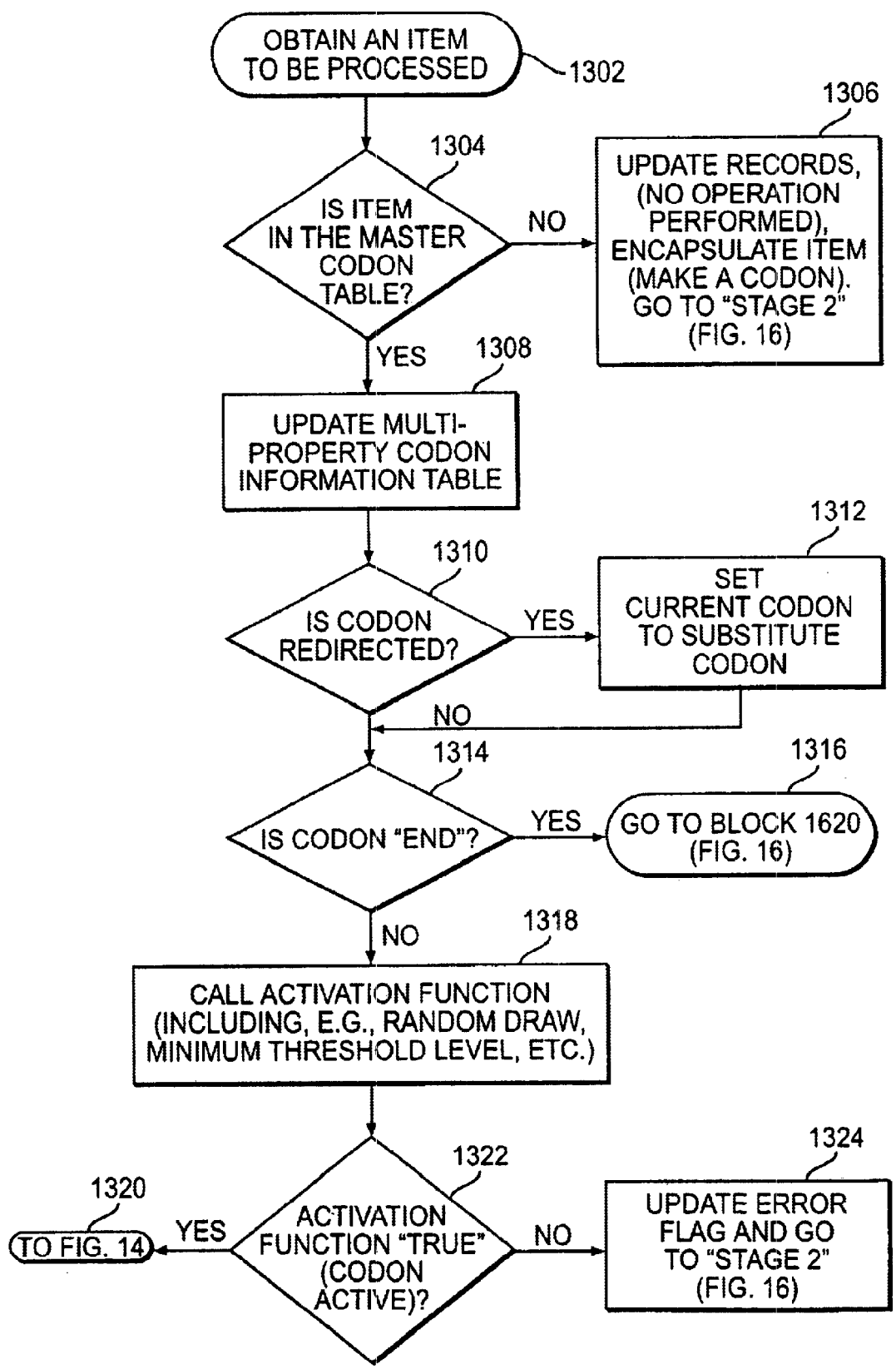
FIGS. 13–16 are flow diagrams disclosing an exemplary method of operation for processing codons, as contemplated by embodiments of the present invention.

Referring first to FIG. 13, the first step is to obtain an item to be processed, as indicated by Block 1302. Thus, in the course of executing, e.g., a program, this is where an individual item is received for processing.

The next step is to determine whether the item has been registered in the master codon table, as indicated by a decision Block 1304. Thus, for example, the present invention determines whether the item encountered exists in a master codon table such as the one described in FIG. 3. If it does not exist, then various records will be updated, and no operations will be performed, as indicated by a Block 1306. In particular, embodiments of the present invention contemplate that a codon called "undefined", which exists in the master codon table 304, exists for the purpose of recording such occurrences. In embodiments contemplated by the present invention, encountering an unregistered item could, e.g., cause the errors column 320 associated with the "undefined" codon to be incremented (although such an occurrence is not necessarily an "error," as described below). Of course, the present invention contemplates any number of ways to record such occurrences.

In addition to recording the fact that an unregistered item has been encountered, embodiments of the present invention contemplate that the unregistered item can be encapsulated, thus becoming a codon. As part of this, it is envisioned that an entry in the master codon table 304 of FIG. 3 would be created for the unidentified item (i.e., the item would become registered). One way of defining the "type" (for inclusion in the type column 310 of FIG. 3) is that if the unregistered item were textual in nature (or a combination of text and numbers), the codon type is set to "variable" (i.e., it is assumed that the item was a variable name created by the user), whereas if the item were numeric, the type is set to "constant." Of course, the present invention envisions that any number of different criteria could be used for automatically assigning the "type" column 310 of FIG. 3, and that various other types in addition to those specifically mentioned herein are also contemplated (e.g. any text beginning with "var" could be a variable). In addition, it is also envisioned that a user can manually enter or declare the "type" of codon for a particular item.

Of course, the present invention also envisions that other actions can be taken when encountering unidentified items (e.g., under certain circumstances, they can simply be ignored). In any event, the next step after encountering an unregistered item (and potentially processing it as described above) is to proceed to stage 2 at FIG. 16 (i.e., between Block 1602 and 1604).

In general, as discussed above, a codon can represent any number of objects, including kernel functions, operators, etc., and also groups thereof (e.g., agents) which can be, and/or be a part of, an entire program.

Returning back to Decision Block 1304 of FIG. 13, if the item exists in the master codon table, then the next step would be to update the multi-property codon information table 602 (described at FIG. 6) as indicated by a Block 1308. Thus, for example, embodiments of the present invention will update the number of times that the particular codon has been executed (i.e., the "instances" 610 and "total instances" 612 entries will be updated). Embodiments of the present invention also envision that the "instances" column 322 in the master codon table 304 would be updated at the appropriate codon entry, as well.

The next step is to determine whether the codon has been redirected, as indicated by a Decision Block 1310. In other words, a determination is made, for example, whether the substitute codon entry 608 of the multi-property codon information table 602 indicates that the codon encountered should actually be treated as some other codon. If the answer is "yes," then the current codon is set to the substitute codon, as indicated by a Block 1312.

The next step is to determine whether the codon being processed is an "end" codon (e.g., one that signifies the end of the program/agent) as indicated by a Block 1314. If an "end" codon has been encountered, then the next step will be to proceed to Block 1620 of FIG. 16, as indicated by Block 1316. Otherwise, the next step will be to call an activation function, as indicated by a Block 1318.

The activation function of Block 1318 relates to the concept of probabilistic execution mentioned above, and is a programmatically configurable user-provided function that determines whether a codon is executed. Embodiments of the present invention contemplate that any number of techniques can be used to determine whether or not a codon encountered during execution should actually be executed. One such technique involves associating a codon with a number between 0 and 1, and then generating a random number between 0 and 1. If that random number is less than or equal to the number that is set as the activation level, the codon is executed. Otherwise, the codon is not executed. Thus, in this situation, a codon that is given an activation level of 0.7 would have a 70% chance of executing when encountered, whereas a codon having an activation level of 1 would have a 100% chance. The exemplary multi-property codon information table 602 of FIG. 6 has an entry 606 for entering such an activation level. Again, embodiments of the present invention contemplate that there are any number of ways to determine whether or not a codon is to be executed. In addition, it is also contemplated that a determination whether to execute a codon can be made at any number of points, such as, e.g., each time the codon is encountered, each time that the program (or sub-program) is executed (i.e., determine at the beginning of a program whether or not a particular codon will be executed for the entire program), etc. This feature allows context sensitive execution of a codon or program (e.g., execute instruction if temperature is above 50 degrees). Ultimately, the activation function for a codon could be another construct of codons, provided that measures were taken to prevent circularity (i.e., the activation of a codon dependent on the codon).

From the above, if the activation function is "true" (i.e., the codon is active based upon the activation function as described above), then the codon will be executed. Otherwise, an error flag will be set, as indicated by a Block 1324. In particular, the errors 614 and total errors 616 entries of multi-property codon information table 602 of FIG. 6 are contemplated to be updated for the codon at issue. Similarly, embodiments of the present invention also contemplate that errors column 320 of master codon table 304 of FIG. 3 can also be updated at this point. Of course, the present invention does contemplate any number of structures and entities for updating such information (i.e., the updating does not necessarily have to be to an "error" entry, as the non-execution of a codon may or may not be considered an error, as such). In any event, after such error records are updated, the next step in that situation would be go to "stage 2" of FIG. 16.

Figure 14:
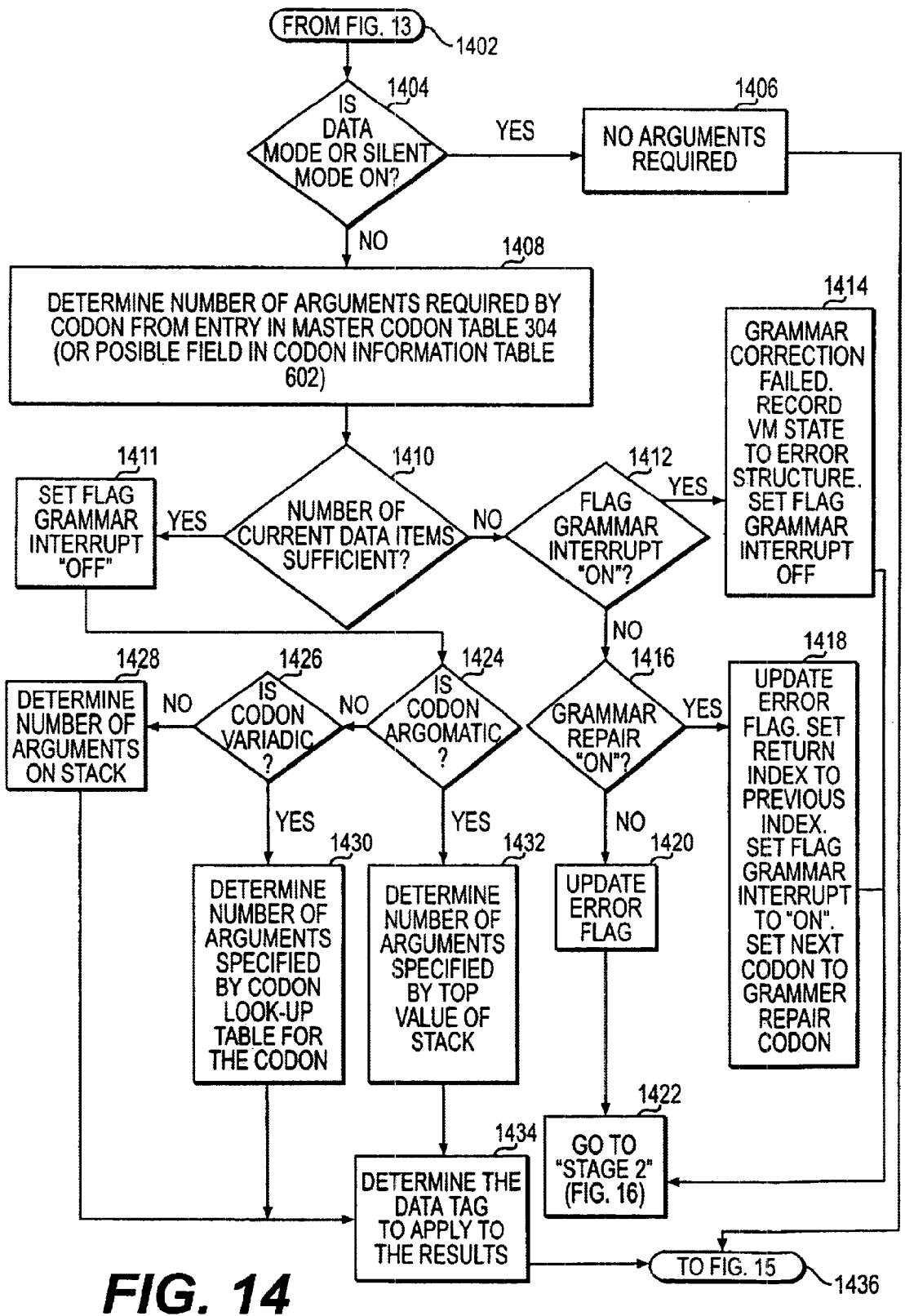

If, however, the codon is executed, then FIG. 14 indicates the steps that follow as contemplated by embodiments of the present invention. Referring now to FIG. 14, the next step is to determine whether the data mode or the silent mode have been turned on. This is indicated by a Decision Block 1404. If either has been turned on, then it is envisioned that the codon will not require any arguments (i.e., since the codon does not get executed), as indicated by a Block 1406. Control will then proceed to FIG. 15, as indicated by a Block 1436.

If neither data mode nor silent mode is on, the next step is to determine the number (and/or type) of arguments required by the codon (if any) as indicated by a Block 1408. It is envisioned that this information can be obtained from any number of places, including the "Num Args" column 314 of master codon table 304 of FIG. 3, or from some additional entry of the multi-property codon information table 602.

The next step is to determine whether the number of current data items is sufficient, as indicated by a Block 1410. In other words, a determination is made whether sufficient arguments exist as required by the specific codon being processed. Data type checking could also occur at this point (though embodiments of the present invention also contemplate that type checking can occur in the virtual machine functions). If the number of data items is not sufficient or the argument type is incorrect, then it is envisioned that embodiments of the present invention will determine whether grammar repair (as discussed above) has been turned on, and if so, it will attempt to implement it. Once the grammar repair has been implemented, embodiments of the present invention contemplate that control will loop back to the beginning of the codon execution process (i.e., to Block 1302), where the process begins anew, but this time, the codon should have the necessary number of arguments to fully execute as intended (i.e., to potentially yield some meaningful result). Since grammar repair may not always be successful, there should be a way to prevent this process from infinitely looping. This is accomplished using a flag grammar interrupt, which is initially set to the "off" position.

In view of the above, where the number of current data items is found to be insufficient as per Decision Block 1410, the next step is to determine whether the flag grammar interrupt is "on," as indicated by a Block 1412. If it were "off" (as would be the case if embodiments of the present invention had not just previously attempted grammar repair on this codon) then the next step would be to determine whether the grammar repair is set to "on" (i.e., it is desired to attempt to implement grammar repair) as indicated by a Block 1416. If grammar repair is not on, then the program will just continue to process codons and ignore the incorrect syntax that it found. Thus, as an error flag will be set, as indicated by a Block 1420, e.g., the appropriate entries in the master codon table 304 of FIG. 3 and/or multi-property codon information table of FIG. 602 are envisioned to be updated. Then, the next step is to go to "stage 2" of FIG. 16, as indicated by a Block 1422.

If, however, the grammar repair has been turned "on" as detected by Decision Block 1416 then, again, an error flag will be set. Block 1418 indicates this. In addition, an index for indicating which codon is currently being processed is set to the previous codon, so that the current codon can be processed again with the correct grammar, i.e., correct number of arguments. (The index is set to the previous codon because Block 1612 of FIG. 16 increments the index. Thus, setting the index to point to the previous codon will ultimately result in the index being set to the current one, so that the codon can be reprocessed with the correct number of arguments.) Still referring to Block 1418, the flag grammar interrupt is set "on" so that, when the codon is processed again, an infinite loop will be avoided. Also, at this point, the next codon is set to a grammar repair codon so the grammar will be repaired (or at least an attempt is made to do so) as, e.g., described above with regard to FIG. 9. Control will then go to stage 2 of FIG. 16, as indicated by Block 1422.

Returning back to Decision Block 1412, if the flag grammar interrupt is "on," this means that the grammar repair previously attempted had failed, as indicated by Block 1414. An error flag is then set, and the flag grammar interrupt will be turned "off," and the next step will be to go to stage 2 of FIG. 16. Block 1422 indicates this.

It should be understood that the grammar repair scheme described above using the flag grammar interrupt has been described by way of example, and that the present invention contemplates any number of other ways for implementing the various concepts relating thereto.

Returning to Decision Block 1410, if the number of current data items is sufficient (whether it was sufficient initially, or due to successful grammar repair as described above), the flag grammar interrupt is set to "off," as indicated by a Block 1411. This is done in the event that the grammar repair had just successfully worked (in which case the flag would have been set to "on"). Thus, now (i.e., at this point in the process) that the number of current items has been found to be sufficient, it is desirable to ensure that the flag grammar interrupt is set to the "off" position.

The next step is to then determine if the codon is argomatic, as indicated by a Decision Block 1424. Specifically, a determination is made whether the function is one where a number on the stack will indicate the number of arguments. If this is the case, then the present invention will determine the number of arguments specified by the top value of the stack (to later be used to load the appropriate data into the argument buffer) as indicated by a Block 1432.

If the codon is not argomatic, the next step is to determine whether the codon is variadic, as indicated by a Decision Block 1426. This refers to codons that require an unspecified and variable number of arguments. An example envisioned by the present invention includes a "sum" function, which sums all of the items that exist on a stack. If the codon is variadic, then the present invention will determine the number of arguments on the stack, as indicated by a block 1430.

Embodiments of the present invention contemplate that any number of schemes (e.g., some type of flagging mechanism) can be used for indicating that a function is variadic. One such example involves making the entry in the num args column 314 in master codon table 304 of FIG. 3 for a variadic function a negative number. Thus, for example, if the function could accept a maximum of 5 arguments, the number "-5" would go into the appropriate entry. Embodiments of the present invention contemplate that the function can be registered as a variadic function at start up. A variadic function would then take all the items on the stack prior to execution. Alternatively, by adding an additional column to the master codon table, a variety of "call styles" such as variadic, argomatic, can be defined. In some cases a function style flag that automatically passed the codon number or other codon field as the first argument can be used. This is useful for situations in which many codons utilize the same virtual machine function for processing (e.g., x.value, y.value).

Returning back to Decision Block 1426, if the codon is not variadic, (e.g., it is a codon such as the "+" operation) then embodiments of the present invention envision that any needed arguments are determined from the stack, as indicated by Block 1428.

Regardless of whether the codon is variadic or argomatic (or none of the above) the next step is to determine the data tag to apply to the results in accordance with FIG. 5 discussed above, as indicated by a Block 1434. Columns 504 (Stack Count), 506 (Stack Value), 508 (Stack Type), 510 (Origin), 512 (Origin Codon), 514 (Dependency), and 516 (Dependency Codon) are all updated. This is done prior to codon execution, as execution itself will change the stack.

Figure 15:
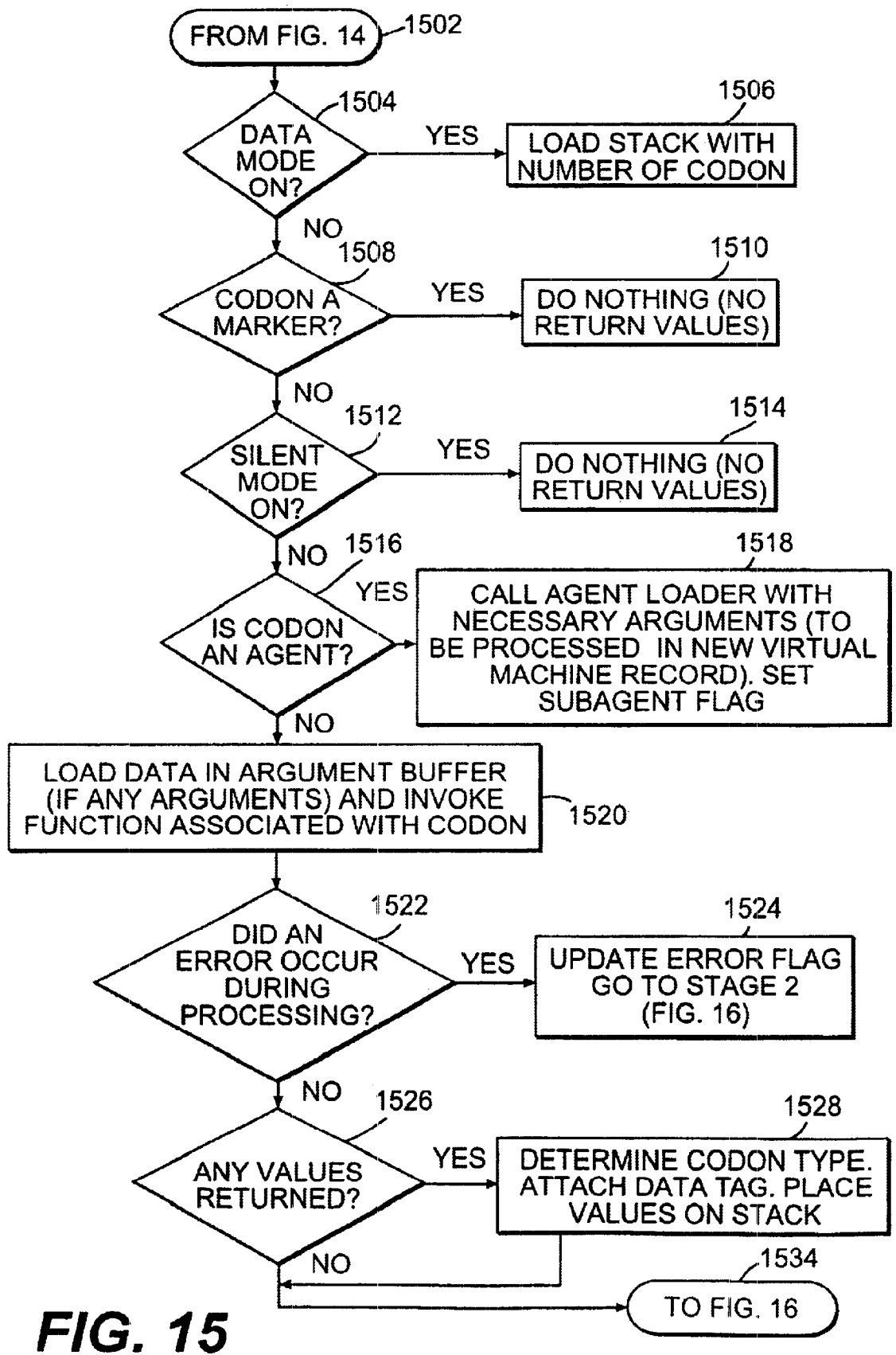

Once the data is marked for data tracking, the flow of operation proceeds to FIG. 15. Referring to FIG. 15, the next several Blocks, (in particular, Blocks 1504–1520) relate to determining the type of codon that is at issue, whether any special modes are active, and how the codon should be processed. Thus, the first step is to determine whether the data mode is "on" (e.g., whether the codon should be treated as data) as indicated by a Decision Block 1504. If it is "on," then the stack should simply be loaded with the number of the codon, as indicated by a Block 1506

If the data mode is not on, the next step is to determine whether the codon is a marker, as indicated by a Decision Block 1508. As indicated above, a marker is simply a named instance of the "no operation" (e.g., a placeholder in an agent that can be used as a reference point when searching through a program). If the answer is "yes" then nothing is to be done, as indicated by a Block 1510.

If the codon is not a marker, a determination is made whether the silent mode is on, as indicated by a Block 1512. If it is, then the codon being processed will be skipped over in the sense that no operation is performed, i.e., no result is generated, and there will be no return values, as indicated by a Block 1514.

If the silent mode is not on, then the next step is to determine whether the codon is an agent, as indicated by a Decision Block 1516. If it is, then an agent loader will be called, with the necessary arguments (i.e., the number of arguments required to process the agent, or at least as many as can be obtained) as indicated by a Block 1518. Also, a subagent flag will be set. Embodiments of the present invention envision that this prepares the agent to be subsequently processed at a new virtual machine record, as will be mentioned below.

If the codon was not an agent, then the present invention contemplates it is a single, "non-divisible" codon (e.g., an operation, constant, kernel function, etc.) with none of the special modes mentioned above turned on, and the codon will be processed by loading data into an argument buffer (if any arguments are required or exist) from the stack, and invoke the function associated with the codon, as indicated by a Block 1520.

Then, the next step, which is the same next step as if 1) the data mode were on, 2) the codon were a marker, 3) the silent mode was on, or 4) the codon were an agent, is to determine whether there were any errors that occurred during the processing of the codon as indicated above with regard to Blocks 1504–1520. If there were, the next step would be to set the error flag, and proceed to stage 2 at FIG. 16, as indicated by a Block 1524. Examples of errors that could occur at this phase include division by zero.

It should be understood that the sequence and manner of processing the codons as mentioned above with regard to steps 1504–1520 is by way of example, and that other ways of implementing the features described above are envisioned by the present invention.

Referring back to Decision Block 1522, if no errors occur during the processing, the next step is to determine whether any values were returned as a result of the processing (e.g., if the codon being executed were a "+" codon, a value should be returned resulting from the addition) as indicated by a Block 1526. If the answer is "yes," then the type of items that is (are) returned is determined (e.g., double, date, string, array, etc.). Data tags are attached to those results (as per FIG. 5) and the values are placed on the stack, as indicated by a Block 1528.

Figure 16:
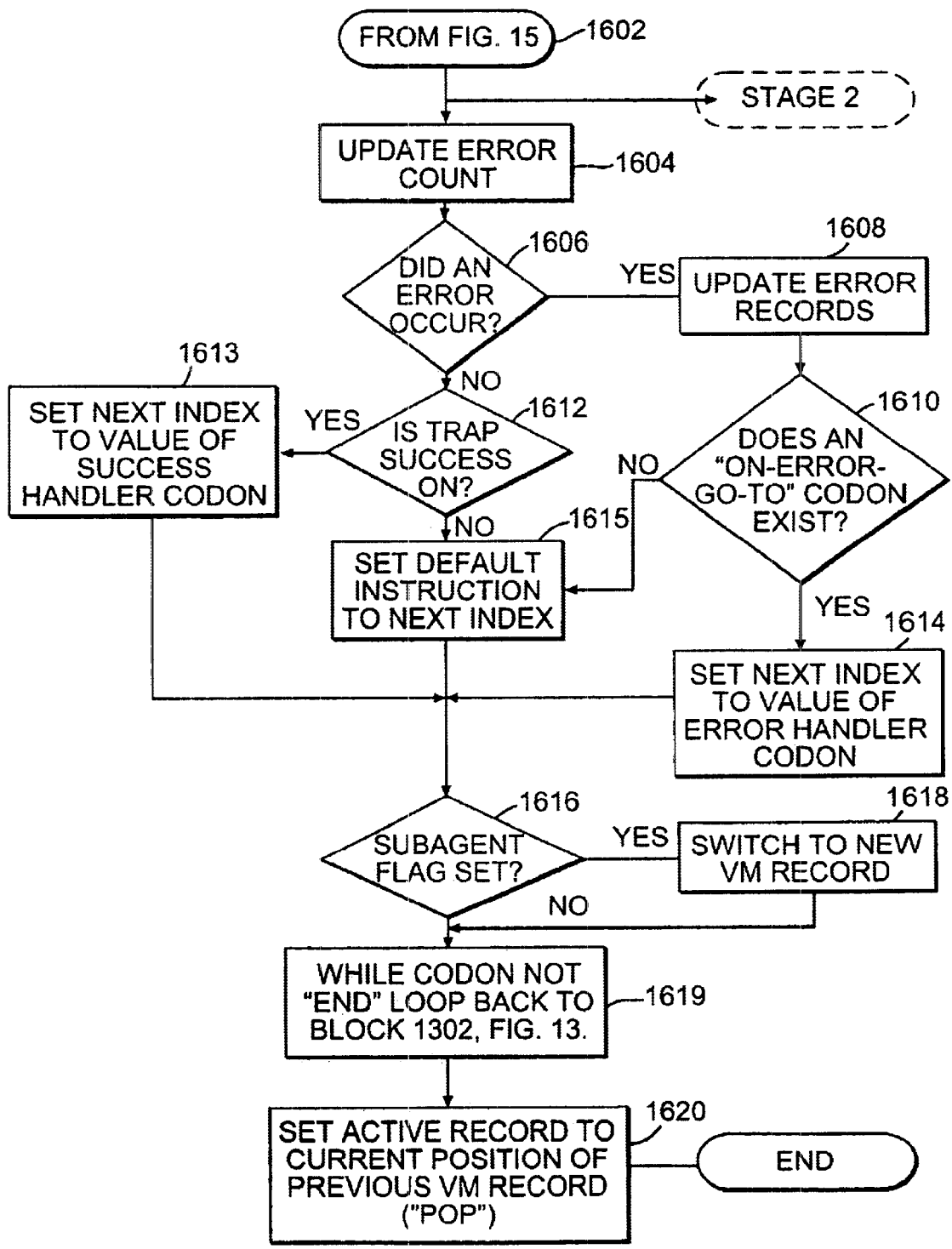

Whether or not values were returned, the next step is to proceed to the steps shown at FIG. 16, and in particular, to that part of the Figure denoted as Stage 2 (after Block 1602). The first step in this stage of FIG. 16 is to update the error count, as indicated by a Block 1604. The next step is to determine whether an error, in fact, occurred (as indicated by, e.g., an error flag) as shown by Block 1606. If it did, then in particular, at this stage, the error records in Master Codon table 304 of FIG. 3 and multi-property codon information table 602 of FIG. 6 are updated (as indicated by block 1608). After the errors are updated, a determination is made whether an "on-error-goto" codon exists, as indicated by a Decision Block 1610. In other words, a determination is made as to whether, in view of the occurrence of certain errors, there is a particular codon that should be executed. If there is, then the "next index" is set to the value of that particular codon so that it will be executed next, as indicated by a Block 1614 (and the next step will be block 1616, discussed below).

If no error occurred as per decision block 1606, then the next step is to determine whether "trapsuccess" is "on," as indicated by a decision block 1612. If it is, then the "next index" is set to the value of a "success handler codon," as indicated by a block 1613 (and the next step will be block 1616, discussed below). Otherwise, if it is not "on" (or if an "on-error-codon" does not exist as per decision block 1610), the default instruction is simply set to the next index (i.e., the next codon in the program being executed) as indicated by a Block 1615. Then, the next step is to determine whether or not the sub-agent flag has been set, indicating that the codon is an agent, and that a new virtual machine record should be switched into, as indicated by Decision Block 1616 and Block 1618. As mentioned above, this will cause the codons within the agent to be run at a separate record of the virtual machine (e.g., in a somewhat recursive fashion) and the process as described by FIGS. 14–16 will take place for the codons in the agent (until finished, whereupon the record (e.g., level) that called the agent will be "popped" back into). In addition, should this new record not be implementable for some reason, an error flag will be set. Otherwise, a switch is set, indicating that the new virtual machine record is a "subagent."

If the codon is not an "end" codon, then loop back to Block 1312 of FIG. 13, as indicated by a Block 1619. Otherwise, the active record is set to the previous virtual machine record to initiate a "pop" (as indicated by a Block 1620).

It should be understood that the particular steps shown and described above with regard to FIGS. 13–16 are by way of example, and that the present invention contemplates different ordering of the current steps, additional steps, and/or the deletion of certain steps in implementing the concepts contemplated herein.

Figure 17:
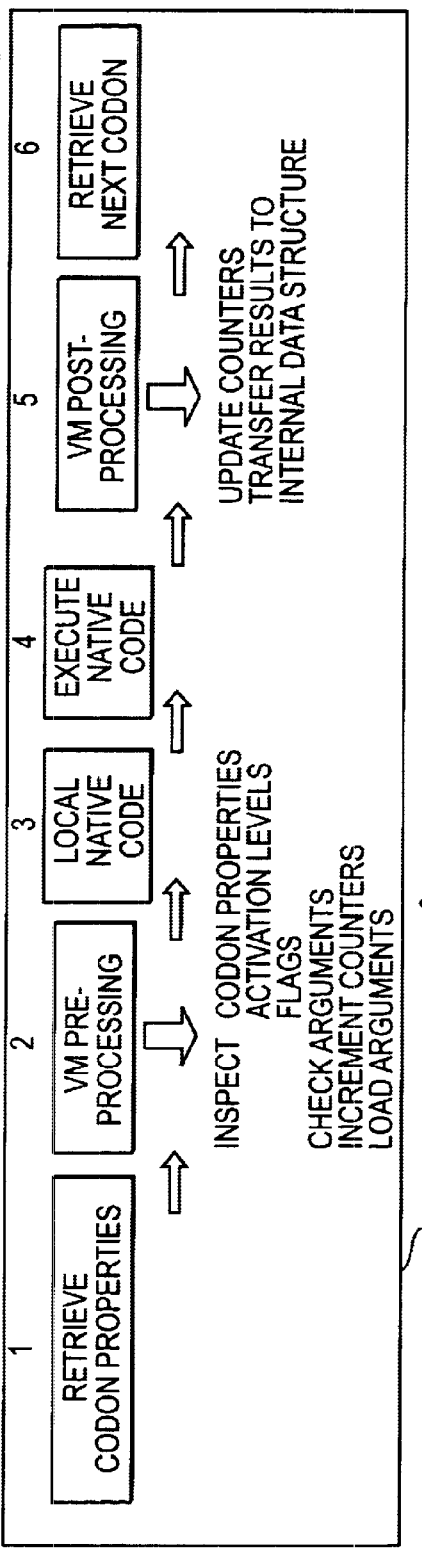
FIG. 17 is a high-level flow diagram depicting various exemplary aspects of the processing of codons.
Figure 17:
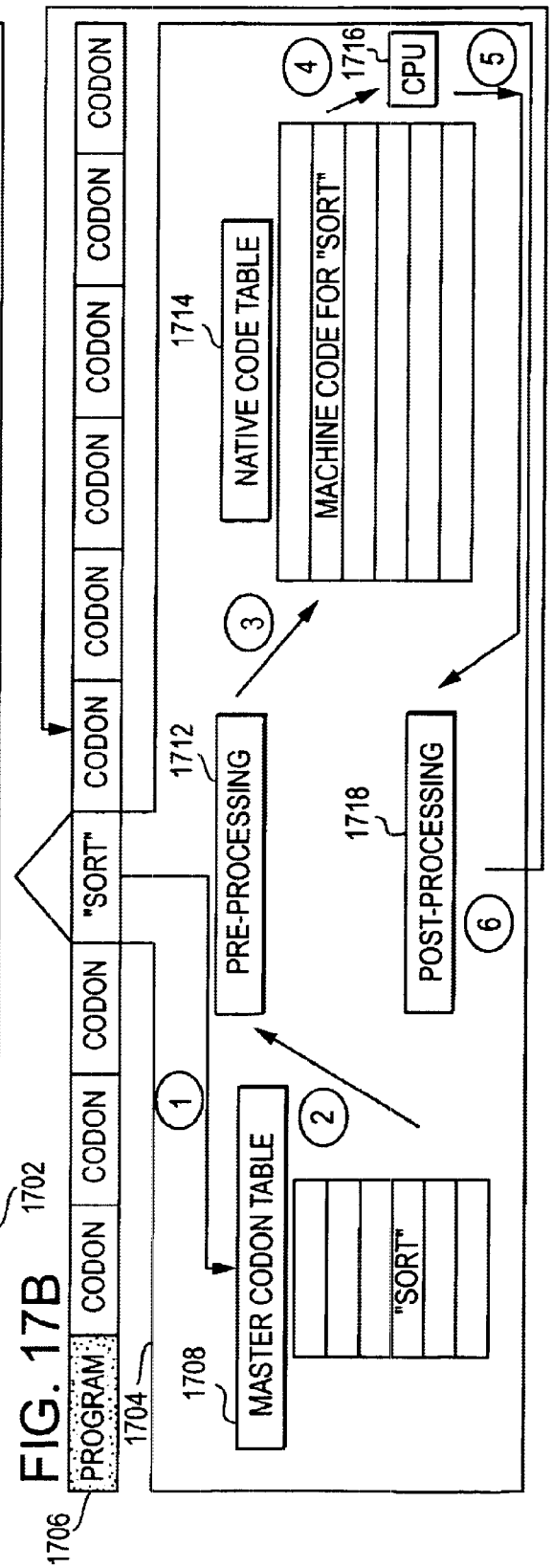

FIG. 17 depicts a high-level perspective as contemplated by embodiments of the present invention for processing a codon (when encountered) in the course of execution of a program. Referring now to FIG. 17, a program 1706 is shown, containing a number of codons, including (for example) a codon that initiates a "sort." Thus, in encountering and executing a codon (e.g., the "sort" codon), the next step is for the properties of the codon to be retrieved from a master codon table 1708. This step is depicted by oval 1 (i.e., the oval containing "1"), as well as by step 1 ("retrieve codon properties) of process sequence 1702 (each numbered step in process sequence 1702 being associated with its like-numbered oval in box 1704).

After retrieving the codon properties from the master codon table 1708, the next step is a "preprocessing step," as indicated by a block 1712. Referring to step 2 of processing sequence 1702 ("VM pre-processing"), it can be seen that pre-processing envisions any number of items to prepare for the actual execution of the codon. This can include inspection of codon properties (in either the master codon table 1708 or in a structure such as a multi-property codon information table as in FIG. 6) such as activation levels (606), various flags, etc.

The next step (step 3) is that the appropriate specific code for executing the function defined by the codon (in this case, "sort") is obtained. (This was also indicated in step 1520 of FIG. 15). In embodiments contemplated by the present invention, the code is kept in a native code table, as shown by item 1714. The native code table holds pointers to the code sequences (or holds the sequences themselves) associated with each codon.

The next step (step 4) is that the appropriate native code to execute the functionality of the "sort" codon (i.e., the appropriate code) is sent to CPU 1716 for processing. Once this is has been done, the post-processing step (step 5) is then initiated, as indicated by a block 1718. The post-processing step can include, for example, updating counters and transferring results to an internal data structure, so that the results can be obtained and evaluated for future use. The next step (step six) is to move to the next codon for processing.

It should be understood that the specific mechanisms shown in FIG. 17 for implementing the above concepts are by way of example, and that the present invention contemplates various other mechanisms for the implementation these concepts, as well.

Figure 18:
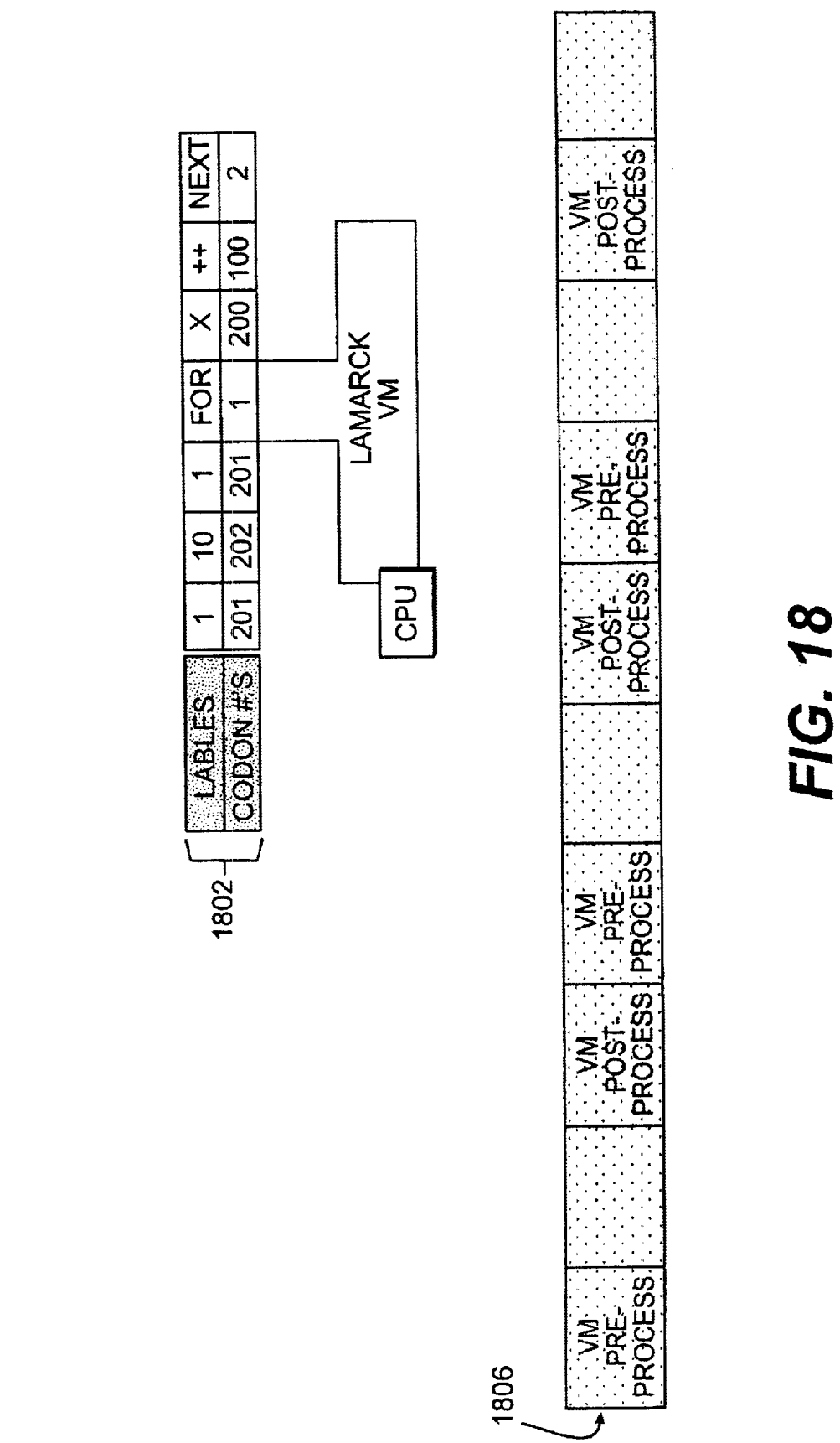
FIG. 18 is a block-diagram depicting the one-to-one mapping of objectized entities to codon numbers, as contemplated by embodiments of the present invention.

The technique and structure used in embodiments of the present invention results in a one-to-one mapping between those items that are encapsulated (i.e., represented by codons) and the numeric values used in representing the codons. This greatly enhances and facilitates the ability to, for example, implement genetic programming or to design self-modifying programs. (This type of one-to-one representation is not a feature of conventional programming languages). A depiction of such a one-to-one mapping is shown with regard to FIG. 18. Referring now to FIG. 18, a program 1802 (which is post-fixed notation for the program "For x=1 to 10 step 1") shows how each of the constituents of the program are mapped to a specific codon. For example, the number "1" is mapped to the codon number 201, "10" is mapped to codon number 202, etc. In this example, it is shown that the CPU is currently executing the "for" codon.

Sequence 1806 depicts a methodology for processing codons, wherein pre-processing and post-processing are utilized for each of the codons, as discussed above with regard to FIG. 17.

The present invention also contemplates use in environments where multiple computers are in contact with each other via some kind of network, such as the Internet This can allow for any number of communication activities to occur, such as, for example, distributed computing. An example of this process as contemplated is shown with regard to FIG. 19.

Figure 19:
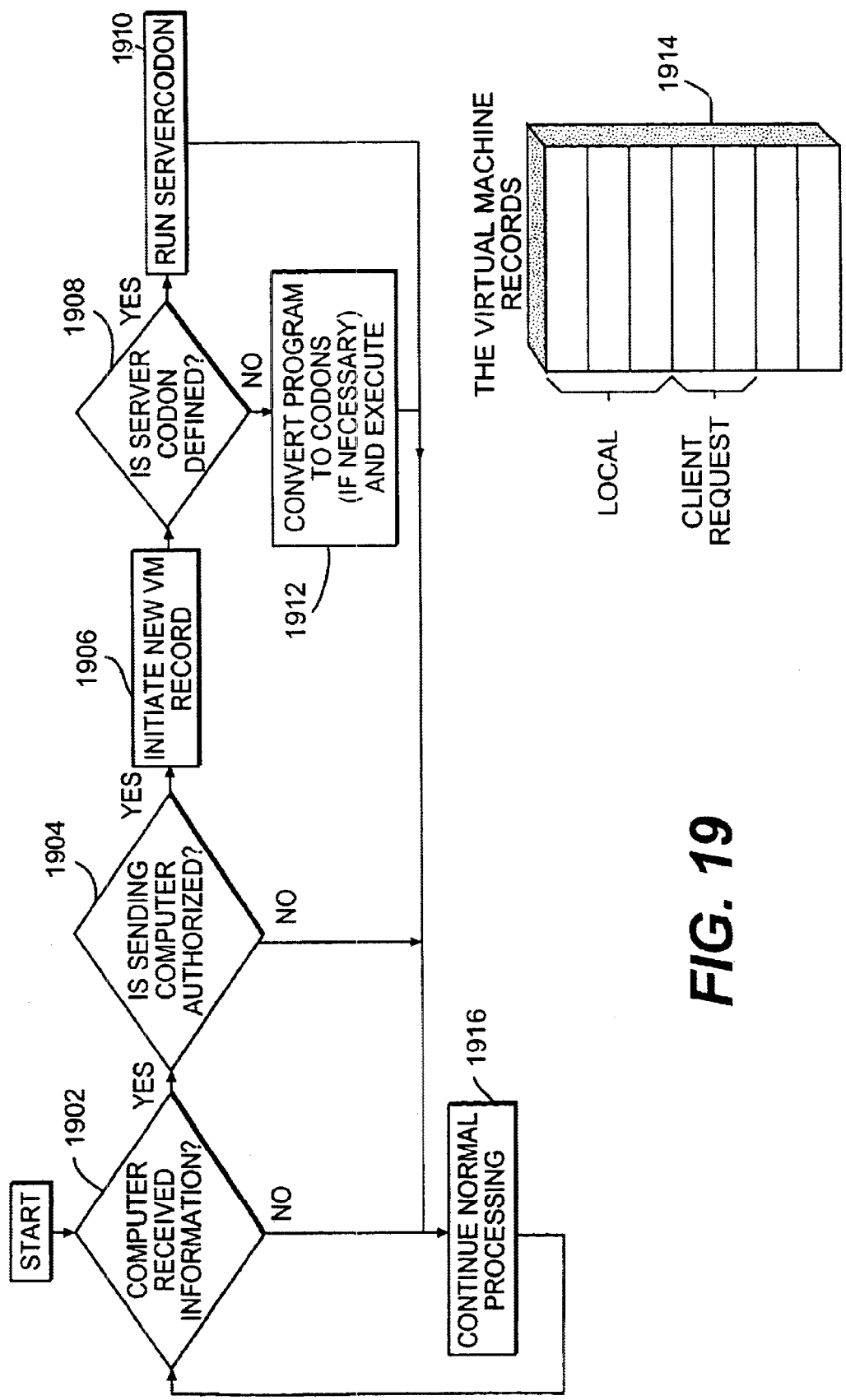
FIG. 19 is a flow diagram relating to network and internet distributed environments contemplated by the present invention.

Referring to FIG. 19, there is envisioned a computer in communication with some type of network, wherein the receiving computer continually runs in a loop until (or is interrupted when) information is received by, e.g., a communications port of the computer. A determination that the computer received information (from, e.g., a "sending computer") is indicated by a decision block 1902. If the computer has not received any information, then it continues normal processing, as indicated by a block 1916 (e.g., the computer continues to process other programs).

When the computer does receive information from, e.g., a "sending" computer, the receiving computer determines whether the sending computer has been authorized to send information that the receiving computer is allowed to receive. This is indicated by block 1904. If the answer is "no," the incoming information will be ignored, and the receiving computer will continue its previous processing/waiting state. If, however, the answer is "yes," then a new virtual machine record will be initiated, as shown by a block 1906. (Embodiments of the present invention contemplate that this is done in a manner as indicated in the previous flowcharts of FIGS. 13–16).

The next step is to determine if a "server codon" is defined, as indicated by a block 1908. As contemplated by embodiments of the present invention, a server codon is envisioned to be a codon that determines the type of information that has been received, and executes any procedures that are necessary to process the information. For example, if the information was created using a particular word processing program, then upon receipt of that information, the word processing program would be executed. Alternatively, the information received may be identified as an instant message and automatically displayed. Implementing this feature is contemplated to involve running the server codon, as indicated by a block 1910. (If no special procedures are necessary, the server codon merely executes the incoming codon(s) of the program.) If, however, no server codon is defined, then the information received is treated as a program and is merely executed (and converted into codon form, if necessary) as indicated by a block 1912. In either situation (1910 or 1912), when the task is completed, the virtual machine record level is "popped" back to the previous one, and normal processing 1916 again is continued.

Virtual machine records 1914 depict the area of storage used for local tasks (e.g., those that were active prior to receipt of the information by the sending computer) and "client" requests (e.g., those requests of the sending computer).

The scheme described above with regard to FIG. 19 offers numerous benefits. For example, a program can be sent by a sending computer to be run on a receiving computer to determine the receiving computer's current load. If, for example, the load is below a certain threshold level, the sending computer can send a task to be completed by the receiving computer. The same concept can be applied to a network of many computers where, for example, the computer with the least load would be the one that is sent the task to be done.

Embodiments of the present invention contemplate various specific inter-computer codons can be used in conjunction with the features mentioned above. For example, a "ClientPackage" codon can be used to contain the information being sent (e.g., to encapsulate the information and create certain header-type information). A "ClientIPAddress" codon is envisioned to contain the Internet address of the sending computer, while a "ClientPort" codon is envisioned to contain the port number from which the information was sent. A "ClientURL" codon is envisioned to contain the sending computer's uniform resource locator. A "ReturnIPAddress" codon is envisioned to contain an Internet address to send a "ClientPackage" (which may or may not be the same address as the ClientIPAddress) while a "ReturnPort" codon would specify the port at the "ReturnIPAddress." And lastly, "ReturnURL" codon is envisioned to contain a uniform resource locator of a computer to which a "ClientPackage" could be sent.

It should be understood that there are any number of ways contemplated by the present invention to implement the above-noted concepts, and that the specific implementation of FIG. 19 is merely by way of example.

Figure 20:
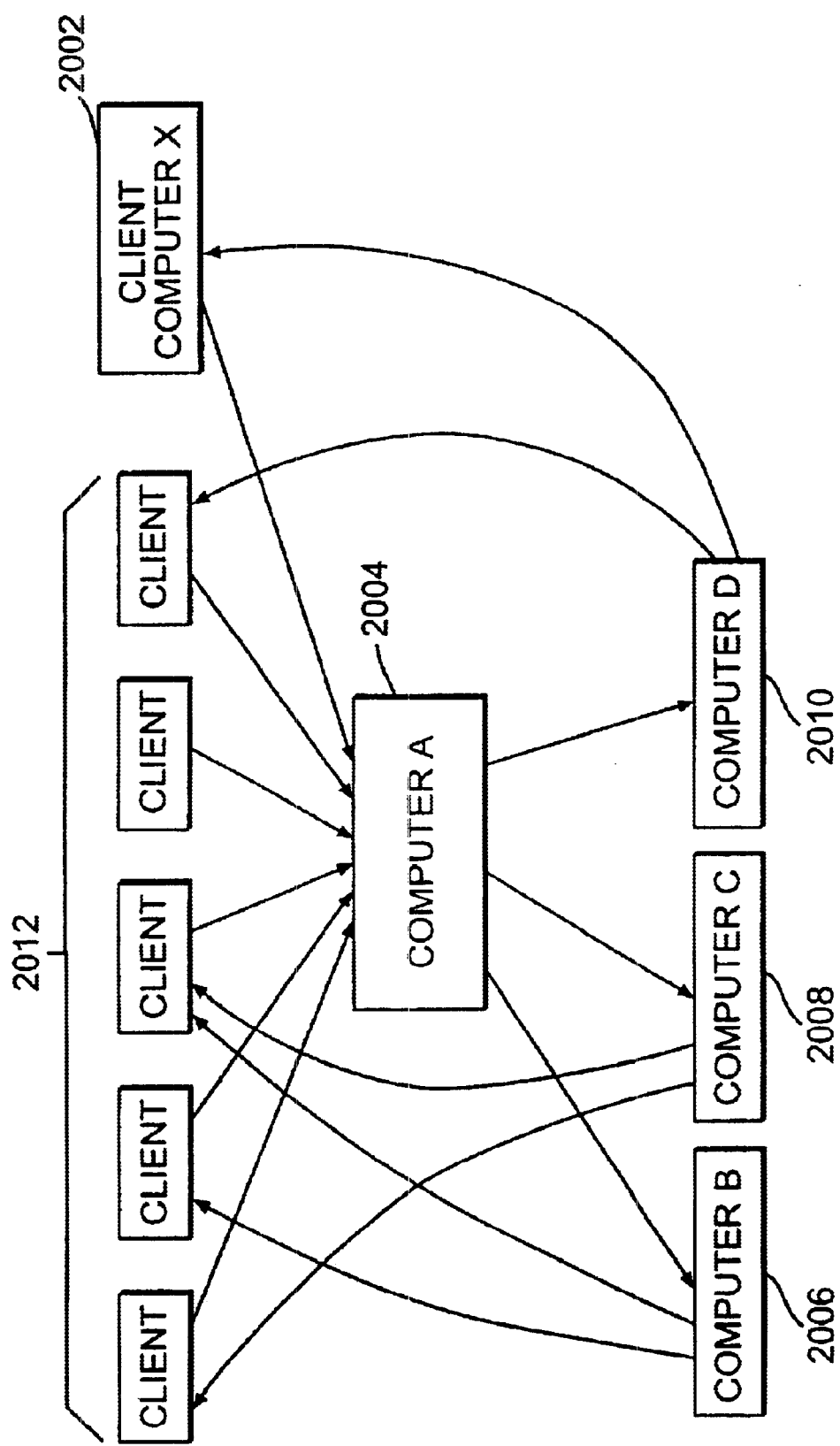
FIG. 20 is a diagram depicting an exemplary architecture for routing tasks, as contemplated by embodiments of the present invention.

Client/Server codons allow for many possible network architectures, and embodiments are shown with regard to FIG. 20. Referring to FIG. 20, in the example depicted by that Figure, a request to perform a given task is initiated by a client computer X (2002) and sent to Computer A for processing. Using the features envisioned by the present invention, the request could then be routed from computer A to, depending upon load, resources, etc., one or more of computers B, C, D, etc. Assuming (in this example) that Computer D (2010) processes (or helps process) the request, it is shown that Computer D then passes the result back to client computer X (2002). In addition to this specific example, FIG. 20 also indicates that more than one client can be involved in a given transaction. It should be understood that the virtual machine environment is contemplated to contain or be contained in, one or more of the various computers/clients shown.

Figure 21:
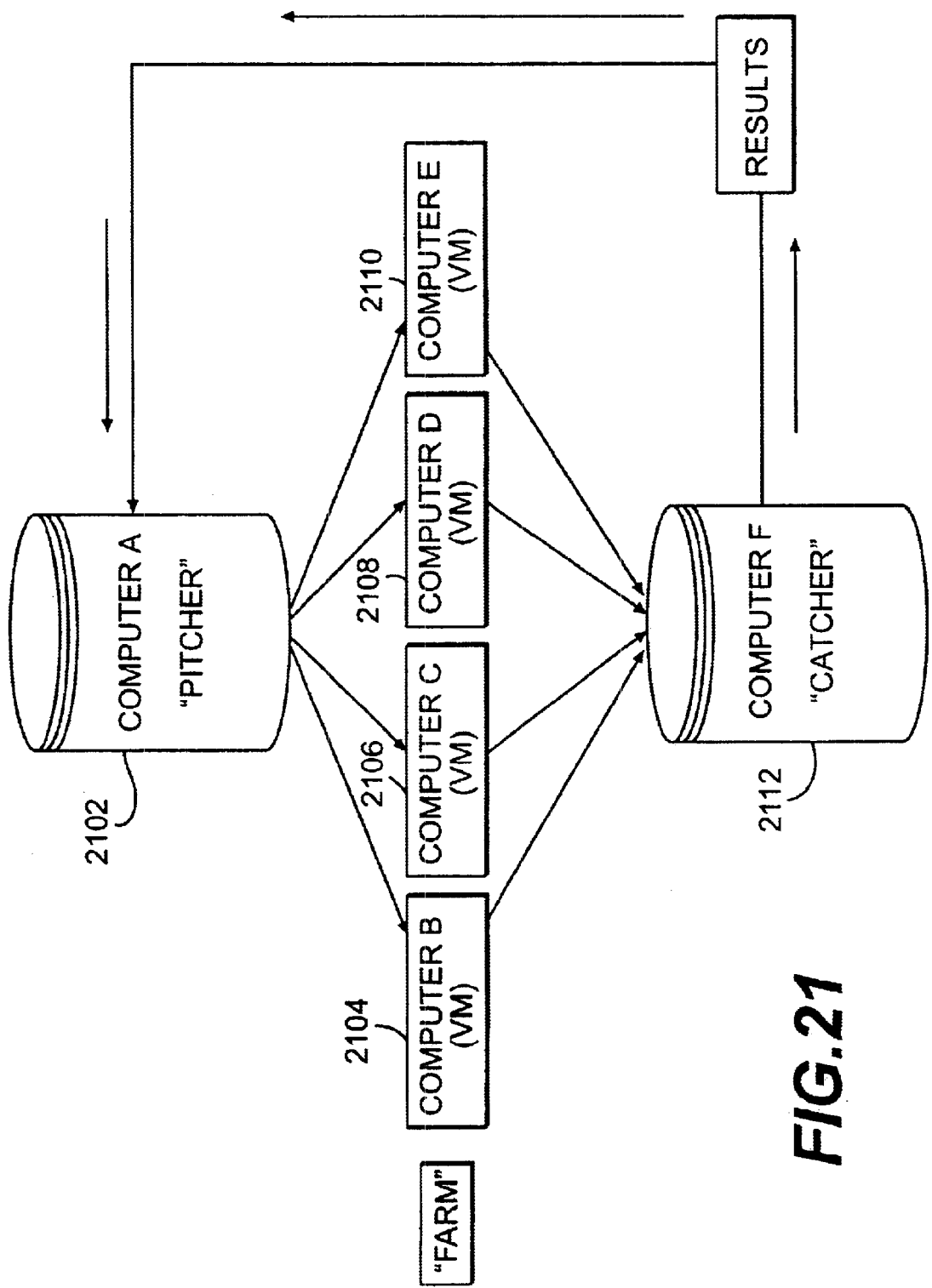
FIG. 21 is a diagram depicting an exemplary genetic algorithm/programming session.

Also, in embodiments envisioned by the present invention, FIG. 21 indicates that a computer A (2102) could be hosting a genetic algorithm/programming session and it could send generated populations out to a farm of, e.g., computers B through E (2104–2110) for evaluation. Those computers could then send their results to "catcher" computer 2112, for further processing, which then can return their results to Computer A.

Figure 22:
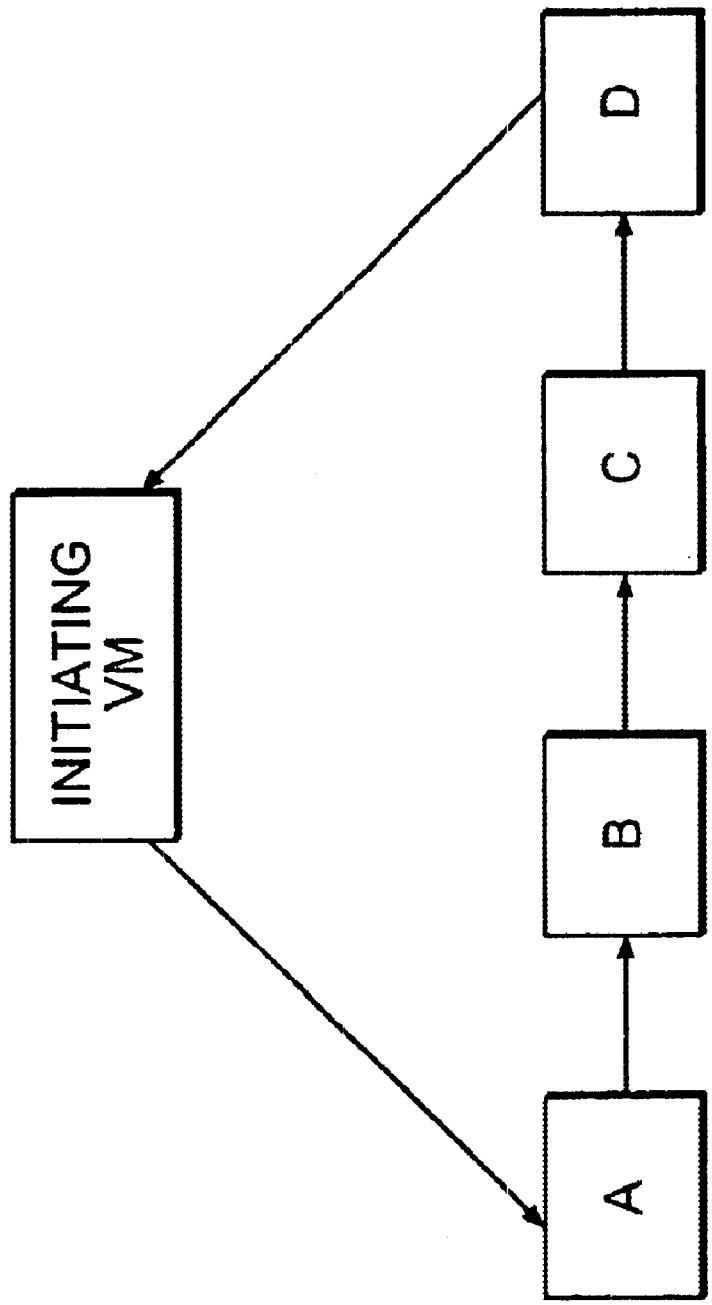
FIG. 22 is a diagram depicting the concept of certain machines performing specified tasks within the environment of the present invention.

In addition, embodiments of the present invention contemplate that a program could be passed from machine-to-machine with variations. Different machines could participate in an assembly line of production as each machine performs one particular task and passes its result onto the next machine. This concept is depicted by FIG. 22. Further, machines could echo the graphics on another machine. In general, inter-computer codons such as those mentioned herein can also enable simulation of biological viruses, remote adjustment and/or querying of the machine state, and collaboration among virtual machines.

Figure 23:
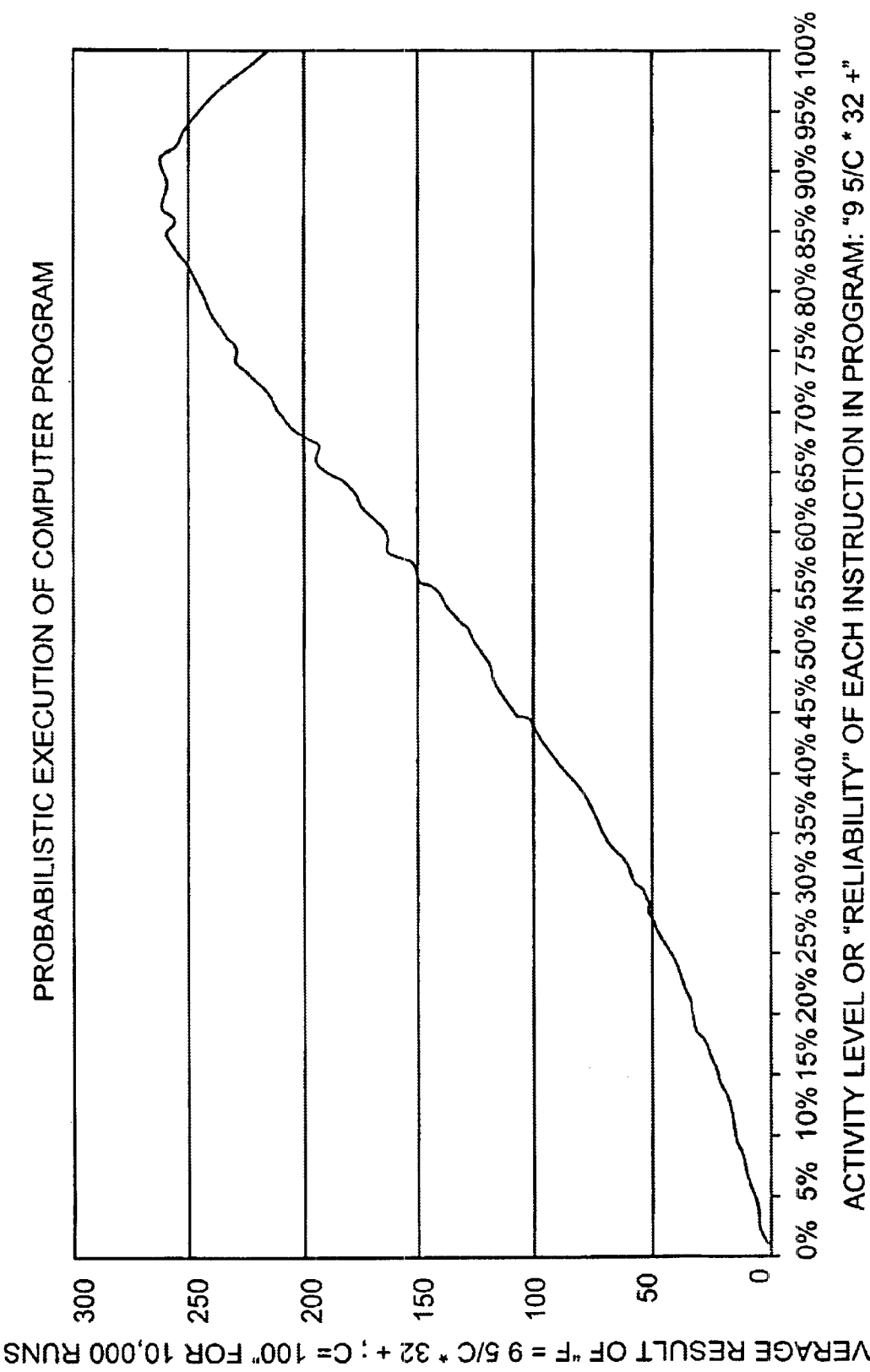
FIG. 23 is a chart depicting an exemplary implementation of probabilistic execution.

With regard to the concept of probabilistic execution mentioned above, FIG. 23 shows an example using the temperature conversion program $F=(9/5*C)+32$, for $C=100$, where the individual components (i.e., codons) in the equation are each given the same probability of executing. Referring now to FIG. 23, it is seen that the result approaches the true answer (i.e., 212 degrees F.) as the components have an increased chance of execution. Interestingly, the average numerical result peaks at about a 90% activity level (rather than at the 100% level). Thus, at this 90% level, certain combinations of active codons yielding high numerical results are more prevalent.

Regarding the example above, the numerical results of the possible active codon combinations are as follows:

Probabilistic Execution of "95/C*32+"

| | | |
|---|---|---|
| 1 | Expression/Program | |
| 128 | Combinations of Active Codons | |
| 50 | Combinations of Effective Codons | |
| 23 | Unique Results | |

| Instance | Active Codons | Effective Codons | Result |
|---|---|---|---|
| 1 | 9/C*32+ | 9C*32+ | 932.0 |
| 2 | 9C*32+ | 9C*32+ | 932.0 |
| 3 | 9/C*+ | 9C* | 900.0 |
| 4 | 9/C* | 9C* | 900.0 |
| 5 | 9C*+ | 9C* | 900.0 |
| 6 | 9C* | 9C* | 900.0 |
| 7 | 5/C*32+ | 5C*32+ | 532.0 |
| 8 | 5C*32+ | 5C*32+ | 532.0 |
| 9 | 95C*32+ | 95C*32+ | 532.0 |
| 10 | 95C*+ | 95C*+ | 509.0 |
| 11 | 5/C*+ | 5C* | 500.0 |
| 12 | 5/C* | 5C* | 500.0 |
| 13 | 5C*+ | 5C* | 500.0 |
| 14 | 5C* | 5C* | 500.0 |
| 15 | 95C* | 95C* | 500.0 |
| 16 | 95/C*32+ | 95/C*32+ | 212.0 |
| 17 | 95/C*+ | 95/C* | 180.0 |
| 18 | 95/C* | 95/C* | 180.0 |
| 19 | 5/C32+ | 5C32+ | 132.0 |
| 20 | 5C32+ | 5C32+ | 132.0 |
| 21 | 95/C32+ | 95/C32+ | 132.0 |
| 22 | 95C32+ | 95C32+ | 132.0 |
| 23 | 9/C32+ | 9C32+ | 132.0 |
| 24 | 9C32+ | 9C32+ | 132.0 |
| 25 | /C*32+ | C32+ | 132.0 |
| 26 | /C32+ | C32+ | 132.0 |
| 27 | C*32+ | C32+ | 132.0 |
| 28 | C32+ | C32+ | 132.0 |
| 29 | 9/C+ | 9C+ | 109.0 |
| 30 | 9C+ | 9C+ | 109.0 |
| 31 | 5/C+ | 5C+ | 105.0 |
| 32 | 5C+ | 5C+ | 105.0 |
| 33 | 95C+ | 95C+ | 105.0 |
| 34 | 95/C+ | 95/C+ | 101.8 |
| 35 | 5/C | 5C | 100.0 |
| 36 | 5C | 5C | 100.0 |
| 37 | 95/C | 95/C | 100.0 |
| 38 | 95C | 95C | 100.0 |
| 39 | 9/C | 9C | 100.0 |
| 40 | 9C | 9C | 100.0 |
| 41 | /C*+ | C | 100.0 |
| 42 | /C* | C | 100.0 |
| 43 | /C+ | C | 100.0 |
| 44 | /C | C | 100.0 |
| 45 | C*+ | C | 100.0 |
| 46 | C* | C | 100.0 |
| 47 | C+ | C | 100.0 |
| 48 | C | C | 100.0 |
| 49 | 95*32+ | 95*32+ | 77.0 |
| 50 | 95*+ | 95* | 45.0 |
| 51 | 95* | 95* | 45.0 |
| 52 | 9*32+ | 932+ | 41.0 |
| 53 | 9/*32+ | 932+ | 41.0 |
| 54 | 9/32+ | 932+ | 41.0 |
| 55 | 932+ | 932+ | 41.0 |
| 56 | 5*32+ | 532+ | 37.0 |
| 57 | 5/*32+ | 532+ | 37.0 |
| 58 | 5/32+ | 532+ | 37.0 |
| 59 | 532+ | 532+ | 37.0 |
| 60 | 9532+ | 9532+ | 37.0 |
| 61 | 95/*32+ | 95/32+ | 33.8 |
| 62 | 95/32+ | 95/32+ | 33.8 |
| 63 | *32+ | 32 | 32.0 |
| 64 | *32 | 32 | 32.0 |
| 65 | /*32+ | 32 | 32.0 |
| 66 | /*32 | 32 | 32.0 |
| 67 | /32+ | 32 | 32.0 |
| 68 | /32 | 32 | 32.0 |
| 69 | 32+ | 32 | 32.0 |
| 70 | 32 | 32 | 32.0 |
| 71 | 5*32 | 532 | 32.0 |
| 72 | 5/*32 | 532 | 32.0 |
| 73 | 5/32 | 532 | 32.0 |
| 74 | 532 | 532 | 32.0 |
| 75 | 5/C*32 | 5C*32 | 32.0 |
| 76 | 5C*32 | 5C*32 | 32.0 |
| 77 | 5/C32 | 5C32 | 32.0 |
| 78 | 5C32 | 5C32 | 32.0 |
| 79 | 9*32 | 932 | 32.0 |
| 80 | 9/*32 | 932 | 32.0 |
| 81 | 9/32 | 932 | 32.0 |
| 82 | 932 | 932 | 32.0 |
| 83 | 95*32 | 95*32 | 32.0 |
| 84 | 95/*32 | 95/32 | 32.0 |
| 85 | 95/32 | 95/32 | 32.0 |
| 86 | 95/C*32 | 95/C*32 | 32.0 |
| 87 | 95*C32 | 95/C32 | 32.0 |
| 88 | 9532 | 9532 | 32.0 |
| 89 | 95C*32 | 95C*32 | 32.0 |
| 90 | 95C32 | 95C32 | 32.0 |
| 91 | 9/C*32 | 9C*32 | 32.0 |
| 92 | 9C*32 | 9C*32 | 32.0 |
| 93 | 9/C32 | 9C32 | 32.0 |
| 94 | 9C32 | 9C32 | 32.0 |
| 95 | /C*32 | C32 | 32.0 |
| 96 | /C32 | C32 | 32.0 |
| 97 | C*32 | C32 | 32.0 |
| 98 | C32 | C32 | 32.0 |
| 99 | 95+ | 95+ | 14.0 |
| 100 | 9*+ | 9 | 9.0 |
| 101 | 9* | 9 | 9.0 |
| 102 | 9/*+ | 9 | 9.0 |
| 103 | 9* | 9 | 9.0 |
| 104 | 9/+ | 9 | 9.0 |
| 105 | 9/ | 9 | 9.0 |
| 106 | 9+ | 9 | 9.0 |
| 107 | 9 | 9 | 9.0 |
| 108 | 5*+ | 5 | 5.0 |
| 109 | 5* | 5 | 5.0 |
| 110 | 5/*+ | 5 | 5.0 |
| 111 | 5/* | 5 | 5.0 |
| 112 | 5*+ | 5 | 5.0 |
| 113 | 5/ | 5 | 5.0 |
| 114 | 5+ | 5 | 5.0 |
| 115 | 5 | 5 | 5.0 |
| 116 | 95 | 95 | 5.0 |
| 117 | 95/*+ | 95/ | 1.8 |
| 118 | 95/* | 95/ | 1.8 |
| 119 | 95/+ | 95/ | 1.8 |
| 120 | 95/ | 95/ | 1.8 |
| 121 | *+ | NULL | NULL |
| 122 | * | NULL | NULL |
| 123 | /*+ | NULL | NULL |
| 124 | /* | NULL | NULL |
| 125 | /+ | NULL | NULL |
| 126 | / | NULL | NULL |
| 127 | + | NULL | NULL |
| 128 | NULL | NULL | NULL |

It is envisioned that certain aspects of the present invention may be facilitated by the use of certain kernel functions (i.e., core codons), as described below. Some of these were mentioned above, and the use of some or all of them are envisioned to make up a programming language (or portion thereof) in which the features of the present invention as described above can be utilized. However, it should be understood that the present invention also contemplates that the various aspects described herein can also be implemented in any number of ways.

1. Elementary Language Constructs

| | |
|---|---|
| for | Sets up For . . . Next loop |
| forEach | For each item on the stack. Equivalent to [stack.count var1 let 1 var1 1 for] |
| next | End of FOR . . . NEXT. Apply continuation test. If true, jump to statement after FOR otherwise continue after NEXT. |
| do | Indicates start of DO . . . LOOP or DO . . . LOOPWHILE |
| dowhile | Do if top of stack is true (non-zero) |
| loop | Jump back to nearest "do" or "doWhile" |
| loopwhile | Jump back to nearest "do" or "doWhile" if top of stack is true (non-zero) |
| if | Execute the logic to follow if top of stack is true (non-zero) otherwise jump to [ELSE] |
| else | target of branching in IF . . . ELSE . . . ENDIF |
| endif | End of IF . . . ELSE . . . ENDIF |
| straddr | returns the storage address (RAM) of a text item. |
| strlen | returns the length of a text item. |
| strItem | given a text item/codon S and an index N, returns the character at S[N]. |
| strcat | Given two text items, concatenates them. |
| & | synonym for strcat |
| strcpy | Given a DESTINATION text variable and a SOURCE text item, copies SOURCE into DESTINATION. |
| strcmp | Compares two strings. Returns –1, 0, 1 |
| strMid | Given a text Item S, start Index N, and Length L, extracts L characters from S beginning at S[N]. |
| strLeft | Given a text item S and an integer, returns the left-most N characters of S. |
| strRight | Given a text item S and an integer N, returns the right-most N characters of S. |
| strFind | Given two text items, SOURCE and TARGET, returns the location of the first occurrence of TARGET in SOURCE. |
| CStr | Converts a numeric item to a text item. |
| Asc | Given a text item, returns the ASCII code of the first character. |
| Chr | Given a number N, returns a string containing ASCII code N. For example, [34 CHR] returns". |
| UCase | Converts a text item to upper case. |
| LCase | Converts a text item to lower case. |
| and | Used to perform a logical conjunction on two expressions. If both expressions are true then true is returned, otherwise false is returned. |
| or | Used to perform a logical disjunction on two expressions. If either or both the expressions are true then true is returned, otherwise false is returned. |
| not | Used to perform a logical negation on an expression. If expression is true then false is returned; if expression is false then true is returned. |
| eqv | Used to perform a logical equivalence on two expressions. If both expressions are true or false then true is returned, otherwise false is returned. |
| xor | Used to perform a logical exclusion on two expressions. If one and only one of the expressions is true then true is returned, otherwise false is returned. |
| imp | Used to perform a logical implication on two expressions. |
| > | Greater than comparison operator. With one argument, returns true (1) if argument is greater than 0, otherwise returns false. With two arguments, returns true (1) if the comparison is true, otherwise returns false. |
| < | Less than comparison operator. With one argument, returns true (1) if argument is less than 0, otherwise returns false. With two arguments, returns true if the comparison is true, otherwise returns false. |
| = | Equal to comparison operator. With one argument returns true (1) if argument equals 0, otherwise returns false. With two arguments, returns true if comparison is true, otherwise returns false. |
| >= | Greater than or equal to comparison operator. With one argument, returns true (1) if argument is greater than or equal to 0, otherwise returns false. With two arguments, returns true (1) if the comparison is true, otherwise returns false. |
| <= | Less than or equal to comparison operator. With one argument returns true (1) if argument is less than or equal to 0, otherwise returns false. With two arguments, returns true if the comparison is true, otherwise returns false. |
| <> | Not equal to comparison operator. With one argument returns true (1) if argument does not equal 0, otherwise returns false. With two arguments, returns true if comparison is true, otherwise returns false. |

2. Execution Control Codons

Arbitrarily combining programs frequently generates "infinite loops". To manage these situations, the present invention records status information as each instruction is executed. A set of instructions is provided to allow the user to automatically terminate a program or subroutine based upon the values of the status variables. For instance, the program expression "5 Agent.RunTime" would indicate to automatically terminate subroutines after 5 seconds.

Besides circular logic, both human and machine-generated programs frequently contain logic errors. As a result of the invention's fault tolerant aspects, it can be programmatically set to ignore (i.e. not stop) on errors.

Codons include:

| | |
|---|---|
| agent.runtime | Returns the number of ClockTicks since the current agent was started. |
| Agent.maxsteps | The maximum possible/allowed number of steps for this agent. |
| Agent.maxdepth | Sets or returns the maximum depth of the current agent. |
| Agent.maxerrors | Sets or returns the maximum number of errors for the current agent. |
| BreakOnError | Boolean. If true, stops and displays debug information when errors encountered. |

3. Textual to Codon Translation

As the present invention contemplates that each entity (e.g., a software instruction) can be represented as a codon number, there exists a need to translate back and forth between textual and numeric representations of programs and instructions. The following codons can help facilitate this process:

| | |
|---|---|
| AsData | Treat next instruction as data. |
| Agent.GetGenome | Return's the agent genome (or program) on the stack |
| GenomeToStack | Places the current genome (or program) on the stack |
| StackToGenome | Takes the stack, converts it into codons (where possible), and inserts them into the running agent after the current instruction/codon |
| stack.evaluate | Convert the stack into codons and evaluate the resulting program as a sub-agent (subroutine) |
| mem.evaluate | Given two agent memory indices, evaluate the contents as a sub-agent (subroutine). |
| LabelToCodon | Given a string, finds the matching codon number, if it exists. |
| TextToCodons | Given a string, converts it to codons. In effect, passes the text to the program parser. |
| CodonsToText | Converts codons to text. Useful for IO and computer communications. |
| TextToAgent | Converts text to an agent and adds it to the library. |

| | |
|---|---|
| Text.evaluate | Evaluates a given string as a program. |
| Text.transform | Evaluates a string of numbers as a program. |
| MakeConstantCodon | Gets top item from stack and creates a constant codon having its value. |
| MakeWildAgent | Takes what is on the stack, makes it an agent, stores it in the wild agent database and returns the newly assigned codon number of that agent. |
| DefineAgent | Creates an agent. Takes two arguments, the first is the name of the agent being defined, and the second is the number of arguments the agent takes. |
| Codon.Label | returns the text label which is used to refer to the codon in input and output. |

4. Three Modes

As indicated above, embodiments of the present invention contemplate three modes: Normal (i.e., execute), Data, and Silent. A set of instructions are needed to "toggle" in and out of each of the modes, which can include:

| | | |
|---|---|---|
| DataModeOn - Also initiated by "[" | | Switch on data mode. |
| DataModeOff - Also initiated by "]" | | Switch off data mode. |
| AsData - Also initiated by "#" | | Treat next instruction as data |
| SilentModeOn - Also <silent> | | Switch on silent mode. |
| SilentModeOff - Also </silent> | | Switch off silent mode. |

5. Introspection and Self-modification

The present invention facilitates the implementation of programs that can change their instructions, analyze other programs, and be arbitrarily combined. This means that all codon properties should be available at runtime, that programs can be loaded as data, and that individual elements of the program can be accessed. The following codons can assist in this:

| | |
|---|---|
| Codon Introspection | |
| Codon.Label | Given a codon, returns the label. |
| Codon.Type | Given a codon, returns the type. |
| Codon.Value | Given a codon, returns the value field. |
| Codon.NumArgs | Given a codon, returns the number of arguments. |
| Codon.Address | Given a codon, returns the address of the associated virtual machine function. |
| Codon.NumRets | Given a codon, returns the number of returns. |
| Codon.Errors | Given a codon, returns the number of times the codon has been evaluated and returned an error since the counters have been reset. |
| Codon.Instances | Given a codon, returns the number of times the codon has been evaluated since the counters have been reset. |
| Codon.RuntimeTotal | Given a codon, returns the number of seconds required to execute the codon on the last evaluation. |
| Codon.TrapGrammar | Given a codon, switches On/Off grammar repair for a given Codon C. [true 16 codon.trapGrammar] activates grammar repair for codon 16 (FOR). |
| Program Introspection | |
| Agent.Length | Given an agent, returns the number of codons in it. |
| Genome.Length | Returns the length of the active agent. |
| Agent.getgenome | Given an agent, returns the agent genome (or program) currently running. |
| GenomeItem | Given an integer N, returns the Nth codon in the active agent. |
| LocateNext | Given a codon X, returns the position of the PREVIOUS occurrence of X in the active Agent |
| LocatePrev | Given a codon X, returns the position of the NEXT occurrence of X in the active Agent |
| LocateFirst | Given a codon X, returns the position of the FIRST occurrence of X in the active Agent |
| LocateLast | Given a codon X, returns the position of the LAST occurrence of X in the active Agent |
| AgentItem | Given an agent and an index number in that agent, returns the codon at that position. |
| HasCodon | Given an AgentCodon X and another codon Y, Searches X and its sub agents for the presence of Y. |
| CodonDependencyList | Given a codon X, returns a list of agents which depend on X directly or through subAgents |
| Virtual Machine Introspection | |
| vmRecord.flagDataMode | Given DEPTH, returns the value of VM[depth].flagDataMode. Boolean: Is Virtual Machine in data mode? |
| vmRecord.flagDebug | Given DEPTH, returns the value of VM[depth.flagDebug. Boolean: Is Virtual Machine in step-wise debuggin mode? |
| vmRecord.flagBreakOnError | Given DEPTH, returns the value of VM[depth].flagBreakOnError. Boolean: Stop on errors? |

| | -continued |
|---|---|
| vmRecord.flagShareMemory | Given DEPTH, returns the value of VM[depth].flagShareMemory. Boolean: Share memory with sub-agents? |
| vmRecord.flagShareStack | Given DEPTH, returns the value of VM[depth].flagShareStack. Boolean: Share stack with sub-agents? |
| vmRecord.flagAgentCodon | Given DEPTH, returns the value of VM[depth].flagAgentCodon. Boolean: Does current codon represent an agent? |
| vmRecord.flagRedirection | Given DEPTH, returns the value of VM[depth].flagRedirection. Boolean: Is codon redirection allowed? |
| VmRecord.flagSwitchToSubAgent | Given DEPTH, returns the value of VM[depth].flagRedirection. Boolean: Process codon as sub-agent (new VM record)? |
| vmRecord.flagGrammarAction | Given DEPTH, returns the value of VM[depth].flagGrammarAction. Boolean: Is grammar repair in progress? |
| vmRecord.flagErrorAction | Given DEPTH, returns the value of VM[depth].flagGrammarAction Boolean: Is error handling in progress? |
| vmRecord.flagSuccessAction | Given DEPTH, returns the value of VM[depth].flagGrammarAction. Boolean: Is success handling in progress? |
| vmRecord.flagAbort | Given DEPTH, returns the value of VM[depth].flagAbort. Boolean: Has abort signal been received? |
| vmRecord.flagSubExpression | Given DEPTH, returns the value of VM[depth].flagAbort Boolean: Is sub-expression {} in progress? |
| vmRecord.flagSilentMode | Given DEPTH, returns the value of VM[depth].flagSilentMode. Boolean: Is Virtual Machine in Silent Mode? |
| vmRecord.flagSaveStack | Given DEPTH, returns the value of VM[depth].flagSaveStack. Boolean: Preserve stack contents (don't pop arguments)? Default = FALSE |
| vmRecord.errorNumber | Given DEPTH, returns the value of VM[depth].errorNumber. Last error number. |
| vmRecord.depth | Given DEPTH, returns the value of VM[depth].depth. Depth of this Virtual Machine record. |
| vmRecord.depthEntry | Given DEPTH, returns the value of VM[depth].depthEntry. Entry depth of this process. |
| vmRecord.depthParent | Given DEPTH, returns the value of VM[depth].depthParent. Depth of the parent of this agent/VM Record. |
| vmRecord.depthChild | Given DEPTH, returns the value of VM[depth].depthChild. Depth of the child of this agent/VM Record. |
| vmRecord.depthFN | Given DEPTH, returns the value of VM[depth].depthFN. Nesting depth of FOR . . . NEXT logic. |
| vmRecord.depthDL | Given DEPTH, returns the value of VM[depth].depthDL. Nesting depth of Do . . . LOOP logic. |
| vmRecord.depthIF | Given DEPTH, returns the value of VM[depth].depthIF. Nesting depth of IF . . . ELSE . . . ENDIF logic. |
| vmRecord.genome_length | Given DEPTH, returns the value of VM[depth].genome_length. Length of this Agent's genome/program in codons. |
| vmRecord.indexCurrent | Given DEPTH, returns the value of VM[depth].indexCurrent. Current instruction/codon index, I.e. position in program. |
| vmRecord.indexNext | Given DEPTH, returns the value of VM[depth].indexNext. Next instruction/codon to process. (May not be indexCurrent + 1) |
| vmRecord.indexResume | Given DEPTH, returns the value of VM[depth].indexResume. Instruction index for "RESUME" statements in the event of error or success handling. |

-continued

| | |
|---|---|
| vmRecord.indexDependency | Given DEPTH, returns the value of VM[depth].indexDependency. The "dependency" of the current instruction/codon. The earliest place in the genome/program required to calculate it. |
| vmRecord.codon | Given DEPTH, returns the value of VM[depth].codon. The current codon being processed. |
| vmRecord.codonLast | Given DEPTH, returns the value of VM[depth].codonLast. The previous codon processed. |
| vmRecord.codonNext | Given DEPTH, returns the value of VM[depth].codonNext. The next codon to process. This field is used to override the default behavior. (Typical use is to END an agent prematurely.) |
| vmRecord.codonGrammarAction | Given DEPTH, returns the value of VM[depth].codonGrammarAction. The codon to goto or invoke for grammar repair. |
| vmRecord.codonErrorAction | Given DEPTH, returns the value of VM[depth].codonErrorAction. The codon to goto or invoke for error handling. |
| vmRecord.codonSuccessAction | Given DEPTH, returns the value of VM[depth].codonSuccessAction. The codon to goto or invoke for success handling. |
| vmRecord.dp | Given DEPTH, returns the value of VM[depth].dp.The Agent's stack pointer. The number of items currently on the stack. |
| vmRecord.mp | Given DEPTH, returns the value of VM[depth].mp. The Agent's memory pointer. The number of items currently stored in agent memory. |
| VmRecord.nArgsAgent | Given DEPTH, returns the value of VM[depth].nArgsAgent. The number of arguments passed to this agent/VM record. |
| vmRecord.nArgsCodon | Given DEPTH, returns the value of VM[depth].ArgsCodon. The number of arguments used by the current codon. |
| vmRecord.nRets | Given DEPTH, returns the value of VM[depth].nRets. The number of values returned by the current codon. if nRets is less than zero, an error occurred. |
| vmRecord.maxStack | Given DEPTH, returns the value of VM[depth].maxStack. The maximum possible number of items that can be placed on the stack. |
| vmRecord.maxMem | Given DEPTH, returns the value of VM[depth].maxMem. The maximum possible number of agent memory items. |
| vmRecord.maxArgs | Given DEPTH, returns the value of VM[depth].maxArgs. The maximum possible number of agent argument items. |
| vmRecord.steps | Given DEPTH, returns the value of VM[depth].steps. The number of steps/codons taken by this agent. |
| vmRecord.errorCount | Given DEPTH, returns the value of VM[depth].errorCount. The current running count of errors that have occurred since starting the Virtual Machine. |
| vmRecord.maxSteps | Given DEPTH, returns the value of VM[depth].maxSteps. The maximum possible/allowed number of steps for this agent. |
| vmRecord.maxTimeMe | Given DEPTH, returns the value of VM[depth].maxTimeMe. The maximum allowed runtime for this agent in clockticks (CPU dependent). |
| vmRecord.maxTimeAgent | Given DEPTH, returns the value of VM[depth].maxTimeAgent. The maximum allowed runtime for sub-agents in clockticks (CPU dependent). |
| vmRecord.timeStart | Given DEPTH, returns the value of VM[depth].timeStart. The time when this agent started in clockTicks. |
| vmRecord.timeEnd | Given DEPTH, returns the value of VM[depth].timeEnd. The time when this agent was completed, paused, or transferred control to a subAgent. |
| vmRecord.timeElapsed | Given DEPTH, returns the value of VM[depth].timeElapsed. The cumulative runtime in clock ticks. |

| | -continued |
|---|---|
| vmRecord.ActionThreshold | Given DEPTH, returns the value of VM[depth].ActionThreshold. The ActionThreshold is a random number between 0 and 1 drawn at each codon. |
| vmRecord.Evaluation | Given DEPTH, returns the value of VM[depth].Evaluation. The return value (top value on the stack) as of this codon. |
| vmRecord.AgentName | Given DEPTH, returns the value of VM[depth].AgentName. Name of agent. |
| vmRecord.GenomeBuffer | Given DEPTH, returns the value of VM[depth].GenomeBuffer. Memory address of input/output buffer for agent programs. |
| vmRecord.D | Given DEPTH, returns the value of VM[depth].D. Memory address of the Data stack (items) of this agent. |
| vmRecord.A | Given DEPTH, returns the value of VM[depth].A. Memory address of the Argument space (items) for this agent. |
| vmRecord.M | Given DEPTH, returns the value of VM[depth].M. Memory address of the Agent Memory space (items) for this agent. |
| vmRecord.vmArgs | Given DEPTH, returns the value of VM[depth].vmArgs. Memory address of the Input/Output argument vector (items). |
| vmRecord.vmRets | Given DEPTH, returns the value of VM[depth].vmRets. Memory address of the input/output return vector (items). |
| vmRecord.Intron | Given DEPTH, returns the value of VM[depth].Intron. Memory address of the Agent's "Intron" vector |
| vmRecord.Genome | Given DEPTH, returns the value of VM[depth].Genome. Memory address of the Agent's genome/program (list of codons) |
| vmRecord.Var | Given DEPTH, returns the value of VM[depth].Var. Memory address of agents private register variables. Var1, Var2 |
| vmRecord.FN | Given DEPTH, returns the value of VM[depth].FN. Memory address of For . . . Next loop information structures. |
| vmRecord.DL | Given DEPTH, returns the value of VM[depth].DL. Memory address of Do . . . Loop information structures. |
| vmRecord.IF | Given DEPTH, returns the value of VM[depth].IF. Memory address of If . . . EndIf information structures |
| vmRecord.AV | Given DEPTH, returns the value of VM[depth].AV. Memory address of active variable information structure. |

6. Execute Agents as Subroutines and Stack Analysis

Program analysis requires codon properties. It is also aided by the ability to run/test agents as subroutines and to examine the properties of the data stack, i.e. "data tagging" and the multi-property codon information table 602. The following codons can assist in this:

| | |
|---|---|
| Stack.evaluate | Convert the stack into codons and evaluate the resulting program as a sub-agent (subroutine) |
| stack.value | Given an integer N, returns the VALUE of the Nth item on the active agent's stack. |
| stack.type | Given an integer N, returns the TYPE of the Nth item on the active agent's stack. |
| stack.origin | Given an integer N, returns the ORIGIN of the Nth item on the active agent's stack. "Origin" is the program index when the item was put on the stack. |
| stack.dependency | Given an integer N, returns the DEPENDENCY of the Nth item on the active agent's stack. "Dependecy" is the earliest genome/program index required to calculate the item. |
| stack.count | returns the number of items on the active agent's stack. |
| SaveStateOnExit | Save/Preserve stack after an agent is completed (true/false/query). Set to true for interactive or console mode. |
| SizeOfTreeMe | Given an instruction index in the active agent, returns the number of codons in the logical unit. |
| Agent.SizeOf Tree | Given an agent and an instruction/codon index, returns the number of codons in the logical unit |

7. Mutating Programs

Maker codons (which are silent instructions) are used to identify regions of the program to modify, or hold fixed.

Example:

MarkerColorBegin . . . Color logic entered here . . . MarkerColorEnd

A program can be inspected for the presence of markers by also using the following:

| | |
|---|---|
| LocateNext | Given a codon X, returns the position of the PREVIOUS occurrence of X in the active Agent |
| LocatePrev | Given a codon X, returns the position of the NEXT occurrence of X in the active Agent |
| LocateFirst | Given a codon X, returns the position of the FIRST occurrence of X in the active Agent |
| LocateLast | Given a codon X, returns the position of the LAST occurrence of X in the active Agent |

8. Programs that Write Other Programs

To synthesize "sensible" logic, codon properties must be available at runtime, and mode switching, the ability to treat programs as data or instructions, is required.

9. Self-Modification and Error-Handling

To perform self-modification and error handling requires state information ("introspection"). As a design philosophy, one may attempt to make all state information generated by the Virtual Machine in evaluating agents available to the agents themselves.

Metaphorically, to correct errors or make adjustments, one needs to know "Where am I? What went wrong? What was the configuration at the time of the error?" Embodiments of the present invention envision that the virtual machine environment consists of an array of state records and some global variables (usercount, steps, errors, lasterror, etc.). All this information is available in read-only mode to the agents. Agents can also query information about the processes that spawned them, enabling context sensitive logic (if this process called me then do x, otherwise do y).

10. Probabilistic Execution

In managing programs utilizing probabilistic execution (PE), embodiments of the present invention envision the use of certain codons. With PE, one can have selective behavior depending upon whether an instruction was executed (i.e. "successful") or inactive ("error"). If codons are "inactive" (i.e. their activation level—codon activity property—did not pass the activation test) an error is generated. In designing programs, the majority of instructions will be executed; therefore trapping every successful operation would not be helpful. Thus, designation of specific codons for error or success trapping is desirable. Codons provided for use in PE include:

| | |
|---|---|
| codon.TrapSuccess | switches On/Off success handling for a given Codon C. [true 16 codon.trapSuccess] activates success handling for codon 16 (FOR) |
| codon.TrapError | switches On/Off error handling for a given Codon C. [true 16 codon.trapError] activates error handling for codon 16 (FOR) |
| Codon.OnSuccessCodon | Sets the codon which executes if success handling is on for a given codon. |
| Codon.OnErrorCodon | Sets the codon which executes if error handling is on for a given codon. |
| ErrorFlag | returns TRUE (1) if the previous instruction generated an error and FALSE (0) otherwise. |
| SuccessFlag | returns TRUE (1) if the previous instruction was successful, defined as error-free, and FALSE (0) otherwise. |

A further implication of PE as contemplated by various environments of the present invention is that at runtime, in scenarios where multi-property or individuated codons are not in use (i.e., where all programs rely solely on a master codon table for activation information), the virtual machine environment needs to determine all the codons that an agent depends upon and set the activation to "on." For example, suppose Agent A call probabilistic Agent B. Agent A may contain a number of subroutines besides Agent B. Since Agent A and Agent B may share common codons, Agent B may render these codons inactive, thereby affecting the ability of Agent A to execute subsequently. Thus Agent A needs a way of turning all the affected codons back on at once. The mechanism for turning the codons back on cannot be an agent since its instructions are also subject to deactivation. Thus, the codon "SelfActivation" exists to turn on all instructions in an agent and its subagents.

11. Function Set Restriction

When breeding programs or "automatically creating programs" it may be important to restrict the function set, otherwise unwanted programs could be synthesized which for example could erase data on a hard drive. Thus instructions which control which codons can be used to generate programs by evolutionary methods are required. Introduced instructions include:

| | |
|---|---|
| codon.Clear | Given codon C, removes it from the codon table (de-registers). |
| DeregisterCodons | Given a list of codons, removes them from the codon table. |
| codon.redirect | Given codons A and B, redirects references to codon A to codon B in all subsequent programs. |
| LockCodonTable | Given an alpha-numeric password, locks the codon table so that no edits can be done by automatic/evolved programs. |
| UnLockCodonTable | Given the password that locked the codon table, this instruction unlocks the table. |
| Reset | This instruction re-activates all codons, resets redirection, drops any cached agents from memory. |
| SetPassword | Sets the password to lock the codon table. |

Also a user evolving a program for a specific purpose may want to select codons/properties that are allowed:

| | |
|---|---|
| FunctionSet | Given a list of codons, deactivates all except those in the list. |

12. Redirection

Redirection is useful to substitute one operation for another without having to change the program. The ability facilitates the conducting of experiments: what if we replace all references to Agent A with Agent B? Redirection is often used to change the destination of output, or used to nullify the effect of a function by replacing it with another "dummy" function having the same argument structure.

Since embodiments of the present invention envision the use of a multi-tasking virtual machine and/or a multi-threaded host environment, it is envisioned that the master codon table can be altered without stopping agents already in progress. This allows real-time correction or adjustment of programs. Effectively this process could be called "dynamically changeable, dynamically linkable" libraries. This allows one to write a new Agent B, which fixes the shortcomings of an Agent A, and then redirect references to Agent A to Agent B.

As an example, suppose one wanted to investigate what would happen if the "+" operation [arg1 arg2+] was replaced with "NewAdd"=[arg1 arg2+0.9*], i.e. adding the weight of A to B results in 90% of the weight of A plus the weight of B. This redirection would be circular since the definition of "NewAdd" contains "+", resulting in infinite recursion.

Step 1 Define "NewAdd": (a,b)NewAdd=(a b+)0.9*

Step 2 Redirect "+" to "NewAdd"

Step 3 Calling "1 1+" results in "1 1 NewAdd"="1 1 NewAdd 0.9*" which leads to infinite recursion Embodiments of the present invention envision that this infinite recursion issue can be overcome through the use of an on-off codon "Redirection," which switches off the redirection of the codon temporarily. In the definition of "New+", we turn the redirection of "+" off before using it and back on afterwards. This avoids the circularity and is a general method for redirecting Codon A to Codon B that must use Codon A.

Another simple use of redirect is to introduce alternative naming schemes. If a user desired to introduce a synonym for one of the built in instructions, he or she could create a codon which could be redirected to that codon. So, for example, if a user wished to introduce the terms "sub" and "endsub" to use instead of "datamodeon" and "datamodeoff" he could simply introduce them as codons and then redirect them to the "datamodeon" and "datamodeoff" respectively. The present invention allows for an arbitrary number of codons to be redirected to a single codon. This ability is useful in natural language processing.

Of course, it should be understood that the present invention contemplates that other types of core codons and related concepts beyond what was mentioned above can exist either as part of the initial virtual environment or can be subsequently designated and/or created by a user.

An exemplary header file for use in embodiments contemplated by the present invention is as follows:

```
/*
==================================================================
=============================
            VIRTUAL MACHINE
            DECLARATIONS HEADER FILE
==================================================================
==================================================================
=======================*/
#include <limits.h>   /* constants for sizes of integral types */
#include <float.h>           /* constants related to floating point arithmetic */
#include <time.h>            /* clock_t time_t */
#include <signal.h>   /* exception handling and valid signals */
#include <ctype.h>           /* toupper( ) tolower( ) consoleIO */
#include <math.h>
#include <stdio.h>
#include <stdlib.h>
#ifdef MS_WINDOWS
        #define max(a,b)    (((a) > (b)) ? (a):(b))
        #define min(a,b)    (((a) < (b)) ? (a):(b))
        #define WIN32_LEAN_AND_MEAN  /* Exclude rarely-used stuff from Windows headers */
        #include <windows.h>
        #define CALL_STYLE_stdcall
        #define LVM_MessageBox MessageBox
    /* Constants used for keyboard IO */
        #define   vbKeyEscape 27        /* ESCAPE key */
        #define   vbKeyPrint 42         /* PRINT SCREEN key */
        #define   vbKeyPause 19         /* PAUSE key (invokes debug message) */
            #include <basetsd.h>
        typedef LARGE_INTEGER   T_TIME;  /* _int64 = LARGE_INTEGER */
        #define L_DoEvents_Default 0.15     /* frequency in (seconds) to check OS events */
#else
    #define ANSI_Cplusplus
        #define dllimport
        #define _declspec(x)
        /*
        #define _stdcall    _attribute_((stdcall))
        #define _cdecl      _attribute_((cdecl))
        */
        #define CALL_STYLE
        // typedef void *   HWMD;
        #include "../Ver1.2L/windef_cpp.h"
        int LVM_MessageBox(HWND hWnd, const char *lpText, const char *lpCaption, unsigned int uType);
        #define          vbKeyEscape 27   /* ESCAPE key */
        #define          vbKeyPrint 42    /* PRINT SCREEN key */
        #define          vbKeyPause 401   /* PAUSE key (invokes debug message) */
        #define IDYES                   1
        #define IDNO                    2
        #define IDOK                    3
        #define MB_YESNO                4
        #define MB_YESNOCANCEL   5
        #define MB_OK                   6
    #define MB_OKCANCEL              7
    #define IDCANCEL                 8
        int kbdhit(int *input);
        getkey(int block,int raw,struct extended *e_keys);
        inline int_clearfp( ) { }
        typedef time_t  T_TIME;
        #define L_DoEvents_Default 0.33   /* frequency in (seconds) to check OS events */
#endif
/* common library header for DLL and application */
#ifdef MAKE_A_DLL
        #define LINKTYPE_declspec(dllexport)
#else
        #define LINKTYPE_declspec(dllimport)
```

-continued

```
#endif
#ifdef SINGLE_PRECISION
        #define L_OVERFLOW    FLT_MAX    /* max value = number that is
returned by VM when overflow errors occur. */
        #define L_UNDERFLOW FLT_MIN    /* min value = number that is returned
by VM when underflow errors occur */
        #define L_EPSILON      FLT_EPSILON /* Smallest number such that
1.0 + L_EPSILON != 1.0 */
        #define L_DIG          FLT_DIG     /* number of decimal
digits of precision */
        typedef   float T_REAL;
#else
        #define L_OVERFLOW    DBL_MAX    /* max value = number that is
returned by VM when overflow errors occur. */
        #define L_UNDERFLOW DBL_MIN    /* min value = number that is returned
by VM when underflow errors occur */
        #define L_EPSILON      DBL_EPSILON /* Smallest number such that
1.0 + L_EPSILON != 1.0 */
        #define L_DIG          DBL_DIG     /* number of decimal
digits of precision */
        typedef   double T_REAL;
#endif
/* Lamarck Variable types (also T_TIME and T_REAL above) ----- */
typedef void              T_VOID;
typedef unsigned char   T_BYTE;
typedef unsigned char   T_BOOLEAN;         /* Lamarck Boolean is FALSE =
0, TRUE<>0, usually TRUE = 1 */
typedef char              T_CHAR;
typedef signed char     T_SCHAR;
typedef unsigned char   T_UCHAR;
typedef short             T_SHORT;
typedef unsigned short T_USHORT;
typedef int               T_INT;
typedef unsigned int    T_UINT;
typedef long              T_LONG;
typedef unsigned long   T_ULONG;
typedef float             T_FLOAT;
typedef float             T_SINGLE;
typedef double      T_DOUBLE;
typedef bool              T_BOOL;
typedef time_t            T_TIME_T;
typedef clock_t           T_CLOCK_T;
typedef struct tm       T_TM;
typedef short             T_ERRNO;          /* Lamarck Error Number */
typedef short             T_DEPTH;          /* depth or complexity of a logic
structure */
typedef long              T_CODON;          /* storage type for "codons", individual
instruction numbers */
typedef long              T_INDEX;          /* integer -
genomes/stack/memory/argument/vmfn data index (upper bound =
L_MAX_DATA_STACK */
typedef unsigned long   T_COUNTER;           /* Lamarck counter: steps, errors,
etc. */
typedef unsigned long   T_MEM_ADDRESS;       /* generic memory address
size_t = unsigned long */
typedef double            T_VBDATE;
typedef double            T_VBTIME;
typedef struct {
        T_REAL value;
        T_CODON  type;
        T_INDEX  origin;
        T_INDEX dependency;
} T_ITEM;
typedef struct {
        size_t    nRows;
        size_t    nCols;
        T_LONG         RowMin;
        T_LONG         ColMin;
        T_DOUBLE**    pRows;
} T_MATRIX_INFO;
typedef struct {
        T_CODON  type;
        size_t    width;
        size_t    count;
        T_LONG    LBound;
        void*     pData;
} T_ARRAY_INFO;
/* --- Microsoft SafeArray Definition -- */
#define MAX_VBARRAY_DIMENSIONS 4
```

-continued

```
typedef struct {
        unsigned long    cElements;  /* number of elements in this dimension */
        long             lLbound;    /* Lower bound */
} T_VBARRAY_BOUND;
typedef struct {
        unsigned short   cDims;      /* count of dimensions */
        unsigned short   fFeatures;  /* flags */
        unsigned long    cbElements; /* size of an element of the array */
        unsigned long    cLocks;     /* lock counter */
        void             *pvData;    /* pointer to the data */
        T_VBARRAY_BOUND rgsabound[MAX_VBARRAY_DIMENSIONS];   /* one bound for each dimension */
} T_VBARRAY;
extern T_ITEM zeroITEM;
/* Lamarck Variable Type ID's (used for run-time peeking/poking/casting) */
#define ID_VOID            1
#define ID_BIT             2
#define ID_BYTE            3
#define ID_CHAR            4
#define ID_UCHAR           5
#define ID_SCHAR           6
#define ID_SHORT           7
#define ID_USHORT          8
#define ID_INT             9
#define ID_UINT            10
#define ID_LONG            11
#define ID_ULONG           12
#define ID_FLOAT           13
#define ID_SINGLE          14
#define ID_DOUBLE          15
#define ID_BOOL            16
#define ID_TIME_T          17
#define ID_CLOCK_T         18
#define ID_TM              19
#define ID_BOOLEAN         20
#define ID_MEM_ADDRESS     21
#define ID_INDEX           22
#define ID_COUNTER         23
#define ID_CODON           24
#define ID_DEPTH           25
#define ID_ERRNO           26
#define ID_REAL            27
#define ID_TIME            28
#define ID_VBDATE          29
#define ID_VBTIME          30
#define ID_ITEM            31
#define ID_CODON_INFO      32
#define ID_VMRECORD        33
#define ID_FORNEXT         34
#define ID_DOLOOP          35
#define ID_IFENDIF         36
#define ID_CODON_PARMS     37
#define ID_MATRIX_INFO     38
#define ID_ARRAY_INFO      39
/* ----------------------------- Capacity Parameters ------------------------------------ */
#define L_MAX_GENOME_LENGTH      1024             /* Max length of a program. Inc termination codon L_END */
#define L_MAX_AGENT_DEPTH        1024             /* Depth to which programs can call other programs */
#define L_MAX_NESTING_DEPTH      9                /* nesting depth of control flow structures */
#define L_MAX_STEPS              ULONG_MAX        /* max steps per agent. Count steps to curtail infinite loops */
#define L_MAX_DATA_STACK         65536            /* 256K Maximum elements on data stack */
#define L_SAFETY_STACK           10               /* Reserve elements in the event the stack is full */
#define L_MAX_AGENT_MEMORY       L_MAX_DATA_STACK /* Maximum elements in data set */
#define L_MAX_TEXT_LENGTH        65536            /* Maximum length of a text item */
#define L_MAX_LABEL_LENGTH       255              /* Maximum length of a codon text label */
#define L_MAX_VARIABLES          9                /* local variables per Agent (or per T_VMRECORD) */
#define L_MIN_CODON              0
#define L_MAX_CODON              L_MAX_DATA_STACK /* permissible range 0 to ULONG_MAX = 2^32 - 1 */
#define L_MAX_TIME               604800           /* =60 min * 60 sec * 24
```

-continued

```
hours * 7 days */
#define L_MAX_REDIRECT    10                    /* A -> B -> C -> D -> E
... 10 levels of codon redirection */
#define L_AGENT_CACHE_SIZE  L_MAX_CODON         /* Agents stored
in RAM */
#define L_MAX_TEXT_CODONS   L_MAX_CODON
#define L_MAX_DYNA_ITEMS    L_MAX_CODON
#define L_MAX_ERROR_TYPES   512
#define L_MAX_VAR_ARGS      9       /* Maximum arguments for a variable
                                       codon */
#define L_MAX_TAGS          9            /* Marker or Label codons
*/
#define L_DoEvents_Min            0.01
#define L_DoEvents_Max            60
#define L_MAX_MEM_ADDRESS         4294967295UL         /*
Maximum memory address 32-bit addressing */
#define L_Nary                    LONG_MAX       /* Used with
codon registration to indicate Lamarck n-ary function style ("ArgoMatic") */
#define L_ANY                     LONG_MIN       /* Flag to
indicate a function can take any number of arguments */
#define L_Password_Length         7
#define L_ConfigFileName          "LamarckVM.ini"
#define L_ListenerPort            2000
/* ---- VIRTUAL MACHINE (Capacity) Parameters ------ */
extern T_INDEX        vm_MAX_GENOME_LENGTH;
extern T_DEPTH        vm_MAX_AGENT_DEPTH;
extern T_DEPTH        vm_MAX_NESTING_DEPTH;
extern T_DEPTH        vm_MAX_VARIABLES;
extern T_DEPTH        vm_MAX_REDIRECT;
extern T_DEPTH        vm_MAX_TAGS;
extern T_CODON        vm_MAX_CODON;
extern T_CODON        vm_AGENT_CACHE_SIZE;
extern T_CODON        vm_MAX_TEXT_CODONS;
extern T_CODON        vm_MAX_DYNA_ITEMS;
extern T_INDEX        vm_MAX_DATA_STACK;
extern T_INDEX        vm_SAFETY_STACK;
extern T_INDEX        vm_MAX_AGENT_MEMORY;
extern T_INDEX        vm_MAX_VAR_ARGS;
extern T_INDEX        vm_MAX_TEXT_LENGTH;
extern T_INDEX        vm_MAX_LABEL_LENGTH;
extern T_COUNTER      vm_MAX_STEPS;
extern T_COUNTER      vm_MAX_TIME;
extern T_MEM_ADDRESS vm_MAX_MEM_ADDRESS;
extern T_ERRNO        vm_MAX_ERROR_TYPES;
extern T_INT          vm_ListenerPort;
/* ---------------------------- */
/* ---------------------------------------------------------- */
/* Constants used in error handling */
#define L_ERROR           -1
#define L_MAX_FACTORIAL  170            /* The largest factorial that can
be computed. Note 170! 7.257E+306 */
#define L_NA                      3.14E-271   /* Value used to identify missing
data from external sources */
#define L_ALL_CODONS     -1  /* flag to indicate to use all codons */
/* Constants used for logical functions and return values */
#define TRUE      1    /* Value returned for true logical calculation */
#define FALSE     0    /* Definition of false logical calculation/condition */
#define QUERY    -1  /* Constant used to query a switch setting rather than to set it
*/
#define OK        0    /* Process finished "okay" */
/*CodonTypes*/
#define L_ControlCodon      0
#define L_MemoryCodon       1
#define L_ArithmeticCodon   2
#define L_HigherMathCodon   3
#define L_StatisticsCodon   4
#define L_BooleanCodon      5
#define L_ComparisonCodon   6
#define L_WildCardCodon     7
#define L_MarkerCodon       8
#define L_FunctionCodon     99       /* 0-99 */
#define L_SystemConstant  100        /* Lamarck parameters, like L_ERROR ... */
#define L_DateCodon         101
#define L_TimeCodon         102
#define L_ColorCodon        103
#define L_AutomaticConstant 104
#define L_ConstantCodon     199      /* 100-199 */
#define L_AutoVarialCodon   200
#define L_VariableCodon     299        /* 200-299 */
```

-continued

```
#define L__UserInputCodon        300       /* codon which waits for input */
#define L__UserFNCodon           399       /* 300-399 */
#define L__WildAgentCodon        400       /* subset of agent codons */
#define L__TempAgentCodon        401
#define L__FileAgentcodon450
#define L__AgentCodon            499       /* 400-499 */
#define L__MatrixCodon           500       /* Matrix of Doubles */
#define L__ArrayCodon            501
#define L__VBArrayCodon          502       /* Visual Basic "Safe" Array */
#define L__TMCodon                        503       /* struct tm structure */
#define L__VectorCodon           599       /* 500-599 */
#define L__LabelItem                      600
#define L__TextConstantCodon 601
#define L__TextVariableCodon 602
#define L__AutomaticText         603
#define L__TextCodon                      699       /* 600-699 */
/* Virtual Machine Error Numbers */
#define L__ErrorNone                      0
#define L__ErrorCodonFn                   -1
#define L__ErrorMultiply                  -2
#define L__ErrorAddition                  -3
#define L__ErrorSciNum                    -4
#define L__ErrorDivision                  -5
#define L__ErrorQuotient                  -6
#define L__ErrorMod                       -7
#define L__ErrorPower                     -8
#define L__ErrorSine                      -9
#define L__ErroCosine                     -10
#define L__ErrorTangent                   -11
#define L__ErrorLog              -12
#define L__ErrorMathOther                 -13
#define L__ErrorMaxSteps                  -14
#define L__ErrorMaxTime                   -15
#define L__ErrorStackOverflow             -16
#define L__ErrorGenomeOverflow            -17
#define L__ErrorMemoryOverflow            -18
#define L__ErrorUndefined        -19
#define L__ErrorArgNA                     -20
#define L__ErrorMaxDepth         -21
#define L__ErrorInActive                  -22
#define L__ErrorInvalidArgument           -23
#define L__ErrorInsufficientArguments     -24
#define L__ErrorSurplusArguments          -25
#define L__ErrorPasswordRequired          -26
#define L__ErrorInvalidPassword  -27
#define L__ErrorMemoryAllocation          -28
#define L__ErrorStackSpace                -29
#define L__ErrorRegistration              -30
#define L__ErrorUnbalancedExpression      -31
#define L__ErrorRedefinition     -32
#define L__ErrorCodonLimit                -33
#define L__ErrorTextLength                -34
#define L__ErrorRequestTimeOut   -35
#define L__ErrorUserTermination  -36
#define L__ErrorReadOnly         -37
#define L__ErrorObjectInUse               -38
#define L__ErrorCircularLogic             -39
#define L__ErrorFileOperation             -40
#define L__ErrorUnexpectedResult -41
/* -- Constants used to reference virtual machine records (0 to L_MAX_DEPTH are
indices of vm[ ] in vmFieldInfo function */
#define L__vmSnapshotRecord      -1
#define L__vmErrorRecord   -2
#define L__vmSubRecord           -3
/* -- Virtual Machine Configuration Structure -- */
typedef struct
{
        T_INDEX     Max_Genome_Length;
        T_DEPTH     Max_Agent_Depth;
        T_DEPTH     Max_Nesting_Depth;
        T_DEPTH     Max_Variables;
        T_DEPTH     Max_Redirect;
        T_DEPTH     Max_Tags;
        T_CODON     Max_Codon;
        T_CODON     Max_Text_Codons;
        T_CODON     Agent_Cache_Size;
        T_INDEX     Max_Data_Stack;
        T_INDEX     Safety_Stack;
        T_INDEX     Max_Agent_Memory;
```

-continued

```
        T_INDEX      Max_Dyna_Items;
        T_INDEX      Max_Var_Args;
        T_INDEX      Max_Text_Length;
        T_INDEX      Max_Label_Length;
        T_COUNTER    Max_Steps;
        T_COUNTER    Max_Time;
        T_MEM_ADDRESS Max_Mem_Address;
        T_ERRNO      Max_Error_Types;
} T_VMCONFIG;
/* -- Virtual Machine Record Structure -- */
/* === Control Flow structures ==== */
typedef struct {
    T_INDEX ElseBit;
        T_INDEX    EndBit;
        T_BOOLEAN          TestResult;
} T_IFENDIF;
typedef struct {
    T_REAL          value;
        T_REAL         BegVal;
        T_REAL         EndVal;
        T_REAL         stepSize;
    T_COUNTER     LoopCount;
        T_INDEX        indexReturn;
        T_INDEX        indexNext;
        T_DEPTH        entryDepth;
        T_DEPTH        entryDepthDL;
        T_DEPTH        entryDepthIF;
} T_FORNEXT;
typedef struct {
        T_COUNTER      LoopCount;
        T_INDEX        indexReturn;
        T_DEPTH        entryDepth;
        T_DEPTH        entryDepthFN;
        T_DEPTH        entryDepthIF;
} T_DOLOOP;
typedef struct {
        T_CODON        codon;
        T_INDEX        ArgC;
        T_ITEM*        ArgV;
} T_CODON_PARMS;
typedef struct {
        long offset;
        int  varType;
} T_FLDINFO;
struct LAMARCK_SERVER;
/* -----------------------------------------------------------------------
        Any changes to T_VMRECORD need to be echoed in the vmFields information
structure
        and in the Registration of vmRecord._functions.
        Can't rearrange fields without making changes elsewhere.
----------------------------------------------------------------------- */
#define L_vmFields 76
typedef struct {
        T_BOOLEAN      flagDataMode;           /* treat codons as data.
Put instruction numbers (codon#s) on stack */
        T_BOOLEAN      flagDebug;              /* stop execution after
each codon */
        T_BOOLEAN      flagBreakOnError;       /* stop execution after each error
*/
        T_BOOLEAN      flagShareMemory;        /* share memory with sub-agent
*/
        T_BOOLEAN      flagShareStack;         /* share stack with sub-
agent */
        T_BOOLEAN      flagAgentCodon;         /* current codon "behaves
like" an agent (e.g. C_CALLME) */
        T_BOOLEAN      flagRedirection;        /* allow redirection of codons */
        T_BOOLEAN      flagSwitchToSubAgent;   /* transfer control to sub-
agent*/
        T_BOOLEAN      flagGrammarAction;      /* grammar repair in
process */
        T_BOOLEAN      flagErrorAction;        /* error repair in process */
        T_BOOLEAN      flagSuccessAction;
        T_BOOLEAN      flagAbort;              /* abort evaluation */
        T_BOOLEAN      flagSubExpression;      /* SubExpression in process (vs.
SubAgent) */
        T_BOOLEAN      flagSilentMode;
        T_BOOLEAN      flagSaveStack;
        T_BOOLEAN      flagCircularLogic;      /* Check for circular logic before
invoking agents */
```

-continued

```
        T_BOOLEAN       flagServerMode;
        T_ERRNO         errorNumber;        /* Error Number */
        T_DEPTH    depth;                   /* VM depth current */
        T_DEPTH         depthEntry;         /* VM record number of
"Process" entry point */
        T_DEPTH         depthParent;        /* VM record number of Parent Agent
(records can be interlaced) */
        T_DEPTH         depthChild;         /* VM record number of Child
Agent */
    T_DEPTH         depthFN;        /* Nesting of For..Next */
    T_DEPTH         depthDL;        /* Nesting of Do..Loop */
    T_DEPTH         depthIF;        /* Nesting of If..EndepthIF */
        T_DEPTH        maxDepthMe;           /* Maximum depth for
this agent */
        T_DEPTH        maxDepthSubs;        /* Maximum depth of sub agents
*/
        T_INDEX        genome_length;
        T_INDEX        indexCurrent;         /* (last) index into genome
*/
        T_INDEX        indexNext;
        T_INDEX        indexResume;         /* If an error occurs, jump back to
indexResume if L_RESUME issued */
        T_INDEX        indexDependency;
        T_CODON        codon;               /* (last) genetic code bit */
        T_CODON        codonLast;
        T_CODON        codonNext;
        T_CODON        codonErrorAction;    /* Jump execution to this marker
codon, Tag[1] .. Tag[9] if an error is encountered */
        T_CODON        codonGrammarAction;     /* Transfer execution
to this codon if insufficient arguments for a function (Grammar Interrupt) */
        T_CODON        codonSuccessAction;
        T_CODON        codorServerAction;
        T_INDEX        dp;                  /* Data stack pointer */
        T_INDEX        mp;                  /* number of items in
memory */
        T_INDEX   nArgsAgent;        /* number of arguments passed to agent
(args copied into A[ ]. */
        T_INDEX        nArgsCodon;          /* number of arguments for
current codon */
        T_INDEX        nRets;               /* return values from current
codon (or agent at C_END) */
        T_INDEX        lastArgC;
        T_INDEX        maxStack;
        T_INDEX        maxMem;
        T_INDEX        maxArgs;
        T_COUNTER      steps;               /* Total number of
instructions */
        T_COUNTER      errorCount;          /* Counts the number of
times the error handling routines are invoked */
        T_COUNTER      errorCountAtStart;   /* ErrorCount at Initialization */
    T_COUNTER     maxSteps;
        T_TIME    maxTimeMe;
        T_TIME    maxTimeAgent;
        T_TIME         timeStart;           /* time Agent started */
        T_TIME         timeEnd;             /* time when system time last
called. Initially, timeEnd = timeStart */
        T_TIME                 timeElapsed;  /* cumulative runtime. Adjusts for time
spent sitting in debug window */
        T_REAL                ActionThreshold;
        T_ITEM         Evaluation;          /* Evaluation */
    /* ---- Simple Pointers or "Pointer Variables". Vectors not allocated on per vmRecord
basis */
        T_CHAR             *AgentName;       /* pointer to Agent name
(passed to evaluate( )). Need for "SaveAgent" */
        T_CODON            *GenomeBuffer;
        T_CODON            ActVarType;
        T_VOID            *ptrActVar;
        LAMARCK_SERVER    *LamarckServer;
        T_ITEM            *D;        /* ptr to start of Agent
data stack, located in public D */
    T_ITEM         *A;                      /* ptr to start of Agent argument
space (Args passed to Agent) */
        T_ITEM         *M;                   /* ptr to start of Agent
Memory, located in public M */
        T_ITEM         *vmArgs;
        T_ITEM         *vmRets;
        /* ------ Pointers to allocated memory --------- */
        T_ERRNO            *Intron;          /* Use tor to determine trimmed,
deadwood-free, genome */
```

-continued

```
        T_CODON         *Genome;         /* Agent Program. String of Ints with
termination element, L_END */
        T_ITEM              *Var;            /* Private variables */
        T_FORNEXT   *FN;             /* Data structures for FOR..NEXT */
    T_DOLOOP        *DL;             /* Data structures for WHILE (expr)
DO..LOOP */
        T_IFENDIF           *IF;             /* data structure for IF..ELSE
..ENdepthIF */
        T_CODON_PARMS   *AV;         /* data structure for Parameters
of Active Variable */
} T_VMRECORD;
typedef struct {
        T_CODON             type;         /* Lamarck type */
        T_COUNTER           size;
        T_COUNTER           nElements;    /* length */
        T_MEM_ADDRESS address;
        T_COUNTER           instances;    /* Initialize with instances = 1 for
constants */
} T_DataDescriptor;
typedef struct {
        void *          address;
        T_MEM_ADDRESS bytes;
} T_MALLOC;
/* Define pointer to internal Virtual Machine Codon Function */
typedef T_INDEX (CALL_STYLE *T_pfnVM) (T_VMRECORD *pvm);
/* pointer to user-defined virtual machine function */
typedef T_INDEX (CALL_STYLE *T_pfnXVM)(T_CODON codon, T_INDEX nArgs);
/* pointer to AgentLoaderFunction or "Genome" Function */
typedef T_INDEX (CALL_STYLE "T_pfnGENOME)(T_CODON codon, T_CODON*
Genome, T_BOOLEAN rwOption);
/* pointer to User Event / KeyBoard activity function */
typedef int (CALL_STYLE *T_pfnKEYIO)(void);
/* pointer to Activation Function */
typedef T_BOOLEAN (CALL_STYLE *T_pfnACTIVATION)(T_VMRECORD *pvm);
/* Codon Information (Master Virtual Machine Instruction) */
typedef struct {
        T_REAL      value;
        T_REAL      Activity;
        T_COUNTER   useCount;
        T_COUNTER   instancesTotal;
        T_COUNTER   errorsTotal;
        T_COUNTER   instances;
        T_COUNTER   errors;
        T_INDEX     ArgC;
        T_INDEX     RetC;
        T_CODON     type;
        T_CODON     SubstituteCodon;
        T_CODON     trapGrammar;
        T_CODON     trapError;
        T_CODON     trapSuccess;
        T_CODON     StorageIndex;
        T_VOID*     vmFn;
        T_CHAR*     label;
        T_TIME      ClockTicks;
        T_TIME      ClockTicksTotal;
} T_CODON_INFO;
/* Chromatic Codon Information (Individualizable Virtual Machine Instruction) */
typedef struct {
        T_CODON     codon;
        T_REAL      Activity;
        T_CODON     SubstituteCodon;
        T_COUNTER   instances;
        T_COUNTER   instancesTotal;
        T_COUNTER   errors;
        T_COUNTER   errorsTotal;
        T_CODON     parentAgent;
        T_INDEX     parentIndex;
        T_REAL      userTag1;
        T_REAL      userTag2;
        T_TIME      ClockTicks;
        T_CODON     GrammarHandler;
        T_CODON     ErrorHandler;
        T_CODON     SuccessHandler;
} T_CHROMATIC_CODON;
typedef struct {
        T_CODON     codon;
        T_BOOLEAN   autoCache;
        T_CODON* ptrAgentGenome;    /* or T_CHROMATIC_CODON
*ptrAgentGenome */
```

-continued

```
} T_AGENT_INFO;
/* -------------------- Global variables -------------------- */
extern bool vmIsBoot;
extern bool vmAlphaSortRequired;
extern         T_VMRECORD *VM;
extern         T_CODON_INFO **vmCodons;
extern T_AGENT_INFO **vmAgentCodons;
extern T_FLDINFO *vmFields;
extern T_MALLOC *vmMallocTable;
extern T_pfnKEYIO vmPtrKeyHitFn;
extern   T_DEPTH        vmActiveDepth;
extern T_DEPTH    vmUserCount;
extern T_VMRECORD *pvmActive;
extern T_VMRECORD vmSnapshotRecord;
extern T_VMRECORD vmErrorRecord;
extern T_VMRECORD vmSubRecord;
extern T_CODON vmCodonCount;
extern T_CODON vmAgentCacheCount;
extern T_CODON vmTextCodonCount;
extern T_CODON vmAgenCodonCount;
extern         T_CODON vmAgentCount;
extern T_CODON *AgentBuffer;
extern T_CODON *vmAlphaIndex;
extern T_CODON *vmTextCodons;
extern T_CODON *vmRedirectList;
extern         T_ITEM *D;
extern T_ITEM *A;
extern T_ITEM *M;
extern T_ITEM *GVar;
extern         T_COUNTER vmSteps;
extern         T_COUNTER vmErrorCount;
extern T_COUNTER vmFieldCount;
extern         T_ERRNO vmErrorNumber;
extern T_ERRNO vmErrorTypes;
extern T_CHAR **vmErrorMsgs;
extern T_CHAR **vmErrorMessage;
extern T_CHAR    *vmStatusMessage;
extern T_CHAR *vmCodonLabelBuffer;
extern T_SHORT    vmUserKeyStroke;
extern T_CHAR            vmCodonTablePassword[L_Password_Length+1];
extern T_BOOLEAN    vmCodonTableLocked;
extern T_BOOLEAN *HasCodon;
extern bool vmBreakOnErrorDefault;
extern unsigned int vmRandomSeed;
extern time_t vmTimeBoot;
extern T_TIME     vmEventCheckInterval;
extern T_TIME     vmTimeNow;
extern   TIME     vmTimeCheckEvents;
extern T_TIME     vmTimeRun;
extern T_TIME     vmClockTicksPerSecond;
extern T_TIME     vmTickClockStart;
extern T_TIME     vmTickClockEnd;
extern T_TIME     vmTickClockBoot;
extern T_COUNTER vmMallocCountTotal;
extern T_COUNTER vmMallocCountNet;
extern T_COUNTER vmMallocCountPeak;
extern T_COUNTER vmMallocBytesTotal;
extern T_COUNTER vmMallocBytesNet;
extern T_COUNTER vmMallocBytesPeak;
extern T_BOOLEAN vmCumulativeMode;
extern FILE           *vmLogFILE;
extern T_BOOLEAN    vmLogOption;
#define  vmLogName    "LamarckVM.Log"
extern T_COUNTER vmPeakD;
extern T_COUNTER vmPeakM;
extern T_COUNTER vmPeakA;
extern T_pfnACTIVATION vmActFn;
/*
===============================================================
============================
    Aliases for machine codes, "Codons". Virtual Machine Instruction Set
        Technically, only need to know the aliases of certain control-flow functions,
            such as C_END, C_IF . . . C_ELSE . . . C_ENDIF C_FOR . . . C_NEXT C_VAR1,
C_VAR2, C_VAR3.
===============================================================
============================ */
extern T_CODON C_END;
extern T_CODON C_NOP;
extern T_CODON C_NOP1;
```

-continued

```
extern T_CODON C_NOP2;
extern T_CODON C_DEBUG;
extern T_CODON C_G1;
extern T_CODON C_VAR1;
extern T_CODON C_ARG;
extern T_CODON C_ARG1;
extern T_CODON C_TAG1;
extern T_CODON C_TAG9;
extern T_CODON C_I1;
extern T_CODON C_ForEach;
extern T_CODON C_FOR;
extern T_CODON C_NEXT;
extern T_CODON C_DO;
extern T_CODON C_DOWHILE;
extern T_CODON C_LOOP;
extern T_CODON C_LOOPWHILE;
extern T_CODON C_IF;
extern T_CODON C_ELSE;
extern T_CODON C_ENDIF;
extern T_CODON C_BreakOnError;
extern T_CODON C_BegExpr;
extern T_CODON C_EndExpr;
extern T_CODON C_DataModeOn1;
extern T_CODON C_DataModeOn2;
extern T_CODON C_DataModeOff1;
extern T_CODON C_DataModeOff2;
extern T_CODON C_SilentModeOff;
extern T_CODON C_TEXTVAR1;
extern T_CODON C_AsData;
extern T_CODON C_AsData2;
extern T_CODON C_AsMarker;
extern T_CODON C_AsFloat;
/* ========== End of instruction Aliases ========== */
/* --- Macro substitution functions --- */
#define IsFunctionCodon(CodonType)    (0 <= (CodonType) && (CodonType) <=
L_FunctionCodon)
#define IsConstantCodon(CodonType)    (L_FunctionCodon < (CodonType) &&
(CodonType) <= L_ConstantCodon)
#define IsVariable_Codon(CodonType)   (L_ConstantCodon < (CodonType) &&
(CodonType) <= L_VariableCodon)
#define IsUserFNCodon(CodonType)      (L_VariableCodon < (CodonType) &&
(CodonType) <= L_UserFNCodon)
#define IsAgentCodon(CodonType)       (L_UserFNCodon < (CodonType) &&
(CodonType) <= L_AgentCodon)
#define IsVectorCodon(CodonType)      (L_AgentCodon < (CodonType) &&
(CodonType) <= L_VectorCodon)
#define IsTextCodon(CodonType)        (L_VectorCodon < (CodonType) && (CodonType)
<= L_TextCodon)
#define   isCodon(x)                  ((x) >= 0 && (x) <
vmCodonCount)
/* ------ Virtual Machine Functions (Exports) ------- */
LINKTYPE int  CALL_STYLE      LVM_Boot(T_CHAR *ConfigSettings);
LINKTYPE int  CALL_STYLE      LVM_Shutdown(void);
LINKTYPE int  CALL_STYLE      LVM_RedirectCodon(T_CODON
source, T_CODON substitute);
LINKTYPE int  CALL_STYLE      LVM_RestoreCodon(T_CODON codon);
LINKTYPE int  CALL_STYLE      LVM_ActivateCodon(T_CODON
codon);
LINKTYPE int  CALL_STYLE      LVM_DeActivateCodon(T_CODON
codon);
LINKTYPE int  CALL_STYLE      LVM_CodonInfo(T_CODON
UserCodon, T_CODON_INFO *UserInfo);
LINKTYPE int  CALL_STYLE      LVM_IsActive(T_CODON codon);
LINKTYPE int  CALL_STYLE      LVM_SetUserEventsFn(T_pfnKEYIO
addr);
LINKTYPE int  CALL_STYLE      LVM_InitTextCodon(T_CODON codon,
T_CHAR *str);
LINKTYPE size_t CALL_STYLE    LVM_sizeof(T_CODON TypeID);
LINKTYPE T_CODON CALL_STYLE   LVM_RegisterCodon(T_CHAR *label,
T_CODON type, T_REAL value, T_INDEX Argc, /* T_pfnVM */ void *vmFn,
T_INDEX RetC);
LINKTYPE T_CODON CALL_STYLE   LVM_RegisterTextCodon(T_CHAR
*label, T_CHAR *data);
LINKTYPE T_CODON CALL_STYLE   LVM_ReviseCodon(T_CODON codon,
T_CHAR *label, T_CODON type, T_REAL value, T_INDEX ArgC, T_REAL Activity, /*
T_pfnVM */ void *vmFn, T_INDEX RetC);
LINKTYPE T_CODON CALL_STYLE   LVM_CodonCount( );
LINKTYPE T_DEPTH CALL_STYLE   LVM_UserCount ( );
LINKTYPE T_CODON CALL_STYLE   LVM_LabelToCodon(T_CHAR *);
```

-continued

```
LINKTYPE T_CODON CALL_STYLE    LVM_IsCodonNameConflict(T_CHAR
*s);
LINKTYPE T_CODON CALL_STYLE    LVM_CodonType(T_CODON codon);
LINKTYPE T_CODON CALL_STYLE
       LVM_CodonDependencyList(T_CODON SearchCodon, T_INDEX
(CALL_STYLE *GetAgentProgram) (T_CODON AgentCodon, T_CODON *Genome,
T_BOOLEAN WriteOption), T_CODON *Owners);
LINKTYPE T_CHAR* CALL_STYLE      LVM_CodonToLabel(T_CODON);
LINKTYPE T_CHAR* CALL_STYLE      LVM_CodonInfoString(T_CODON
beginCodon, T_CODON endCodon);
LINKTYPE T_CHAR* CALL_STYLE    LVM_ItemAsText(T_ITEM *p);
LINKTYPE size_t  CALL_STYLE    LVM_ItemLength(T_ITEM *p);
LINKTYPE int     CALL_STYLE    LVM_CopyItemToBuffer(T_ITEM *item,
T_CHAR *text);
LINKTYPE T_CHAR*           CALL_STYLE LVM_GenomeAsText(T_CODON
*Agent, T_BOOLEAN flagExcludeEND);
LINKTYPE const T_CHAR*     CALL_STYLE LVM_CodonTypeAsText(T_CODON
Codontype);
LINKTYPE T_INDEX CALL_STYLE    LVM_Evaluate(T_CHAR *AgentName,
T_CODON *Genome, T_INDEX nArgs, T_ITEM* Args, T_ITEM* Rets);
LINKTYPE T_INDEX CALL_STYLE    LVM_EvalScript(T_CHAR *AgentName,
T_CHAR *AgentScript, T_INDEX nArgs, T_ITEM *vmArgs, T_ITEM *vmRets);
LINKTYPE T_INDEX CALL_STYLE    LVM_SubEval(T_VMRECORD *pvmParent,
T_CHAR *subAgent, T_INDEX nArgs);
LINKTYPE T_INDEX CALL_STYLE    LVM_EvalSubScript(T_VMRECORD
*pvmParent, T_CHAR *SubAgentName, T_CHAR *AgentScript, T_INDEX nArgs);
LINKTYPE T_INDEX CALL_STYLE LVM_EvalServer(T_VMRECORD *pvmParent,
LAMARCK_SERVER *Server);
LINKTYPE T_INDEX CALL_STYLE    LVM_ClearCodon(T_CODON Codon);
LINKTYPE T_ERRNO CALL_STYLE      LVM_ReportError(T_CHAR
*Source, T_ERRNO vmErrNo, T_CHAR *ErrMsg);
LINKTYPE T_ERRNO CALL_STYLE
       LVM_RegisterErrorMessage(T_CHAR *MsgText);
LINKTYPE void CALL_STYLE LVM_SendKey(T_SHORT KeyAscii);
LINKTYPE T_INDEX CALL_STYLE    LVM_TextToGenome(T_CHAR *AgentText,
T_CODON *Genome, T_BOOLEAN AutoRegister);
LINKTYPE T_INDEX CALL_STYLE    LVM_ComboTextToGenome(T_CHAR
*AgentText, T_CODON *Genome, T_BOOLEAN AutoRegister, T_LONG
*SegmentInfoBuffer, T_LONG *nTextSegments);
LINKTYPE T_DEPTH CALL_STYLE    LVM_HasCodon(T_CODON *AgentProgram,
T_CODON SearchCodon, T_INDEX (CALL_STYLE *GetAgentProgram) (T_CODON
AgentCodon, T_CODON *Genome, T_BOOLEAN WriteOption));
LINKTYPE short  CALL_STYLE       LVM_AgentTextSegments(T_CHAR
*AgentText, short *SegmentInfo, short n);
LINKTYPE T_CODON CALL_STYLE   LVM_Max_Codon(void);
LINKTYPE T_INDEX CALL_STYLE   LVM_Max_Genome_Length(void);
LINKTYPE T_DEPTH CALL_STYLE   LVM_Max_Agent_Depth(void);
LINKTYPE T_DEPTH CALL_STYLE   LVM_Max_Nesting_Depth(void);
LINKTYPE T_INDEX CALL_STYLE   LVM_Max_Data_Stack(void);
LINKTYPE T_INDEX CALL_STYLE   LVM_Max_Label_Length(void);
LINKTYPE T_INDEX CALL_STYLE   LVM_Max_Text_Length(void);
LINKTYPE long CALL_STYLE LVM_DebugMsg(T_CHAR *MsgText, long
lenMsgText);
LINKTYPE long CALL_STYLE LVM_StatusMsg(T_CHAR *MsgText, long lenMsgText);
LINKTYPE void CALL_STYLE LVM_ItemCopy(T_ITEM *dst, T_ITEM *src, T_INDEX
n);
LINKTYPE void CALL_STYLE LVM_ItemInit(T_ITEM *dst, T_ITEM *value, T_INDEX
n);
LINKTYPE T_INDEX CALL_STYLE LVM_ItemsToCodons(T_CODON *Codons,
T_ITEM *Items, T_INDEX n);
LINKTYPE T_CODON CALL_STYLE LVM_MakeConstantCodon(T_REAL value);
LINKTYPE T_CODON CALL_STYLE LVM_MakeMatrixCodon(T_CHAR
*MatrixName, size_t nRows, size_t nCols, T_LONG RowMin, T_LONG RowMax);
LINKTYPE T_CODON CALL_STYLE LVM_MakeArrayCodon(T_CHAR *ArrayName,
T_CODON type, size_t count T_LONG LBound);
LINKTYPE void    CALL_STYLE LVM_Free(void *memAddress);
LINKTYPE void*   CALL_STYLE LVM_Malloc(size_t itemCount, size_t itemWidth,
T_BOOLEAN optionClear);
LINKTYPE T_INDEX CALL_STYLE LVM_AgentLength(T_CODON *Agent);
LINKTYPE T_INDEX CALL_STYLE LVM_AgentCopy(T_CODON *dst, T_CODON
*src);
LINKTYPE T_CODON CALL_STYLE LVM_AgentIndex(T_CODON AgentCodon);
LINKTYPE T_INDEX CALL_STYLE LVM_FloatToCodons(T_REAL value, T_CODON
*Genome, T_INDEX GenomeLength);
LINKTYPE int CALL_STYLE LVM_TextSearchReplace(T_CHAR *strIn, T_CHAR
*strSearch, T_CHAR *strReplace, T_BOOLEAN MatchWholeWordOnly, T_BOOLEAN
MatchCase, T_CHAR *strOut);
LINKTYPE int CALL_STYLE LVM_TextFind(T_CHAR *strIn T_CHAR *strSearch,
T_BOOLEAN MatchWholeWordOnly, T_BOOLEAN MatchCase);
```

-continued

```
LINKTYPE T_INDEX CALL_STYLE LVM_SetGenoudSettings(T_DEPTH depth, char
*OutputFile, long PopSize, long MaxGenerations, long P1, long P2, long P3, long P4,
long P5, long P6, long P7, long P8, double LowerBnd, double UpperBnd,
                                            long WaitGenerations, short MinMax,
short GradientCheck, short Bounds, double SolutionTolerance);
LINKTYPE T_INDEX CALL_STYLE LVM_GetGenoudSettings(T_DEPTH depth, char
*OutputFile, long *PopSize, long *MaxGenerations, long *P1, long *P2, long *P3, long
*P4, long *P5, long *P6, long *P7, long *P8, double *LowerBnd, double *UpperBnd,
                                            long *Wait(Generations, short *MinMax,
short *GradientCheck, short *Bounds, double *SolutionTolerance);
LINKTYPE T_REAL CALL_STYLE LVM_CvtToREAL(T_VOID *p, T_CODON typeID);
/* ---- LamarckVM Client-Server Tools ------- */
extern struct LAMARCK_LISTENER *LamarckListener;
LINKTYPE T_INDEX CALL_STYLE LamarckListene_Start(int port);
LINKTYPE T_INDEX CALL_STYLE LamarckListener_Stop(void);
LINKTYPE T_INDEX CALL_STYLE LamarckListener_IsClientWaiting(void);
LINKTYPE T_INDEX CALL_STYLE LamarckListener_AcceptClient(T_VMRECORD
*pvm);
T_INDEX CALL_STYLE LVM_Assign(T_VOID *dst, T_CODON dstID, T_VOID *src,
T_CODON srcID);
int CALL_STYLE initVMRecord(T_DEPTH depth, T_DEPTH depthEntry, T_DEPTH
depthParent, T_CHAR *AgentName, T_CODON *UserGenome, T_INDEX nArgs,
T_ITEM *vmArgs, T_ITEM *vmRets);
int      CALL_STYLE initVMRecordCumulativeMode(T_DEPTH depth, T_DEPTH
depthEntry, T_DEPTH depthParent, T_CHAR *AgentName, T_CODON *UserGenome,
T_INDEX nArgs, T_ITEM *vmArgs, T_ITEM *vmRets);
T_CHAR* CALL_STYLE LoadCodonLabel(T_CODON_INFO* p, T_CHAR *str);
T_CODON CALL_STYLE RegisterCodonsByType(T_CODON CodonType);
T_CODON CALL_STYLE GetSubstituteCodon(T_CODON Codon);
T_INDEX CALL_STYLE TranscriptionLoop(void);
void CALL_STYLE AssignErrorMsg(T_ERRNO ErrNo, T_CHAR *ErrText);
T_CHAR* CALL_STYLE GenomeAsTextWithHighlight(T_CODON *Agent, T_INDEX
index);
int      CALL_STYLE vmDebugInfo( );
int      CALL_STYLE LVM_CheckUserEvents(void);
void   CALL_STYLE vmAbortPrep(void);
bool   CALL_STYLE IsConstant(T_CHAR *tag, T_REAL *value);
bool CALL_STYLE IsTextItem(T_ITEM *p);
bool CALL_STYLE IsCodonType(T_ITEM *item, T_CODON type);
T_INDEX CALL_STYLE GetAgent(T_CODON AgentCodon, T_CODON
*GenomeBuffer, T_BOOLEAN WriteOption);
T_INDEX CALL_STYLE vmfn_FileAgentCodon(T_CODON AgentCodon, T_CODON
*GenomeBuffer, T_BOOLEAN WriteOption);
T_INDEX CALL_STYLE vmfn_TempAgentCodon(T_CODON AgentCodon,
T_CODON *GenomeBuffer, T_BOOLEAN WriteOption);
T_INDEX CALL_STYLE SizeOfTree(T_CODON *Genome, T_INDEX bitNo);
T_CODON CALL_STYLE RandCodon(T_CODON minCodon, T_CODON maxCodon);
/* ----------- StringTools ----------- */
T_CHAR* CALL_STYLE UCase(T_CHAR *text);
T_CHAR* CALL_STYLE LCase(T_CHAR *tag);
T_CHAR* CALL_STYLE strcpyUpper(T_CHAR *dst, T_CHAR *src);
T_CHAR* CALL_STYLE strcpyLower(T_CHAR *dst, T_CHAR *src);
T_CHAR* CALL_STYLE LVM_LoadString(T_CHAR **AddressOfPtrDestination,
T_CHAR *Source);
const T_CHAR* CALL_STYLE FloatFormatString(T_REAL x);
T_CHAR* CALL_STYLE NumText(T_REAL x, int d);
T_CHAR* CALL_STYLE LoadString(T_CHAR**Table, int element, T_CHAR *text);
T_CHAR* CALL_STYLE CStr(T_REAL x);
int CALL_STYLE sprintfFloat(T_CHAR *p, T_REAL x);
int CALL_STYLE sprintfDual(T_CHAR *p, T_REAL x);
int CALL_STYLE sprintfItem(T_CHAR *p, T_ITEM *x);
int CALL_STYLE CopyNumToText(T_CHAR *s, T_REAL x, int d, bool comma);
/* --- Date Tools --- */
T_VBTIME CALL_STYLE vbTime(void);
T_VBDATE CALL_STYLE vbDate(int m, int d, int y);
T_CHAR * CALL_STYLE DateString(T_VBTIME jdate, T_CHAR *TextBuffer);
T_CHAR * CALL_STYLE MilitaryTimeString(T_VBTIME time, T_CHAR *TextBuffer);
/* comparison function for Alphabetical Codon label comparisons.
 Function used with Ms c-library Qsort and with TR in-line binary searches.
 Note unmodified calling convention */
int labelcmp (T_CODON *a, T_CODON *b);
T_INDEX RegisterInternetCodons(void);
T_INDEX RegisterGenoud(void);
T_INDEX RegisterGraphCodons(void);
T_CHAR *AllocateUtilityString(size_t length);
T_CHAR *AllocateAgentString(size_t length);
/* --- Robust Math Functions (Handle errors, enabling fault tolerance) ---- */
T_REAL CALL_STYLE robust_addition(T_REAL a, T_REAL b);
T_REAL CALL_STYLE robust_multiply(T_REAL a, T_REAL b);
```

-continued

```
T_REAL CALL_STYLE robust_division(T_REAL a, T_REAL b);
T_REAL CALL_STYLE robust_mod(T_REAL a T_REAL b);
T_REAL CALL_STYLE robust_cosine(T_REAL a);
T_REAL CALL_STYLE robust_sine(T_REAL a);
T_REAL CALL_STYLE robust_tangent(T_REAL a);
T_REAL CALL_STYLE robust_log(T_REAL a);
T_REAL CALL_STYLE SciNum(T_REAL a, T_REAL b);
T_REAL CALL_STYLE robust_power(T_REAL a, T_REAL b);
T_REAL CALL_STYLE robust_quotient(T_REAL a, T_REAL b);
/* --- Activation Functions ---- */
T_BOOLEAN CALL_STYLE ActivationProbabilistic(T_VMRECORD *pvm);
/* --- Virtual Machine Functions ---- */
T_INDEX CALL_STYLE vmfn_CodonVariable(T_VMRECORD *pvm);
T_INDEX CALL_STYLE vmfn_END(T_VMRECORD *pvm);
T_INDEX CALL_STYLE vmfn_NOP(T_VMRECORD *pvm);
T_INDEX CALL_STYLE vmfn_STOP(T_VMRECORD *pvm);
T_INDEX CALL_STYLE vmfn_AsData(T_VMRECORD *pvm);
T_INDEX CALL_STYLE vmfn_Transform(T_VMRECORD *pvm);
T_INDEX CALL_STYLE vmfn_MakeConstantCodon(T_VMRECORD *pvm);
T_INDEX CALL_STYLE vmfn_DataModeOn(T_VMRECORD *pvm);
T_INDEX CALL_STYLE vmfn_DataModeOff(T_VMRECORD *pvm);
T_INDEX CALL_STYLE vmfn_GenomeToData(T_VMRECORD *pvm);
T_INDEX CALL_STYLE vmfn_DataToGenome(T_VMRECORD *pvm);
T_INDEX CALL_STYLE vmfn_EvalData(T_VMRECORD *pvm);
T_INDEX CALL_STYLE vmfn_SizeOfTreeMe(T_VMRECORD *pvm);
T_INDEX CALL_STYLE vmfn_SizeOfTreeAgent(T_VMRECORD *pvm);
T_INDEX CALL_STYLE vmfn_AgentLength(T_VMRECORD *pvm);
T_INDEX CALL_STYLE vmfn_GenomeLength(T_VMRECORD *pvm);
T_INDEX CALL_STYLE vmfn_Index(T_VMRECORD *pvm);
T_INDEX CALL_STYLE vmfn_GenomeItem(T_VMRECORD *pvm);
T_INDEX CALL_STYLE vmfn_AgentItem(T_VMRECORD *pvm);
T_INDEX CALL_STYLE vmfn_ErrItem(T_VMRECORD *pvm);
T_INDEX CALL_STYLE vmfn_Redirection(T_VMRECORD *pvm);
T_INDEX CALL_STYLE vmfn_CallMe(T_VMRECORD *pvm);
T_INDEX CALL_STYLE vmfn_HasCodon(T_VMRECORD *pvm);
T_INDEX CALL_STYLE vmfn_CodonDependencyList(T_VMRECORD *pvm);
T_INDEX CALL_STYLE vmfn_CodonHoldersList(T_VMRECORD *pvm);
T_INDEX CALL_STYLE vmfn_SaveAgent(T_VMRECORD *pvm);
T_INDEX CALL_STYLE vmfn_CodonRedirect(T_VMRECORD *pvm);
T_INDEX CALL_STYLE vmfn_CodonReset(T_VMRECORD *pvm);
T_INDEX CALL_STYLE vmfn_StackShare(T_VMRECORD *pvm);
T_INDEX CALL_STYLE vmfn_StackClr(T_VMRECORD *pvm);
T_INDEX CALL_STYLE vmfn_StackValue(T_VMRECORD *pvm);
T_INDEX CALL_STYLE vmfn_StackCopyToMem(T_VMRECORD *pvm);
T_INDEX CALL_STYLE vmfn_StackMoveToMem(T_VMRECORD *pvm);
T_INDEX CALL_STYLE vmfn_StackCopyToMemIndex(T_VMRECORD *pvm);
T_INDEX CALL_STYLE vmfn_StackMoveToMemIndex(T_VMRECORD *pvm);
T_INDEX CALL_STYLE vmfn_StackDiscard(T_VMRECORD *pvm);
T_INDEX CALL_STYLE vmfn_StackCount(T_VMRECORD *pvm);
T_INDEX CALL_STYLE vmfn_StackType(T_VMRECORD *pvm);
T_INDEX CALL_STYLE vmfn_StackOrigin(T_VMRECORD *pvm);
T_INDEX CALL_STYLE vmfn_StackDependency(T_VMRECORD *pvm);
T_INDEX CALL_STYLE vmfn_StackSave(T_VMRECORD *pvm);
T_INDEX CALL_STYLE vmfn_COUNT(T_VMRECORD *pvm);
T_INDEX CALL_STYLE vmfn_MIN(T_VMRECORD *pvm);
T_INDEX CALL_STYLE vmfn_MAX(T_VMRECORD *pvm);
T_INDEX CALL_STYLE vmfn_MEDN(T_VMRECORD *pvm);
T_INDEX CALL_STYLE vmfn_SUM(T_VMRECORD *pvm);
T_INDEX CALL_STYLE vmfn_AVG(T_VMRECORD *pvm);
T_INDEX CALL_STYLE vmfn_STD(T_VMRECORD *pvm);
T_INDEX CALL_STYLE vmfn_HAVG(T_VMRECORD *pvm);
T_INDEX CALL_STYLE vmfn_HSTD(T_VMRECORD *pvm);
T_INDEX CALL_STYLE vmfn_PROD(T_VMRECORD *pvm);
T_INDEX CALL_STYLE vmfn_GAVG(T_VMRECORD *pvm);
T_INDEX CALL_STYLE vmfn_DCF(T_VMRECORD *pvm);
T_INDEX CALL_STYLE vmfn_XSMO(T_VMRECORD *pvm);
T_INDEX CALL_STYLE vmfn_Depth(T_VMRECORD *pvm);
T_INDEX CALL_STYLE vmfn_REPO(T_VMRECORD *pvm);
T_INDEX CALL_STYLE vmfn_DO(T_VMRECORD *pvm);
T_INDEX CALL_STYLE vmfn_LOOP(T_VMRECORD *pvm);
T_INDEX CALL_STYLE vmfn_LOOPWHILE(T_VMRECORD *pvm);
T_INDEX CALL_STYLE vmfn_DOWHILE(T_VMRECORD *pvm);
T_INDEX CALL_STYLE vmfn_EXITDO(T_VMRECORD *pvm);
T_INDEX CALL_STYLE vmfn_FOR(T_VMRECORD *pvm);
T_INDEX CALL_STYLE vmfn_NEXT(T_VMRECORD *pvm);
T_INDEX CALL_STYLE vmfn_EXITFOR(T_VMRECORD *pvm);
T_INDEX CALL_STYLE vmfn_ForEach(T_VMRECORD *pvm);
T_INDEX CALL_STYLE vmfn_JUMP(T_VMRECORD *pvm);
T_INDEX CALL_STYLE vmfn_JUMPTO(T_VMRECORD *pvm);
```

-continued

```
T_INDEX CALL_STYLE vmfn_IFJUMP(T_VMRECORD *pvm);
T_INDEX CALL_STYLE vmfn_IFJUMPTO(T_VMRECORD *pvm);
T_INDEX CALL_STYLE vmfn_Tag(T_VMRECORD *pvm);
T_INDEX CALL_STYLE vmfn_GotoTag(T_VMRECORD *pvm);
T_INDEX CALL_STYLE vmfn_IfGotoTag(T_VMRECORD *pvm);
T_INDEX CALL_STYLE vmfn_IfNotGotoTag(T_VMRECORD *pvm);
T_INDEX CALL_STYLE vmfn_OnSuccessGotoTag(T_VMRECORD *pvm);
T_INDEX CALL_STYLE vmfn_OnErrorGotoTag(T_VMRECORD *pvm);
T_INDEX CALL_STYLE vmfn_GotoPrevTag(T_VMRECORD *pvm);
T_INDEX CALL_STYLE vmfn_GotoNextTag(T_VMRECORD *pvm);
T_INDEX CALL_STYLE vmfn_IfGotoPrevTag(T_VMRECORD *pvm);
T_INDEX CALL_STYLE vmfn_IfNotGotoPrevTag(T_VMRECORD *pvm);
T_INDEX CALL_STYLE vmfn_IfGotoNextTag(T_VMRECORD *pvm);
T_INDEX CALL_STYLE vmfn_IfNotGotoNextTag(T_VMRECORD *pvm);
T_INDEX CALL_STYLE vmfn_Resume(T_VMRECORD *pvm);
T_INDEX CALL_STYLE vmfn_ResumeNext(T_VMRECORD *pvm);
T_INDEX CALL_STYLE vmfn_ResumeAt(T_VMRECORD *pvm);
T_INDEX CALL_STYLE vmfn_GrammarRepair(T_VMRECORD *pvm);
T_INDEX CALL_STYLE vmfn_IF(T_VMRECORD *pvm);
T_INDEX CALL_STYLE vmfn_ELSE(T_VMRECORD *pvm);
T_INDEX CALL_STYLE vmfn_ENDIF(T_VMRECORD *pvm);
T_INDEX CALL_STYLE vmfn_DEBUG(T_VMRECORD *pvm),
T_INDEX CALL_STYLE vmfn_STOP(T_VMRECORD *pvm);
T_INDEX CALL_STYLE vmfn_BreakOnError(T_VMRECORD *pvm);
T_INDEX CALL_STYLE vmfn_REPV(T_VMRECORD *pvm);
T_INDEX CALL_STYLE vmfn_lastArgC(T_VMRECORD *pvm);
T_INDEX CALL_STYLE vmfn_I(T_VMRECORD *pvm);
T_INDEX CALL_STYLE vmfn_VAR(T_VMRECORD *pvm);
T_INDEX CALL_STYLE vmfn_GVAR(T_VMRECORD *pvm);
T_INDEX CALL_STYLE vmfn_ARG(T_VMRECORD *pvm);
T_INDEX CALL_STYLE vmfn_nArgsAgent(T_VMRECORD *pvm);
T_INDEX CALL_STYLE vmfn_ALLARGS(T_VMRECORD *pvm);
T_INDEX CALL_STYLE vmfn_STEPSAGENT(T_VMRECORD *pvm);
T_INDEX CALL_STYLE vmfn_STEPSTOTAL(T_VMRECORD *pvm);
T_INDEX CALL_STYLE vmfn_TIMEAGENT(T_VMRECORD *pvm);
T_INDEX CALL_STYLE vmfn_TIMEME(T_VMRECORD *pvm);
T_INDEX CALL_STYLE vmfn_TIMETOTAL(T_VMRECORD *pvm);
T_INDEX CALL_STYLE vmfn_ZERO(T_VMRECORD *pvm);
T_INDEX CALL_STYLE vmfn_ONE(T_VMRECORD *pvm);
T_INDEX CALL_STYLE vmfn_PI(T_VMRECORD *pvm);
T_INDEX CALL_STYLE vmfn_LN2(T_VMRECORD *pvm);
T_INDEX CALL_STYLE vmfn_EXP1(T_VMRECORD *pvm);
T_INDEX CALL_STYLE vmfn_RAND(T_VMRECORD *pvm);
T_INDEX CALL_STYLE vmfn_SRAND(T_VMRECORD *pvm);
T_INDEX CALL_STYLE vmfn_rnd(T_VMRECORD *pvm);
T_INDEX CALL_STYLE vmfn_MEMRCL(T_VMRECORD *pvm);
T_INDEX CALL_STYLE vmfn_MEMSTO(T_VMRECORD *pvm);
T_INDEX CALL_STYLE vmfn_MEMCLR(T_VMRECORD *pvm);
T_INDEX CALL_STYLE vmfn_MEMCount(T_VMRECORD *pvm);
T_INDEX CALL_STYLE vmfn_MEMTransfer(T_VMRECORD *pvm);
T_INDEX CALL_STYLE vmfn_MEMShare(T_VMRECORD *pvm);
T_INDEX CALL_STYLE vmfn_MEMSwap(T_VMRECORD *pvm);
T_INDEX CALL_STYLE vmfn_MEMValue(T_VMRECORD *pvm);
T_INDEX CALL_STYLE vmfn_MEMType(T_VMRECORD *pvm);
T_INDEX CALL_STYLE vmfn_MEMOrigin(T_VMRECORD *pvm);
T_INDEX CALL_STYLE vmfn_MEMDependency(T_VMRECORD *pvm);
T_INDEX CALL_STYLE vmfn_SORT(T_VMRECORD *pvm);
T_INDEX CALL_STYLE vmfn_SIN(T_VMRECORD *pvm);
T_INDEX CALL_STYLE vmfn_COS(T_VMRECORD *pvm);
T_INDEX CALL_STYLE vmfn_TAN(T_VMRECORD *pvm);
T_INDEX CALL_STYLE vmfn_ADD(T_VMRECORD *pvm);
T_INDEX CALL_STYLE vmfn_SUB(T_VMRECORD *pvm);
T_INDEX CALL_STYLE vmfn_MLT(T_VMRECORD *pvm);
T_INDEX CALL_STYLE vmfn_DIV(T_VMRECORD *pvm);
T_INDEX CALL_STYLE vmfn_POW(T_VMRECORD *pvm);
T_INDEX CALL_STYLE vmfn_MOD(T_VMRECORD *pvm);
T_INDEX CALL_STYLE vmfn_QUOT(T_VMRECORD *pvm);
T_INDEX CALL_STYLE vmfn_LOGN(T_VMRECORD *pvm);
T_INDEX CALL_STYLE vmfn_MIN2(T_VMRECORD *pvm);
T_INDEX CALL_STYLE vmfn_MAX2(T_VMRECORD *pvm);
T_INDEX CALL_STYLE vmfn_LOG(T_VMRECORD *pvm);
T_INDEX CALL_STYLE vmfn_NEG(T_VMRECORD *pvm);
T_INDEX CALL_STYLE vmfn_INV(T_VMRECORD *pvm);
T_INDEX CALL_STYLE vmfn_ABS(T_VMRECORD *pvm);
T_INDEX CALL_STYLE vmfn_INT(T_VMRECORD *pvm);
T_INDEX CALL_STYLE vmfn_SGN(T_VMRECORD *pvm);
T_INDEX CALL_STYLE vmfn_EVN(T_VMRECORD *pvm);
T_INDEX CALL_STYLE vmfn_ODD(T_VMRECORD *pvm);
T_INDEX CALL_STYLE vmfn_PARITY(T_VMRECORD *pvm);
```

-continued

```
T_INDEX CALL_STYLE vmfn_ISNEG(T_VMRECORD *pvm);
T_INDEX CALL_STYLE vmfn_ISPOS(T_VMRECORD *pvm),
T_INDEX CALL_STYLE vmfn_ISZERO(T_VMRECORD *pvm);
T_INDEX CALL_STYLE vmfn_EXP(T_VMRECORD *pvm);
T_INDEX CALL_STYLE vmfn_LOG(T_VMRECORD *pvm);
T_INDEX CALL_STYLE vmfn_LOG10(T_VMRECORD *pvm);
T_INDEX CALL_STYLE vmfn_SQRT(T_VMRECORD *pvm);
T_INDEX CALL_STYLE vmfn_FACT(T_VMRECORD *pvm);
T_INDEX CALL_STYLE vmfn_SIN(T_VMRECORD *pvm);
T_INDEX CALL_STYLE vmfn_COS(T_VMRECORD *pvm);
T_INDEX CALL_STYLE vmfn_TAN(T_VMRECORD *pvm);
T_INDEX CALL_STYLE vmfn_ASIN(T_VMRECORD *pvm);
T_INDEX CALL_STYLE vmfn_ACOS(T_VMRECORD *pvm);
T_INDEX CALL_STYLE vmfn_ATAN(T_VMRECORD *pvm);
T_INDEX CALL_STYLE vmfn_SINH(T_VMRECORD *pvm);
T_INDEX CALL_STYLE vmfn_COSH(T_VMRECORD *pvm);
T_INDEX CALL_STYLE vmfn_TANH(T_VMRECORD *pvm);
T_INDEX CALL_STYLE vmfn_ASINH(T_VMRECORD *pvm);
T_INDEX CALL_STYLE vmfn_ACOSH(T_VMRECORD *pvm);
T_INDEX CALL_STYLE vmfn_ATANH(T_VMRECORD *pvm);
T_INDEX CALL_STYLE vmfn_ADD1(T_VMRECORD *pvm);
T_INDEX CALL_STYLE vmfn_MLT1(T_VMRECORD *pvm);
T_INDEX CALL_STYLE vmfn_POW1(T_VMRECORD *pvm);
T_INDEX CALL_STYLE vmfn_EQT(T_VMRECORD *pvm);
T_INDEX CALL_STYLE vmfn_GTN(T_VMRECORD *pvm);
T_INDEX CALL_STYLE vmfn_LTN(T_VMRECORD *pvm);
T_INDEX CALL_STYLE vmfn_NEQ(T_VMRECORD *pvm);
T_INDEX CALL_STYLE vmfn_GTE(T_VMRECORD *pvm);
T_INDEX CALL_STYLE vmfn_LTE(T_VMRECORD *pvm);
T_INDEX CALL_STYLE vmfn_EQTF(T_VMRECORD *pvm);
T_INDEX CALL_STYLE vmfn_GTNF(T_VMRECORD *pvm);
T_INDEX CALL_STYLE vmfn_LTNF(T_VMRECORD *pvm);
T_INDEX CALL_STYLE vmfn_NEQF(T_VMRECORD *pvm);
T_INDEX CALL_STYLE vmfn_GTEF(T_VMRECORD *pvm);
T_INDEX CALL_STYLE vmfn_LTEF(T_VMRECORD *pvm);
T_INDEX CALL_STYLE vmfn_EQTM(T_VMRECORD *pvm);
T_INDEX CALL_STYLE vmfn_GTNM(T_VMRECORD *pvm);
T_INDEX CALL_STYLE vmfn_LTNM(T_VMRECORD *pvm);
T_INDEX CALL_STYLE vmfn_NEQM(T_VMRECORD *pvm);
T_INDEX CALL_STYLE vmfn_GTEM(T_VMRECORD *pvm);
T_INDEX CALL_STYLE vmfn_LTEM(T_VMRECORD *pvm);
T_INDEX CALL_STYLE vmfn_AND(T_VMRECORD *pvm);
T_INDEX CALL_STYLE vmfn_OR(T_VMRECORD *pvm);
T_INDEX CALL_STYLE vmfn_NOT(T_VMRECORD *pvm);
T_INDEX CALL_STYLE vmfn_XOR(T_VMRECORD *pvm);
T_INDEX CALL_STYLE vmfn_EQV(T_VMRECORD *pvm);
T_INDEX CALL_STYLE vmfn_IMP(T_VMRECORD *pvm);
T_INDEX CALL_STYLE vmfn_IF1(T_VMRECORD *pvm);
T_INDEX CALL_STYLE vmfn_IF2(T_VMRECORD *pvm);
T_INDEX CALL_STYLE vmfn_IF3(T_VMRECORD *pvm);
T_INDEX CALL_STYLE vmfn_LET(T_VMRECORD *pvm);
T_INDEX CALL_STYLE vmfn_letINCR(T_VMRECORD *pvm);
T_INDEX CALL_STYLE vmfn_letDECR(T_VMRECORD *pvm);
T_INDEX CALL_STYLE vmfn_letADD(T_VMRECORD *pvm);
T_INDEX CALL_STYLE vmfn_letSUB(T_VMRECORD *pvm);
T_INDEX CALL_STYLE vmfn_letMLT(T_VMRECORD *pvm);
T_INDEX CALL_STYLE vmfn_letDIV(T_VMRECORD *pvm);
T_INDEX CALL_STYLE vmfn_letMAX(T_VMRECORD *pvm);
T_INDEX CALL_STYLE vmfn_letMIN(T_VMRECORD *pvm);
T_INDEX CALL_STYLE vmfn_EXIT(T_VMRECORD *pvm);
T_INDEX CALL_STYLE vmfn_vmCodonCount(T_VMRECORD *pvm);
T_INDEX CALL_STYLE vmfn_vmTextCodonCount(T_VMRECORD *pvm);
T_INDEX CALL_STYLE vmfn_CodonType(T_VMRECORD *pvm);
T_INDEX CALL_STYLE vmfn_CodonArgC(T_VMRECORD *pvm);
T_INDEX CALL_STYLE vmfn_CodonRet(T_VMRECORD *pvm);
T_INDEX CALL_STYLE vmfn_CodonActivity(T_VMRECORD *pvm);
T_INDEX CALL_STYLE vmfn_CodonTrapGrammar(T_VMRECORD *pvm);
T_INDEX CALL_STYLE vmfn_CodonTrapError(T_VMRECORD *pvm);
T_INDEX CALL_STYLE vmfn_CodonTrapSuccess(T_VMRECORD *pvm);
T_INDEX CALL_STYLE vmfn_CodonValue(T_VMRECORD *pvm);
T_INDEX CALL_STYLE vmfn_CodonSubstitute(T_VMRECORD *pvm);
T_INDEX CALL_STYLE vmfn_CodonInstances(T_VMRECORD *pvm);
T_INDEX CALL_STYLE vmfn_CodonUserCount(T_VMRECORD *pvm);
T_INDEX CALL_STYLE vmfn_CodonErrors(T_VMRECORD *pvm);
T_INDEX CALL_STYLE vmfn_CodonInstancesTotal(T_VMRECORD *pvm);
T_INDEX CALL_STYLE vmfn_CodonErrorsTotal(T_VMRECORD *pvm);
T_INDEX CALL_STYLE vmfn_CodonClockTicks(T_VMRECORD *pvm);
T_INDEX CALL_STYLE vmfn_CodonClockTicksTotal(T_VMRECORD *pvm);
T_INDEX CALL_STYLE vmfn_CodonRunTime(T_VMRECORD *pvm);
```

-continued

```
T_INDEX CALL_STYLE vmfn_CodonRunTimeAvg(T_VMRECORD *pvm);
T_INDEX CALL_STYLE vmfn_CodonSpeedAvg(T_VMRECORD *pvm);
T_INDEX CALL_STYLE vmfn_CodonsByType(T_VMRECORD *pvm);
T_INDEX CALL_STYLE vmfn_CodonResetCounters(T_VMRECORD *pvm);
T_INDEX CALL_STYLE vmfn_CodonVmFn(T_VMRECORD *pvm);
T_INDEX CALL_STYLE vmfn_CodonLabel(T_VMRECORD *pvm);
T_INDEX CALL_STYLE vmfn_CodonActivate(T_VMRECORD *pvm);
T_INDEX CALL_STYLE vmfn_CodonDeActivate(T_VMRECORD *pvm);
T_INDEX CALL_STYLE vmfn_CodonClear(T_VMRECORD *pvm);
T_INDEX CALL_STYLE vmfn_TypeActivate(T_VMRECORD *pvm);
T_INDEX CALL_STYLE vmfn_TypeDeActivate(T_VMRECORD *pvm);
T_INDEX CALL_STYLE vmfn_FunctionSet(T_VMRECORD *pvm);
T_INDEX CALL_STYLE vmfn_Reset(T_VMRECORD *pvm);
T_INDEX CALL_STYLE vmfn_LockCodonTable(T_VMRECORD *pvm);
T_INDEX CALL_STYLE vmfn_UnLockCodonTable(T_VMRECORD *pvm);
T_INDEX CALL_STYLE vmfn_AgentAutoCache(T_VMRECORD *pvm);
T_INDEX CALL_STYLE vmfn_strcat(T_VMRECORD *pvm);
T_INDEX CALL_STYLE vmfn_strcpy(T_VMRECORD *pvm);
T_INDEX CALL_STYLE vmfn_strlen(T_VMRECORD *pvm);
T_INDEX CALL_STYLE vmfn_strcmp(T_VMRECORD *pvm);
T_INDEX CALL_STYLE vmfn_straddr(T_VMRECORD *pvm);
T_INDEX CALL_STYLE vmfn_CStr(T_VMRECORD *pvm);
T_INDEX CALL_STYLE vmfn_Asc(T_VMRECORD *pvm);
T_INDEX CALL_STYLE vmfn_Chr(T_VMRECORD *pvm);
T_INDEX CALL_STYLE vmfn_LCase(T_VMRECORD *pvm);
T_INDEX CALL_STYLE vmfn_UCase(T_VMRECORD *pvm);
T_INDEX CALL_STYLE vmfn_SetDoEvents(T_VMRECORD *pvm);
T_INDEX CALL_STYLE vmfn_GetDoEvents(T_VMRECORD *pvm);
T_INDEX CALL_STYLE vmfn_DoEvents(T_VMRECORD *pvm);
T_INDEX CALL_STYLE vmfn_SetAutoVariable(T_VMRECORD *pvm);
T_INDEX CALL_STYLE vmfn_GetAutoVariable(T_VMRECORD *pvm);
T_INDEX CALL_STYLE vmfn_RecordField(T_VMRECORD *pvm);
T_INDEX CALL_STYLE vmfn_TakeSnapshot(T_VMRECORD *pvm);
T_INDEX CALL_STYLE vmfn_peek(T_VMRECORD *pvm);
T_INDEX CALL_STYLE vmfn_sizeof(T_VMRECORD *pvm);
T_INDEX CALL_STYLE vmfn_Assert(T_VMRECORD *pvm);
T_INDEX CALL_STYLE vmfn_BegExpr(T_VMRECORD *pvm);
T_INDEX CALL_STYLE vmfn_EndExpr(T_VMRECORD *pvm);
T_INDEX CALL_STYLE vmfn_ErrorTypes(T_VMRECORD *pvm);
T_INDEX CALL_STYLE vmfn_ErrorDescription(T_VMRECORD *pvm);
T_INDEX CALL_STYLE vmfn_RegisterErrorMessage(T_VMRECORD *pvm);
T_INDEX CALL_STYLE vmfn_DefineMarkerCodon(T_VMRECORD *pvm);
T_INDEX CALL_STYLE vmfn_SilentModeOn(T_VMRECORD *pvm);
T_INDEX CALL_STYLE vmfn_SilentModeOff(T_VMRECORD *pvm);
T_INDEX CALL_STYLE vmfn_AsMarker(T_VMRECORD *pvm);
T_INDEX CALL_STYLE vmfn_DefineTextConstant(T_VMRECORD *pvm);
T_INDEX CALL_STYLE vmfn_DefineTextVariable(T_VMRECORD *pvm);
T_INDEX CALL_STYLE vmfn_DefineConstant(T_VMRECORD *pvm);
T_INDEX CALL_STYLE vmfn_LocateNext(T_VMRECORD *pvm);
T_INDEX CALL_STYLE vmfn_LocatePrev(T_VMRECORD *pvm);
T_INDEX CALL_STYLE vmfn_LocateFirst(T_VMRECORD *pvm);
T_INDEX CALL_STYLE vmfn_LocateLast(T_VMRECORD *pvm),
T_INDEX CALL_STYLE vmfn_CodonConstant(T_VMRECORD *pvm);
T_INDEX CALL_STYLE vmfn_ClockTicksPerSecond(T_VMRECORD *pvm);
T_INDEX CALL_STYLE vmfn_LastErrorNumber(T_VMRECORD *pvm);
T_INDEX CALL_STYLE vmfn_LastErrorDescription(T_VMRECORD *pvm);
T_INDEX CALL_STYLE vmfn_ExitWithError(T_VMRECORD *pvm);
T_INDEX CALL_STYLE vmfn_MallocCountTotal(T_VMRECORD *pvm);
T_INDEX CALL_STYLE vmfn_MallocCountNet(T_VMRECORD *pvm);
T_INDEX CALL_STYLE vmfn_MallocCountPeak(T_VMRECORD *pvm);
T_INDEX CALL_STYLE vmfn_MallocBytesTotal(T_VMRECORD *pvm);
T_INDEX CALL_STYLE vmfn_MallocBytesNet(T_VMRECORD *pvm);
T_INDEX CALL_STYLE vmfn_MallocBytesPeak(T_VMRECORD *pvm);
T_INDEX CALL_STYLE vmfn_MallocAddress(T_VMRECORD *pvm);
T_INDEX CALL_STYLE vmfn_MallocBytes(T_VMRECORD *pvm);
T_INDEX CALL_STYLE vmfn_SaveStateOnExit(T_VMRECORD *pvm);
T_INDEX CALL_STYLE vmfn_LabelToCodon(T_VMRECORD *pvm);
T_INDEX CALL_STYLE vmfn_AgentName(T_VMRECORD *pvm);
T_INDEX CALL_STYLE vmfn_LogOption(T_VMRECORD *pvm);
T_INDEX CALL_STYLE vmfn_AgentActivation(T_VMRECORD *pvm);
T_INDEX CALL_STYLE vmfn_SelfActivation(T_VMRECORD *pvm);
T_INDEX CALL_STYLE vmfn_PerformanceCounter(T_VMRECORD *pvm);
T_INDEX CALL_STYLE vmfn_CodonSort(T_VMRECORD *pvm);
T_INDEX CALL_STYLE vmfn_EvalMemory(T_VMRECORD *pvm);
T_INDEX CALL_STYLE vmfn_TextToCodons(T_VMRECORD *pvm);
T_INDEX CALL_STYLE vmfn_MemSort(T_VMRECORD *pvm);
T_INDEX CALL_STYLE vmfn_GetAgentGenome(T_VMRECORD *pvm);
T_INDEX CALL_STYLE vmfn_randInt(T_VMRECORD *pvm);
T_INDEX CALL_STYLE vmfn_TextCodonDefault(T_VMRECORD *pvm);
```

-continued

```
T_INDEX CALL_STYLE vmfn_ErrorFlag(T_VMRECORD *pvm);
T_INDEX CALL_STYLE vmfn_SuccessFlag(T_VMRECORD *pvm);
T_INDEX CALL_STYLE vmfn_strItem(T_VMRECORD *pvm);
T_INDEX CALL_STYLE vmfn_strMid(T_VMRECORD *pvm);
T_INDEX CALL_STYLE vmfn_strLeft(T_VMRECORD *pvm);
T_INDEX CALL_STYLE vmfn_strRight(T_VMRECORD *pvm);
T_INDEX CALL_STYLE vmfn_strFind(T_VMRECORD *pvm);
T_INDEX CALL_STYLE vmfn_StatusMessage(T_VMRECORD *pvm);
T_INDEX CALL_STYLE vmfn_ErrorMessage(T_VMRECORD *pvm);
T_INDEX CALL_STYLE vmfn_AsFloat(T_VMRECORD *pvm);
T_INDEX CALL_STYLE vmfn_flagCircularLogic(T_VMRECORD *pvm);
T_INDEX CALL_STYLE vmfn_flagServerMode(T_VMRECORD *pvm);
T_INDEX CALL_STYLE vmfn_maxDepthMe(T_VMRECORD *pvm);
T_INDEX CALL_STYLE vmfn_maxDepthSubs(T_VMRECORD *pvm);
T_INDEX CALL_STYLE vmfn_UserCount(T_VMRECORD *pvm);
T_INDEX CALL_STYLE vmfn_CreateFileAgent(T_VMRECORD *pvm);
T_INDEX CALL_STYLE vmfn_Graph(T_VMRECORD *pvm);
T_INDEX CALL_STYLE vmfn_FileAppend(T_VMRECORD *pvm);
T_INDEX CALL_STYLE vmfn_FileCopy(T_VMRECORD *pvm);
T_INDEX CALL_STYLE vmfn_MatrixDefine(T_VMRECORD *pvm);
T_INDEX CALL_STYLE vmfn_MatrixCodon(T_VMRECORD *pvm);
T_INDEX CALL_STYLE vmfn_MatrixPtrRows(T_VMRECORD *pvm);
T_INDEX CALL_STYLE vmfn_MatrixPtrRow(T_VMRECORD *pvm);
T_INDEX CALL_STYLE vmfn_MatrixValue(T_VMRECORD *pvm);
T_INDEX CALL_STYLE vmfn_MatrixFree(T_VMRECORD *pvm);
T_INDEX CALL_STYLE vmfn_MatrixNRows(T_VMRECORD *pvm);
T_INDEX CALL_STYLE vmfn_MatrixNCols(T_VMRECORD *pvm);
T_INDEX CALL_STYLE vmfn_MatrixRowMin(T_VMRECORD *pvm);
T_INDEX CALL_STYLE vmfn_MatrixRowMax(T_VMRECORD *pvm);
T_INDEX CALL_STYLE vmfn_MatrixColMin(T_VMRECORD *pvm);
T_INDEX CALL_STYLE vmfn_MatrixColMax(T_VMRECORD *pvm);
T_INDEX CALL_STYLE vmfn_MatrixRow(T_VMRECORD *pvm);
T_INDEX CALL_STYLE vmfn_MatrixCol(T_VMRECORD *pvm);
T_INDEX CALL_STYLE vmfn_MatrixTranspose(T_VMRECORD *pvm);
T_INDEX CALL_STYLE vmfn_MatrixAddition(T_VMRECORD *pvm);
T_INDEX CALL_STYLE vmfn_MatrixMultiply(T_VMRECORD *pvm);
T_INDEX CALL_STYLE vmfn_MatrixInverse(T_VMRECORD *pvm);
T_INDEX CALL_STYLE vmfn_MatrixRead(T_VMRECORD *pvm);
T_INDEX CALL_STYLE vmfn_MatrixWrite(T_VMRECORD *pvm);
T_INDEX CALL_STYLE vmfn_system(T_VMRECORD *pvm);
T_INDEX CALL_STYLE vmfn_vbTime(T_VMRECORD *pvm);
T_INDEX CALL_STYLE vmfn_vbDate(T_VMRECORD *pvm);
T_INDEX CALL_STYLE vmfn_vbNow(T_VMRECORD *pvm);
T_INDEX CALL_STYLE vmfn_strSearchReplace(T_VMRECORD *pvm);
T_INDEX CALL_STYLE vmfn_strerror(T_VMRECORD *pvm);
T_INDEX CALL_STYLE vmfn_strncmpC(T_VMRECORD *pvm);
T_INDEX CALL_STYLE vmfn_strncat(T_VMRECORD *pvm);
T_INDEX CALL_STYLE vmfn_strncpy(T_VMRECORD *pvm);
T_INDEX CALL_STYLE vmfn_ArrayCodon(T_VMRECORD *pvm);
T_INDEX CALL_STYLE vmfn_ArrayDefine(T_VMRECORD *pvm);
T_INDEX CALL_STYLE vmfn_ArrayType(T_VMRECORD *pvm);
T_INDEX CALL_STYLE vmfn_ArrayWidth(T_VMRECORD *pvm);
T_INDEX CALL_STYLE vmfn_ArrayCount(T_VMRECORD *pvm);
T_INDEX CALL_STYLE vmfn_ArrayAddr(T_VMRECORD *pvm);
T_INDEX CALL_STYLE vmfn_ArrayLBound(T_VMRECORD *pvm);
T_INDEX CALL_STYLE vmfn_ArrayUBound(T_VMRECORD *pvm);
T_INDEX CALL_STYLE vmfn_ArrayValue(T_VMRECORD *pvm);
T_INDEX CALL_STYLE vmfn_ArrayFree(T_VMRECORD *pvm);
T_INDEX CALL_STYLE vmfn_CodonsToText(T_VMRECORD *pvm);
T_INDEX CALL_STYLE vmfn_tm_Codon(T_VMRECORD *pvm);
T_INDEX CALL_STYLE vmfn_tm_define(T_VMRECORD *pvm);
T_INDEX CALL_STYLE vmfn_tm_sec(T_VMRECORD *pvm);
T_INDEX CALL_STYLE vmfn_tm_min(T_VMRECORD *pvm);
T_INDEX CALL_STYLE vmfn_tm_hour(T_VMRECORD *pvm);
T_INDEX CALL_STYLE vmfn_tm_mday(T_VMRECORD *pvm);
T_INDEX CALL_STYLE vmfn_tm_mon(T_VMRECORD *pvm);
T_INDEX CALL_STYLE vmfn_tm_year(T_VMRECORD *pvm);
T_INDEX CALL_STYLE vmfn_tm_wday(T_VMRECORD *pvm);
T_INDEX CALL_STYLE vmfn_tm_yday(T_VMRECORD *pvm);
T_INDEX CALL_STYLE vmfn_tm_isdst(T_VMRECORD *pvm);
T_INDEX CALL_STYLE vmfn_tm_address(T_VMRECORD *pvm);
T_INDEX CALL_STYLE vmfn_tm_asctime(T_VMRECORD *pvm);
T_INDEX CALL_STYLE vmfn_clock(T_VMRECORD *pvm);
T_INDEX CALL_STYLE vmfn_CreateTempAgent(T_VMRECORD *pvm);
T_INDEX CALL_STYLE vmfn_OLS(T_VMRECORD *pvm);
T_INDEX CALL_STYLE vmfn_spawn(T_VMRECORD *pvm);
T_INDEX CALL_STYLE vmfn_LamarckClient(T_VMRECORD *pvm);
T_INDEX CALL_STYLE vmfn_LamarckServer(T_VMRECORD *pvm);
T_INDEX CALL_STYLE vmfn_RegisterFileAgent(T_VMRECORD *pvm);
```

```
T_INDEX CALL_STYLE vmfn_IsClientWaiting(T_VMRECORD *pvm);
T_INDEX CALL_STYLE vmfn_StopListening(T_VMRECORD *pvm);
T_INDEX CALL_STYLE vmfn_StartListening(T_VMRECORD *pvm);
T_INDEX CALL_STYLE vmfn_ListenerPort(T_VMRECORD *pvm);
T_INDEX CALL_STYLE vmfn_AcceptClient(T_VMRECORD *pvm);
T_INDEX CALL_STYLE vmfn_ClientIPAddress(T_VMRECORD *pvm),
T_INDEX CALL_STYLE vmfn_ClientPackage(T_VMRECORD *pvm),
T_INDEX CALL_STYLE vmfn_ClienPackageSize(T_VMRECORD *pvm);
T_INDEX CALL_STYLE vmfn_ClienReturn(T_VMRECORD *pvm);
T_INDEX CALL_STYLE vmfn_ServerCodon(T_VMRECORD *pvm);
```

In general, it should be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using the C, C++, Visual Basic or any assembly language appropriate in view of the processor(s) being used. It could also be written in an interpretive environment such as Java and transported to multiple destinations to various users.

It is also to be appreciated and understood that the specific embodiments of the present invention described hereinbefore are merely illustrative of the general principles of the invention. Various modifications may be made by those skilled in the art consistent with the principles set forth hereinbefore.

What is claimed is:

1. A computer-based method for allowing a codon, having an associated representative numeric value, to selectively be treated as being the representative numeric value, and for allowing a codon, representing a constant, to selectively be treated as a codon represented by the constant, comprising the steps of:
   a. creating a program containing a plurality of codons for execution;
   b. embedding in said program of said step (a) at least one toggle codon, wherein said toggle codon indicates that a subsequent codon is to be treated as said subsequent codon's numeric value, or that a subsequent codon representing a constant is to be treated as the codon represented by the constant;
   c. executing said program, wherein each codon encountered in said program is placed on a stack or causes an action to be taken relating to one or more codons placed thereon;
   d. upon encountering said at least one toggle codon of said step (b), placing the codon number of said subsequent codon on said stack where said toggle codon indicates treatment as a numeric value, or executing the codon designated by said constant where said toggle codon indicates treatment as a codon represented by said constant.

2. The computer-based method of claim 1, wherein at least one codon in said plurality of codons is a marker codon.

3. The computer-based method of claim 1, wherein said toggle codon further comprises the additional capability of treating subsequent codons in a non-executable silent mode.

4. The computer-based method of claim 1, further comprising the step of using said stack for storing input values to be used by at least one of said plurality of codons, wherein said values have associated attribute information.

5. The computer-based method of claim 4, wherein said associated attribute information indicates an earliest position in said program that each value on said stack relied upon for its value.

6. A computer-readable medium for allowing a codon, having an associated representative numeric value, to selectively be treated as being the representative numeric value, and for allowing a codon, representing a constant, to selectively be treated as a codon represented by the constant, by performing the steps of:
   a. creating a program containing a plurality of codons for execution;
   b. embedding in said program of said step (a) at least one toggle codon, wherein said toggle codon indicates that a subsequent codon is to be treated as said subsequent codon's numeric value, or that a subsequent codon representing a constant is to be treated as the codon represented by the constant;
   c. executing said program, wherein each codon encountered in said program is placed on a stack or causes an action to be taken relating to one or more codons placed thereon;
   d. upon encountering said at least one toggle codon of said step (b), placing the codon number of said subsequent codon on said stack where said toggle codon indicates treatment as a numeric value, or executing the codon designated by said constant where said toggle codon indicates treatment as a codon represented by said constant.

* * * * *